US008686475B2

(12) United States Patent
Vorbach

(10) Patent No.: US 8,686,475 B2
(45) Date of Patent: Apr. 1, 2014

(54) RECONFIGURABLE ELEMENTS
(75) Inventor: Martin Vorbach, Munich (DE)
(73) Assignee: Pact XPP Technologies AG, Munich (DE)
( * ) Notice: Subject to any disclaimer, the term of this patent is extended or adjusted under 35 U.S.C. 154(b) by 478 days.
(21) Appl. No.: 13/023,796
(22) Filed: Feb. 9, 2011
(65) Prior Publication Data
US 2011/0145547 A1 Jun. 16, 2011

Related U.S. Application Data
(63) Continuation of application No. 12/571,173, filed on Sep. 30, 2009, which is a continuation of application No. 10/490,081, filed as application No. PCT/EP02/10572 on Sep. 19, 2002, now Pat. No. 8,429,385.

(30) Foreign Application Priority Data

| Sep. 19, 2001 | (DE) | 101 46 132 |
|---|---|---|
| Sep. 30, 2001 | (WO) | PCT/EP01/11299 |
| Oct. 8, 2001 | (WO) | PCT/EP01/11593 |
| Nov. 5, 2001 | (DE) | 101 54 259 |
| Dec. 14, 2001 | (EP) | 01129923 |
| Jan. 18, 2002 | (EP) | 02001331 |
| Feb. 15, 2002 | (DE) | 102 06 653 |
| Feb. 18, 2002 | (DE) | 102 06 856 |
| Feb. 18, 2002 | (DE) | 102 06 857 |
| Feb. 21, 2002 | (DE) | 102 07 224 |
| Feb. 21, 2002 | (DE) | 102 07 226 |
| Feb. 27, 2002 | (DE) | 102 08 434 |
| Feb. 27, 2002 | (DE) | 102 08 435 |
| Mar. 5, 2002 | (WO) | PCT/EP02/02398 |
| Mar. 5, 2002 | (WO) | PCT/EP02/02403 |
| Mar. 5, 2002 | (WO) | PCT/EP02/02404 |
| Mar. 21, 2002 | (DE) | 102 12 621 |
| Mar. 21, 2002 | (DE) | 102 12 622 |
| May 2, 2002 | (DE) | 102 19 681 |
| May 2, 2002 | (EP) | 02009868 |
| Jun. 20, 2002 | (DE) | 102 27 650 |
| Aug. 7, 2002 | (DE) | 102 36 269 |
| Aug. 7, 2002 | (DE) | 102 36 271 |
| Aug. 7, 2002 | (DE) | 102 36 272 |
| Aug. 21, 2002 | (DE) | 102 38 172 |
| Aug. 21, 2002 | (DE) | 102 38 173 |
| Aug. 21, 2002 | (DE) | 102 38 174 |
| Aug. 27, 2002 | (DE) | 102 40 000 |
| Aug. 27, 2002 | (DE) | 102 40 022 |
| Sep. 3, 2002 | (WO) | PCT/DE02/03278 |
| Sep. 6, 2002 | (DE) | 102 41 812 |
| Sep. 9, 2002 | (WO) | PCT/EP02/10084 |
| Jun. 12, 2003 | (DE) | 102 26 186 |

(51) Int. Cl.
H01L 27/10 (2006.01)
(52) U.S. Cl.
USPC ............ 257/203; 257/209; 257/686; 257/777
(58) Field of Classification Search
USPC ............ 257/202–211, 686, 777, E29.12, 257/E29.246
See application file for complete search history.

(56) References Cited

U.S. PATENT DOCUMENTS

| 3,564,506 A | 2/1971 | Bee et al. |
| 3,681,578 A | 8/1972 | Stevens |

(Continued)

FOREIGN PATENT DOCUMENTS

| DE | 42 21 278 | 1/1994 |
| DE | 44 16 881 | 11/1994 |

(Continued)

OTHER PUBLICATIONS

Ramanathan et al., "Reconfigurable Filter Coprocessor Architecture for DSP Applications," Journal of VLSI Signal Processing, 2000, vol. 26, pp. 333-359.

(Continued)

Primary Examiner — Cuong Q Nguyen
(74) Attorney, Agent, or Firm — Bechen PLLC

(57) ABSTRACT

A cell element field for data processing having function cells for execution of algebraic and/or logic functions and memory cells for receiving, storing and/or outputting information is described. A control connection may lead from the function cells to the memory cells.

58 Claims, 21 Drawing Sheets

(56) References Cited

U.S. PATENT DOCUMENTS

| | | |
|---|---|---|
| 3,753,008 A | 8/1973 | Guarnaschelli |
| 3,754,211 A | 8/1973 | Rocher et al. |
| 3,855,577 A | 12/1974 | Vandierendonck |
| 3,956,589 A | 5/1976 | Rocher et al. |
| 4,151,611 A | 4/1979 | Sugawara et al. |
| 4,233,667 A | 11/1980 | Devine et al. |
| 4,414,547 A | 11/1983 | Knapp et al. |
| 4,498,134 A | 2/1985 | Hansen et al. |
| 4,498,172 A | 2/1985 | Bhavsar |
| 4,566,102 A | 1/1986 | Hefner |
| 4,571,736 A | 2/1986 | Agrawal et al. |
| 4,590,583 A | 5/1986 | Miller |
| 4,591,979 A | 5/1986 | Iwashita |
| 4,594,682 A | 6/1986 | Drimak |
| 4,623,997 A | 11/1986 | Tulpule |
| 4,646,300 A | 2/1987 | Goodman et al. |
| 4,663,706 A | 5/1987 | Allen et al. |
| 4,667,190 A | 5/1987 | Fant et al. |
| 4,682,284 A | 7/1987 | Schrofer |
| 4,686,386 A | 8/1987 | Tadao |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,760,525 A | 7/1988 | Webb |
| 4,761,755 A | 8/1988 | Ardini et al. |
| 4,791,603 A | 12/1988 | Henry |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Stolfo et al. |
| 4,870,302 A | 9/1989 | Freeman |
| 4,873,666 A | 10/1989 | Lefebvre et al. |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,939,641 A | 7/1990 | Schwartz et al. |
| 4,959,781 A | 9/1990 | Rubenstein et al. |
| 4,967,340 A | 10/1990 | Dawes |
| 4,972,314 A | 11/1990 | Getzinger et al. |
| 4,992,933 A | 2/1991 | Taylor |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,031,179 A | 7/1991 | Yoshida et al. |
| 5,034,914 A | 7/1991 | Osterlund |
| 5,036,473 A | 7/1991 | Butts et al. |
| 5,036,493 A | 7/1991 | Nielsen |
| 5,041,924 A | 8/1991 | Blackborow et al. |
| 5,043,978 A | 8/1991 | Nagler et al. |
| 5,047,924 A | 9/1991 | Fujioka et al. |
| 5,055,997 A | 10/1991 | Sluijter et al. |
| 5,065,308 A | 11/1991 | Evans |
| 5,072,178 A | 12/1991 | Matsumoto |
| 5,076,482 A | 12/1991 | Kozyrski et al. |
| 5,081,375 A | 1/1992 | Pickett et al. |
| 5,099,447 A | 3/1992 | Myszewski |
| 5,103,311 A | 4/1992 | Sluijter et al. |
| 5,109,503 A | 4/1992 | Cruickshank et al. |
| 5,113,498 A | 5/1992 | Evan et al. |
| 5,115,510 A | 5/1992 | Okamoto et al. |
| 5,119,290 A | 6/1992 | Loo et al. |
| 5,123,109 A | 6/1992 | Hillis |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,212,777 A | 5/1993 | Gove et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,243,238 A | 9/1993 | Kean |
| 5,245,616 A | 9/1993 | Olson |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,511 A | 2/1994 | Robinson et al. |
| 5,287,532 A | 2/1994 | Hunt |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,355,508 A | 10/1994 | Kan |
| 5,361,373 A | 11/1994 | Gilson |
| 5,365,125 A | 11/1994 | Goetting et al. |
| 5,379,444 A | 1/1995 | Mumme |
| 5,386,154 A | 1/1995 | Goetting et al. |
| 5,386,518 A | 1/1995 | Reagle et al. |
| 5,392,437 A | 2/1995 | Matter et al. |
| 5,408,643 A | 4/1995 | Katayose |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,435,000 A | 7/1995 | Boothroyd et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,450,022 A | 9/1995 | New |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,477,525 A | 12/1995 | Okabe |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,493,663 A | 2/1996 | Parikh |
| 5,497,498 A | 3/1996 | Taylor |
| 5,502,838 A | 3/1996 | Kikinis |
| 5,504,439 A | 4/1996 | Tavana |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |

(56) References Cited

U.S. PATENT DOCUMENTS

| | | |
|---|---|---|
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,580 A | 7/1996 | Giomi et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,550,782 A | 8/1996 | Cliff et al. |
| 5,555,434 A | 9/1996 | Carlstedt |
| 5,559,450 A | 9/1996 | Ngai et al. |
| 5,561,738 A | 10/1996 | Kinerk et al. |
| 5,568,624 A | 10/1996 | Sites et al. |
| 5,570,040 A | 10/1996 | Lytle et al. |
| 5,572,710 A | 11/1996 | Asano et al. |
| 5,574,927 A | 11/1996 | Scantlin |
| 5,574,930 A | 11/1996 | Halverson, Jr. et al. |
| 5,581,731 A | 12/1996 | King et al. |
| 5,581,734 A | 12/1996 | DiBrino et al. |
| 5,583,450 A | 12/1996 | Trimberger et al. |
| 5,584,013 A | 12/1996 | Cheong et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,600,597 A | 2/1997 | Kean et al. |
| 5,600,845 A | 2/1997 | Gilson |
| 5,602,999 A | 2/1997 | Hyatt |
| 5,603,005 A | 2/1997 | Bauman et al. |
| 5,606,698 A | 2/1997 | Powell |
| 5,608,342 A | 3/1997 | Trimberger |
| 5,611,049 A | 3/1997 | Pitts |
| 5,617,547 A | 4/1997 | Feeney et al. |
| 5,617,577 A | 4/1997 | Barker et al. |
| 5,619,720 A | 4/1997 | Garde et al. |
| 5,625,806 A | 4/1997 | Kromer |
| 5,625,836 A | 4/1997 | Barker et al. |
| 5,627,992 A | 5/1997 | Baror |
| 5,634,131 A | 5/1997 | Matter et al. |
| 5,635,851 A | 6/1997 | Tavana |
| 5,642,058 A | 6/1997 | Trimberger et al. |
| 5,646,544 A | 7/1997 | Iadanza |
| 5,646,545 A | 7/1997 | Trimberger et al. |
| 5,649,176 A | 7/1997 | Selvidge et al. |
| 5,649,179 A | 7/1997 | Steenstra et al. |
| 5,652,529 A | 7/1997 | Gould et al. |
| 5,652,894 A | 7/1997 | Hu et al. |
| 5,655,069 A | 8/1997 | Ogawara et al. |
| 5,655,124 A | 8/1997 | Lin |
| 5,656,950 A | 8/1997 | Duong et al. |
| 5,657,330 A | 8/1997 | Matsumoto |
| 5,659,785 A | 8/1997 | Pechanek et al. |
| 5,659,797 A | 8/1997 | Zandveld et al. |
| 5,675,262 A | 10/1997 | Doung et al. |
| 5,675,743 A | 10/1997 | Mavity |
| 5,675,757 A | 10/1997 | Davidson et al. |
| 5,675,777 A | 10/1997 | Glickman |
| 5,677,909 A | 10/1997 | Heide |
| 5,680,583 A | 10/1997 | Kuijsten |
| 5,682,491 A | 10/1997 | Pechanek et al. |
| 5,682,544 A | 10/1997 | Pechanek et al. |
| 5,687,325 A | 11/1997 | Chang |
| 5,694,602 A | 12/1997 | Smith |
| 5,696,791 A | 12/1997 | Yeung |
| 5,696,976 A | 12/1997 | Nizar et al. |
| 5,701,091 A | 12/1997 | Kean |
| 5,705,938 A | 1/1998 | Kean |
| 5,706,482 A | 1/1998 | Matsushima et al. |
| 5,713,037 A | 1/1998 | Wilkinson et al. |
| 5,717,890 A | 2/1998 | Ichida et al. |
| 5,717,943 A | 2/1998 | Barker et al. |
| 5,727,229 A | 3/1998 | Kan et al. |
| 5,732,209 A | 3/1998 | Vigil et al. |
| 5,734,869 A | 3/1998 | Chen |
| 5,734,921 A | 3/1998 | Dapp et al. |
| 5,737,516 A | 4/1998 | Circello et al. |
| 5,737,565 A | 4/1998 | Mayfield |
| 5,742,180 A | 4/1998 | DeHon et al. |
| 5,745,734 A | 4/1998 | Craft et al. |
| 5,748,872 A | 5/1998 | Norman |
| 5,748,979 A | 5/1998 | Trimberger |
| 5,752,035 A | 5/1998 | Trimberger |
| 5,754,459 A | 5/1998 | Telikepalli |
| 5,754,820 A | 5/1998 | Yamagami |
| 5,754,827 A | 5/1998 | Barbier et al. |
| 5,754,871 A | 5/1998 | Wilkinson et al. |
| 5,754,876 A | 5/1998 | Tamaki et al. |
| 5,760,602 A | 6/1998 | Tan |
| 5,761,484 A | 6/1998 | Agarwal et al. |
| 5,768,629 A | 6/1998 | Wise et al. |
| 5,773,994 A | 6/1998 | Jones |
| 5,778,237 A | 7/1998 | Yamamoto et al. |
| 5,778,439 A | 7/1998 | Timberger et al. |
| 5,781,756 A | 7/1998 | Hung |
| 5,784,313 A | 7/1998 | Trimberger et al. |
| 5,784,630 A | 7/1998 | Saito et al. |
| 5,784,636 A | 7/1998 | Rupp |
| 5,794,059 A | 8/1998 | Barker et al. |
| 5,794,062 A | 8/1998 | Baxter |
| 5,801,547 A | 9/1998 | Kean |
| 5,801,715 A | 9/1998 | Norman |
| 5,801,958 A | 9/1998 | Dangelo et al. |
| 5,802,290 A | 9/1998 | Casselman |
| 5,804,986 A | 9/1998 | Jones |
| 5,815,004 A | 9/1998 | Trimberger et al. |
| 5,815,715 A | 9/1998 | Kayhan |
| 5,815,726 A | 9/1998 | Cliff |
| 5,821,774 A | 10/1998 | Veytsman et al. |
| 5,828,229 A | 10/1998 | Cliff et al. |
| 5,828,858 A | 10/1998 | Athanas et al. |
| 5,831,448 A | 11/1998 | Kean |
| 5,832,288 A | 11/1998 | Wong |
| 5,838,165 A | 11/1998 | Chatter |
| 5,838,988 A | 11/1998 | Panwar et al. |
| 5,841,973 A | 11/1998 | Kessler et al. |
| 5,844,422 A | 12/1998 | Trimberger et al. |
| 5,844,888 A | 12/1998 | Markkula, Jr. et al. |
| 5,848,238 A | 12/1998 | Shimomura et al. |
| 5,854,918 A | 12/1998 | Baxter |
| 5,857,097 A | 1/1999 | Henzinger et al. |
| 5,857,109 A | 1/1999 | Taylor |
| 5,859,544 A | 1/1999 | Norman |
| 5,860,119 A | 1/1999 | Dockser |
| 5,862,403 A | 1/1999 | Kanai et al. |
| 5,867,691 A | 2/1999 | Shiraishi |
| 5,867,723 A | 2/1999 | Chin et al. |
| 5,870,620 A | 2/1999 | Kadosumi et al. |
| 5,884,075 A | 3/1999 | Hester et al. |
| 5,887,162 A | 3/1999 | Williams et al. |
| 5,887,165 A | 3/1999 | Martel et al. |
| 5,889,533 A | 3/1999 | Lee |
| 5,889,982 A | 3/1999 | Rodgers et al. |
| 5,892,370 A | 4/1999 | Eaton et al. |
| 5,892,961 A | 4/1999 | Trimberger |
| 5,892,962 A | 4/1999 | Cloutier |
| 5,894,565 A | 4/1999 | Furtek et al. |
| 5,895,487 A | 4/1999 | Boyd et al. |
| 5,898,602 A | 4/1999 | Rothman et al. |
| 5,901,279 A | 5/1999 | Davis, III |
| 5,913,925 A | 6/1999 | Kahle et al. |
| 5,915,099 A | 6/1999 | Takata et al. |
| 5,915,123 A | 6/1999 | Mirsky et al. |
| 5,924,119 A | 7/1999 | Sindhu et al. |
| 5,926,638 A | 7/1999 | Inoue |
| 5,933,023 A | 8/1999 | Young |
| 5,933,642 A | 8/1999 | Greenbaum et al. |
| 5,936,424 A | 8/1999 | Young et al. |
| 5,943,242 A | 8/1999 | Vorbach et al. |
| 5,956,518 A | 9/1999 | DeHon et al. |

(56) References Cited

U.S. PATENT DOCUMENTS

| | | |
|---|---|---|
| 5,960,193 A | 9/1999 | Guttag et al. |
| 5,960,200 A | 9/1999 | Eager et al. |
| 5,966,143 A | 10/1999 | Breternitz, Jr. |
| 5,966,534 A | 10/1999 | Cooke et al. |
| 5,970,254 A | 10/1999 | Cooke et al. |
| 5,978,260 A | 11/1999 | Trimberger et al. |
| 5,978,583 A | 11/1999 | Ekanadham et al. |
| 5,996,048 A | 11/1999 | Cherabuddi et al. |
| 5,996,083 A | 11/1999 | Gupta et al. |
| 5,999,990 A | 12/1999 | Sharrit et al. |
| 6,003,143 A | 12/1999 | Kim et al. |
| 6,011,407 A | 1/2000 | New |
| 6,014,509 A | 1/2000 | Furtek et al. |
| 6,020,758 A | 2/2000 | Patel et al. |
| 6,020,760 A | 2/2000 | Sample et al. |
| 6,021,490 A | 2/2000 | Vorbach et al. |
| 6,023,564 A | 2/2000 | Trimberger |
| 6,023,742 A | 2/2000 | Ebeling et al. |
| 6,026,478 A | 2/2000 | Dowling |
| 6,026,481 A | 2/2000 | New et al. |
| 6,034,538 A | 3/2000 | Abramovici |
| 6,035,371 A | 3/2000 | Magloire |
| 6,038,650 A | 3/2000 | Vorbach et al. |
| 6,038,656 A | 3/2000 | Martin et al. |
| 6,044,030 A | 3/2000 | Zheng et al. |
| 6,045,585 A | 4/2000 | Blainey |
| 6,047,115 A | 4/2000 | Mohan et al. |
| 6,049,222 A | 4/2000 | Lawman |
| 6,049,866 A | 4/2000 | Earl |
| 6,052,524 A | 4/2000 | Pauna |
| 6,052,773 A | 4/2000 | DeHon et al. |
| 6,054,873 A | 4/2000 | Laramie |
| 6,055,619 A | 4/2000 | North et al. |
| 6,058,266 A | 5/2000 | Megiddo et al. |
| 6,058,469 A | 5/2000 | Baxter |
| 6,064,819 A | 5/2000 | Franssen et al. |
| 6,072,348 A | 6/2000 | New et al. |
| 6,075,935 A | 6/2000 | Ussery et al. |
| 6,076,157 A | 6/2000 | Borkenhagen et al. |
| 6,077,315 A | 6/2000 | Greenbaum et al. |
| 6,078,736 A | 6/2000 | Guccione |
| 6,081,903 A | 6/2000 | Vorbach et al. |
| 6,084,429 A | 7/2000 | Trimberger |
| 6,085,317 A | 7/2000 | Smith |
| 6,086,628 A | 7/2000 | Dave et al. |
| 6,088,795 A | 7/2000 | Vorbach et al. |
| 6,092,174 A | 7/2000 | Roussakov |
| RE36,839 E | 8/2000 | Simmons et al. |
| 6,096,091 A | 8/2000 | Hartmann |
| 6,105,105 A | 8/2000 | Trimberger et al. |
| 6,105,106 A | 8/2000 | Manning |
| 6,108,760 A | 8/2000 | Mirsky et al. |
| 6,118,724 A | 9/2000 | Higginbottom |
| 6,119,181 A | 9/2000 | Vorbach et al. |
| 6,122,719 A | 9/2000 | Mirsky et al. |
| 6,125,072 A | 9/2000 | Wu |
| 6,125,408 A | 9/2000 | McGee et al. |
| 6,127,908 A | 10/2000 | Bozler et al. |
| 6,128,720 A | 10/2000 | Pechanek et al. |
| 6,134,166 A | 10/2000 | Lytle et al. |
| 6,137,307 A | 10/2000 | Iwanczuk et al. |
| 6,145,072 A | 11/2000 | Shams et al. |
| 6,150,837 A | 11/2000 | Beal et al. |
| 6,150,839 A | 11/2000 | New et al. |
| 6,154,048 A | 11/2000 | Iwanczuk et al. |
| 6,154,049 A | 11/2000 | New |
| 6,154,826 A | 11/2000 | Wulf et al. |
| 6,157,214 A | 12/2000 | Marshall |
| 6,170,051 B1 | 1/2001 | Dowling |
| 6,172,520 B1 | 1/2001 | Lawman et al. |
| 6,173,419 B1 | 1/2001 | Barnett |
| 6,173,434 B1 | 1/2001 | Wirthlin et al. |
| 6,178,494 B1 | 1/2001 | Casselman |
| 6,185,256 B1 | 2/2001 | Saito et al. |
| 6,185,731 B1 | 2/2001 | Maeda et al. |
| 6,188,240 B1 | 2/2001 | Nakaya |
| 6,188,650 B1 | 2/2001 | Hamada et al. |
| 6,191,614 B1 | 2/2001 | Schultz et al. |
| 6,198,304 B1 | 3/2001 | Sasaki |
| 6,201,406 B1 | 3/2001 | Iwanczuk et al. |
| 6,202,163 B1 | 3/2001 | Gabzdyl et al. |
| 6,202,182 B1 | 3/2001 | Abramovici et al. |
| 6,204,687 B1 | 3/2001 | Schultz et al. |
| 6,211,697 B1 | 4/2001 | Lien et al. |
| 6,212,544 B1 | 4/2001 | Borkenhagen et al. |
| 6,212,650 B1 | 4/2001 | Guccione |
| 6,215,326 B1 | 4/2001 | Jefferson et al. |
| 6,216,223 B1 | 4/2001 | Revilla et al. |
| 6,219,833 B1 | 4/2001 | Solomon et al. |
| RE37,195 E | 5/2001 | Kean |
| 6,230,307 B1 | 5/2001 | Davis et al. |
| 6,240,502 B1 | 5/2001 | Panwar et al. |
| 6,243,808 B1 | 6/2001 | Wang |
| 6,247,147 B1 | 6/2001 | Beenstra et al. |
| 6,249,756 B1 | 6/2001 | Bunton et al. |
| 6,252,792 B1 | 6/2001 | Marshall et al. |
| 6,256,724 B1 | 7/2001 | Hocevar et al. |
| 6,260,114 B1 | 7/2001 | Schug |
| 6,260,179 B1 | 7/2001 | Ohsawa et al. |
| 6,262,908 B1 | 7/2001 | Marshall et al. |
| 6,263,430 B1 | 7/2001 | Trimberger et al. |
| 6,266,760 B1 | 7/2001 | DeHon et al. |
| 6,279,077 B1 | 8/2001 | Nasserbakht et al. |
| 6,282,627 B1 | 8/2001 | Wong et al. |
| 6,282,701 B1 | 8/2001 | Wygodny et al. |
| 6,285,624 B1 | 9/2001 | Chen |
| 6,286,134 B1 | 9/2001 | Click, Jr. et al. |
| 6,288,566 B1 | 9/2001 | Hanrahan et al. |
| 6,289,369 B1 | 9/2001 | Sundaresan |
| 6,289,440 B1 | 9/2001 | Casselman |
| 6,298,043 B1 | 10/2001 | Mauger et al. |
| 6,298,396 B1 | 10/2001 | Loyer et al. |
| 6,298,472 B1 | 10/2001 | Phillips et al. |
| 6,301,706 B1 | 10/2001 | Maslennikov et al. |
| 6,311,200 B1 | 10/2001 | Hanrahan et al. |
| 6,311,265 B1 | 10/2001 | Beckerle et al. |
| 6,321,298 B1 | 11/2001 | Hubis |
| 6,321,366 B1 | 11/2001 | Tseng et al. |
| 6,321,373 B1 | 11/2001 | Ekanadham et al. |
| 6,338,106 B1 | 1/2002 | Vorbach et al. |
| 6,339,424 B1 | 1/2002 | Ishikawa et al. |
| 6,339,840 B1 | 1/2002 | Kothari et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,353,841 B1 | 3/2002 | Marshall et al. |
| 6,362,650 B1 | 3/2002 | New et al. |
| 6,370,596 B1 | 4/2002 | Dakhil |
| 6,373,447 B1 * | 4/2002 | Rostoker et al. ............... 257/491 |
| 6,373,779 B1 | 4/2002 | Pang et al. |
| 6,374,286 B1 | 4/2002 | Gee |
| 6,378,068 B1 | 4/2002 | Foster et al. |
| 6,381,624 B1 | 4/2002 | Colon-Bonet et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,400,601 B1 | 6/2002 | Sudo et al. |
| 6,404,224 B1 | 6/2002 | Azegami et al. |
| 6,405,185 B1 | 6/2002 | Pechanek et al. |
| 6,405,299 B1 | 6/2002 | Vorbach et al. |
| 6,421,808 B1 | 7/2002 | McGeer |
| 6,421,809 B1 | 7/2002 | Wuytack et al. |
| 6,421,817 B1 | 7/2002 | Mohan et al. |
| 6,425,054 B1 | 7/2002 | Nguyen |
| 6,425,068 B1 | 7/2002 | Vorbach |
| 6,426,649 B1 | 7/2002 | Fu et al. |
| 6,427,156 B1 | 7/2002 | Chapman et al. |
| 6,430,309 B1 | 8/2002 | Pressman et al. |
| 6,434,642 B1 | 8/2002 | Camilleri et al. |
| 6,434,672 B1 | 8/2002 | Gaither |
| 6,434,695 B1 | 8/2002 | Esfahani et al. |
| 6,434,699 B1 | 8/2002 | Jones et al. |
| 6,437,441 B1 | 8/2002 | Yamamoto |
| 6,438,747 B1 | 8/2002 | Schreiber et al. |

(56) References Cited

U.S. PATENT DOCUMENTS

| | | |
|---|---|---|
| 6,449,283 B1 | 9/2002 | Chao et al. |
| 6,456,628 B1 | 9/2002 | Greim et al. |
| 6,457,116 B1 | 9/2002 | Mirsky et al. |
| 6,476,634 B1 | 11/2002 | Bilski |
| 6,477,643 B1 | 11/2002 | Vorbach et al. |
| 6,480,937 B1 | 11/2002 | Vorbach et al. |
| 6,480,954 B2 | 11/2002 | Trimberger et al. |
| 6,483,343 B1 | 11/2002 | Faith et al. |
| 6,487,709 B1 | 11/2002 | Keller et al. |
| 6,490,695 B1 | 12/2002 | Zagorski et al. |
| 6,496,740 B1 | 12/2002 | Robertson et al. |
| 6,496,902 B1 | 12/2002 | Faanes et al. |
| 6,496,971 B1 | 12/2002 | Lesea et al. |
| 6,504,398 B1 | 1/2003 | Lien et al. |
| 6,507,898 B1 | 1/2003 | Gibson et al. |
| 6,507,947 B1 | 1/2003 | Schreiber et al. |
| 6,512,804 B1 | 1/2003 | Johnson et al. |
| 6,513,077 B2 | 1/2003 | Vorbach et al. |
| 6,516,382 B2 | 2/2003 | Manning |
| 6,518,787 B1 | 2/2003 | Allegrucci et al. |
| 6,519,674 B1 | 2/2003 | Lam et al. |
| 6,523,107 B1 | 2/2003 | Stansfield et al. |
| 6,525,678 B1 | 2/2003 | Veenstra et al. |
| 6,526,520 B1 | 2/2003 | Vorbach et al. |
| 6,538,468 B1 | 3/2003 | Moore |
| 6,538,470 B1 | 3/2003 | Langhammer et al. |
| 6,539,415 B1 | 3/2003 | Mercs |
| 6,539,438 B1 | 3/2003 | Ledzius et al. |
| 6,539,477 B1 | 3/2003 | Seawright |
| 6,542,394 B2 | 4/2003 | Marshall et al. |
| 6,542,844 B1 | 4/2003 | Hanna |
| 6,542,998 B1 | 4/2003 | Vorbach |
| 6,553,395 B2 | 4/2003 | Marshall et al. |
| 6,553,479 B2 | 4/2003 | Mirsky et al. |
| 6,567,834 B1 | 5/2003 | Marshall et al. |
| 6,571,381 B1 | 5/2003 | Vorbach et al. |
| 6,587,939 B1 | 7/2003 | Takano |
| 6,598,128 B1 | 7/2003 | Yoshioka et al. |
| 6,606,704 B1 | 8/2003 | Adiletta et al. |
| 6,624,819 B1 | 9/2003 | Lewis |
| 6,625,631 B2 | 9/2003 | Ruehle |
| 6,631,487 B1 | 10/2003 | Abramovici et al. |
| 6,633,181 B1 | 10/2003 | Rupp |
| 6,657,457 B1 | 12/2003 | Hanrahan et al. |
| 6,658,564 B1 | 12/2003 | Smith et al. |
| 6,665,758 B1 | 12/2003 | Frazier et al. |
| 6,668,237 B1 | 12/2003 | Guccione et al. |
| 6,681,388 B1 | 1/2004 | Sato et al. |
| 6,687,788 B2 | 2/2004 | Vorbach et al. |
| 6,694,434 B1 | 2/2004 | McGee et al. |
| 6,697,979 B1 | 2/2004 | Vorbach et al. |
| 6,704,816 B1 | 3/2004 | Burke |
| 6,708,223 B1 | 3/2004 | Wang et al. |
| 6,708,325 B2 | 3/2004 | Cooke et al. |
| 6,717,436 B2 | 4/2004 | Kress et al. |
| 6,721,830 B2 | 4/2004 | Vorbach et al. |
| 6,725,334 B2 | 4/2004 | Barroso et al. |
| 6,728,871 B1 | 4/2004 | Vorbach et al. |
| 6,745,317 B1 | 6/2004 | Mirsky et al. |
| 6,748,440 B1 | 6/2004 | Lisitsa et al. |
| 6,751,722 B2 | 6/2004 | Mirsky et al. |
| 6,754,805 B1 | 6/2004 | Juan |
| 6,757,847 B1 | 6/2004 | Farkash et al. |
| 6,757,892 B1 | 6/2004 | Gokhale et al. |
| 6,782,445 B1 | 8/2004 | Olgiati et al. |
| 6,785,826 B1 | 8/2004 | Durham et al. |
| 6,802,026 B1 | 10/2004 | Patterson et al. |
| 6,803,787 B1 | 10/2004 | Wicker, Jr. |
| 6,820,188 B2 | 11/2004 | Stansfield et al. |
| 6,829,697 B1 | 12/2004 | Davis et al. |
| 6,836,842 B1 | 12/2004 | Guccione et al. |
| 6,847,370 B2 | 1/2005 | Baldwin et al. |
| 6,859,869 B1 | 2/2005 | Vorbach |
| 6,868,476 B2 | 3/2005 | Rosenbluth |
| 6,871,341 B1 | 3/2005 | Shyr |
| 6,874,108 B1 | 3/2005 | Abramovici et al. |
| 6,886,092 B1 | 4/2005 | Douglass et al. |
| 6,901,502 B2 | 5/2005 | Yano et al. |
| 6,928,523 B2 | 8/2005 | Yamada |
| 6,957,306 B2 | 10/2005 | So et al. |
| 6,961,924 B2 | 11/2005 | Bates et al. |
| 6,975,138 B2 | 12/2005 | Pani et al. |
| 6,977,649 B1 | 12/2005 | Baldwin et al. |
| 7,000,161 B1 | 2/2006 | Allen et al. |
| 7,007,096 B1 | 2/2006 | Lisitsa et al. |
| 7,010,667 B2 | 3/2006 | Vorbach |
| 7,010,687 B2 | 3/2006 | Ichimura |
| 7,028,107 B2 | 4/2006 | Vorbach et al. |
| 7,036,114 B2 | 4/2006 | McWilliams et al. |
| 7,038,952 B1 | 5/2006 | Zack et al. |
| 7,043,416 B1 | 5/2006 | Lin |
| 7,144,152 B2 | 12/2006 | Rusu et al. |
| 7,155,708 B2 | 12/2006 | Hammes et al. |
| 7,164,422 B1 | 1/2007 | Wholey et al. |
| 7,210,129 B2 | 4/2007 | May et al. |
| 7,216,204 B2 | 5/2007 | Rosenbluth |
| 7,237,087 B2 | 6/2007 | Vorbach et al. |
| 7,249,351 B1 | 7/2007 | Songer et al. |
| 7,254,649 B2 | 8/2007 | Subramanian et al. |
| 7,266,725 B2 | 9/2007 | Vorbach et al. |
| 7,340,596 B1 | 3/2008 | Crosland et al. |
| 7,346,644 B1 | 3/2008 | Langhammer et al. |
| 7,350,178 B1 | 3/2008 | Crosland et al. |
| 7,382,156 B2 | 6/2008 | Pani et al. |
| 7,455,450 B2 | 11/2008 | Liu et al. |
| 7,492,013 B2 * | 2/2009 | Correale, Jr. .................. 257/368 |
| 7,595,659 B2 | 9/2009 | Vorbach et al. |
| 7,650,448 B2 | 1/2010 | Vorbach et al. |
| 7,657,877 B2 | 2/2010 | Vorbach et al. |
| 7,759,968 B1 | 7/2010 | Hussein et al. |
| 7,873,811 B1 | 1/2011 | Wolinski et al. |
| 2001/0001860 A1 | 5/2001 | Bieu |
| 2001/0003834 A1 | 6/2001 | Shimonishi |
| 2001/0010074 A1 | 7/2001 | Nishihara et al. |
| 2001/0018733 A1 | 8/2001 | Fujii et al. |
| 2001/0032305 A1 | 10/2001 | Barry |
| 2002/0004916 A1 | 1/2002 | Marchand et al. |
| 2002/0010853 A1 | 1/2002 | Trimberger et al. |
| 2002/0013861 A1 | 1/2002 | Adiletta et al. |
| 2002/0038414 A1 | 3/2002 | Taylor |
| 2002/0045952 A1 | 4/2002 | Blemel |
| 2002/0051482 A1 | 5/2002 | Lomp |
| 2002/0073282 A1 | 6/2002 | Chauvel et al. |
| 2002/0083308 A1 | 6/2002 | Pereira et al. |
| 2002/0099759 A1 | 7/2002 | Gootherts |
| 2002/0103839 A1 | 8/2002 | Ozawa |
| 2002/0124238 A1 | 9/2002 | Metzgen |
| 2002/0138716 A1 | 9/2002 | Master et al. |
| 2002/0143505 A1 | 10/2002 | Drusinsky |
| 2002/0144229 A1 | 10/2002 | Hanrahan |
| 2002/0147932 A1 | 10/2002 | Brock et al. |
| 2002/0152060 A1 | 10/2002 | Tseng |
| 2002/0156962 A1 | 10/2002 | Chopra et al. |
| 2002/0162097 A1 | 10/2002 | Meribout |
| 2002/0165886 A1 | 11/2002 | Lam |
| 2003/0001615 A1 | 1/2003 | Sueyoshi et al. |
| 2003/0014743 A1 | 1/2003 | Cooke et al. |
| 2003/0046607 A1 | 3/2003 | May et al. |
| 2003/0052711 A1 | 3/2003 | Taylor |
| 2003/0055861 A1 | 3/2003 | Lai et al. |
| 2003/0056062 A1 | 3/2003 | Prabhu |
| 2003/0056085 A1 | 3/2003 | Vorbach |
| 2003/0056091 A1 | 3/2003 | Greenberg |
| 2003/0056202 A1 | 3/2003 | May et al. |
| 2003/0061542 A1 | 3/2003 | Bates et al. |
| 2003/0062922 A1 | 4/2003 | Douglass et al. |
| 2003/0070059 A1 | 4/2003 | Dally et al. |
| 2003/0086300 A1 | 5/2003 | Noyes et al. |
| 2003/0093662 A1 | 5/2003 | Vorbach et al. |
| 2003/0097513 A1 | 5/2003 | Vorbach et al. |
| 2003/0123579 A1 | 7/2003 | Safavi et al. |
| 2003/0135686 A1 | 7/2003 | Vorbach et al. |
| 2003/0154349 A1 | 8/2003 | Berg et al. |
| 2003/0192032 A1 | 10/2003 | Andrade et al. |

(56) References Cited

U.S. PATENT DOCUMENTS

| | | |
|---|---|---|
| 2003/0226056 A1 | 12/2003 | Yip et al. |
| 2004/0015899 A1 | 1/2004 | May et al. |
| 2004/0025005 A1 | 2/2004 | Vorbach et al. |
| 2004/0039880 A1 | 2/2004 | Pentkovski et al. |
| 2004/0078548 A1 | 4/2004 | Claydon et al. |
| 2004/0088689 A1 | 5/2004 | Hammes |
| 2004/0088691 A1 | 5/2004 | Hammes et al. |
| 2004/0168099 A1 | 8/2004 | Vorbach et al. |
| 2004/0199688 A1 | 10/2004 | Vorbach et al. |
| 2005/0066213 A1 | 3/2005 | Vorbach et al. |
| 2005/0091468 A1 | 4/2005 | Morita et al. |
| 2005/0144210 A1 | 6/2005 | Simkins et al. |
| 2005/0144212 A1 | 6/2005 | Simkins et al. |
| 2005/0144215 A1 | 6/2005 | Simkins et al. |
| 2006/0036988 A1 | 2/2006 | Allen et al. |
| 2006/0230094 A1 | 10/2006 | Simkins et al. |
| 2006/0230096 A1 | 10/2006 | Thendean et al. |
| 2007/0050603 A1 | 3/2007 | Vorbach et al. |
| 2007/0083730 A1 | 4/2007 | Vorbach et al. |
| 2008/0313383 A1 | 12/2008 | Morita et al. |
| 2009/0085603 A1 | 4/2009 | Paul et al. |
| 2009/0193384 A1 | 7/2009 | Sima et al. |
| 2010/0306602 A1 | 12/2010 | Kamiya et al. |

FOREIGN PATENT DOCUMENTS

| | | |
|---|---|---|
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 497 029 | 8/1992 |
| EP | 0 539 595 | 5/1993 |
| EP | 0 638 867 A2 | 8/1994 |
| EP | 0 628 917 | 12/1994 |
| EP | 0 678 985 | 10/1995 |
| EP | 0 686 915 | 12/1995 |
| EP | 0 696 001 | 2/1996 |
| EP | 0 707 269 | 4/1996 |
| EP | 0 726 532 | 8/1996 |
| EP | 0 735 685 | 10/1996 |
| EP | 0 746 106 | 12/1996 |
| EP | 0 748 051 | 12/1996 |
| EP | 0 926 594 | 6/1999 |
| EP | 1 061 439 | 12/2000 |
| EP | 1 115 204 | 7/2001 |
| EP | 1 146 432 | 10/2001 |
| EP | 1 669 885 | 6/2006 |
| FR | 2 752 466 | 2/1998 |
| GB | 2 304 438 | 3/1997 |
| JP | 58-058672 | 4/1983 |
| JP | 1044571 | 2/1989 |
| JP | 1-229378 | 9/1989 |
| JP | 2-130023 | 5/1990 |
| JP | 2-226423 | 9/1990 |
| JP | 5-265705 | 10/1993 |
| JP | 5-276007 | 10/1993 |
| JP | 5-509184 | 12/1993 |
| JP | 6-266605 | 9/1994 |
| JP | 7-086921 | 3/1995 |
| JP | 7-154242 | 6/1995 |
| JP | 8-148989 | 6/1995 |
| JP | 7-182160 | 7/1995 |
| JP | 7-182167 | 7/1995 |
| JP | 8-044581 | 2/1996 |
| JP | 8-069447 | 3/1996 |
| JP | 8-101761 | 4/1996 |
| JP | 8-102492 | 4/1996 |
| JP | 8-106443 | 4/1996 |
| JP | 8-221164 | 8/1996 |
| JP | 8-250685 | 9/1996 |
| JP | 9-027745 | 1/1997 |
| JP | 9-237284 | 9/1997 |
| JP | 9-294069 | 11/1997 |
| JP | 11-046187 | 2/1999 |
| JP | 11-184718 | 7/1999 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 2001-167066 | 6/2001 |
| JP | 2001-510650 | 7/2001 |
| JP | 2001-236221 | 8/2001 |
| JP | 2002-0033457 | 1/2002 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | WO00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/036507 | 5/2003 |
| WO | WO 03/091875 | 11/2003 |
| WO | WO2004/053718 | 6/2004 |
| WO | WO2004/114128 | 12/2004 |
| WO | WO2005/045692 | 5/2005 |
| WO | WO 2007/030395 | 3/2007 |

OTHER PUBLICATIONS

Shanley, Tom, *Pentium Pro and Pentium II System Architecture*, MindShare, Inc., Addition Wesley, 1998, Second Edition, pp. 11-17; Chapter 7; Chapter 10; pp. 209-211, and p. 394.

(56) References Cited

OTHER PUBLICATIONS

Shoup, Richard, "Programmable Cellular Logic Arrays," Dissertation, Computer Science Department, Carnegie-Mellon University, Mar. 1970, 193 pages.
Zucker, Daniel F., "A Comparison of Hardware Prefetching Techniques for Multimedia Benchmarks," Technical Report: CSL-TR-95-683, Dec. 1995, 26 pages.
Microsoft Press Computer Dictionary, Third Edition, Redmond, WA, 1997, 3 pages.
Microsoft Press Computer Dictionary, Second Edition, Redmond, WA, 1994, 3 pages.
A Dictionary of Computing, Fourth Edition, Oxford University Press, 1997, 4 pages.
Communications Standard Dictionary, Third Edition, Martin Weik (Ed.), Chapman & Hall, 1996, 3 pages.
Dictionary of Communications Technology, Terms Definitions and Abbreviations, Second Edition, Gilbert Held (Ed.), John Wiley & Sons, England, 1995, 5 pages.
The Random House College Dictionary, Revised Edition, Random House, Inc., 1984, 14 pages.
The Random House College Dictionary, Revised Edition, Random House, Inc., 1984, 7 pages.
Random House Webster's College Dictionary with CD-ROM, Random House, 2001, 7 pages.
Random House Webster's College Dictionary with CD-ROM, Random House, 2001, 4 pages.
Random House Personal Computer Dictionary, Second Edition, Philip E. Margolis (Ed.), Random House, New York, 1996, 5 pages.
The IEEE Standard Dictionary of Electrical and Electronics Terms, Sixth Edition, 1996, 36 pages.
The IEEE Standard Dictionary of Electrical and Electronics Terms, Sixth Edition, 1996, 8 pages.
McGraw-Hill Electronics Dictionary, Sixth Edition, Neil Sclater et al. (Ed.), McGraw-Hill, 1997, 3 pages.
Modern Dictionary of Electronics, Sixth Edition, Rudolf Graf (Ed.), Newnes (Butterwoth-Heinemann), 1997, 5 pages.
The American Heritage Dictionary, Fourth Edition, Dell (Houghton-Mifflin), 2001, 5 pages.
The American Heritage Dictionary, Second College Edition, Houghton Mifflin, 1982, 23 pages.
The American Heritage Dictionary, Second College Edition, Houghton Mifflin, 1982, 8 pages.
The American Heritage Dictionary, Third Edition, Dell Publishing (Bantam Doubleday Dell Publishing Group, Inc.), 1994, 4 pages.
The American Heritage Dictionary, Fourth Edition, Dell/Houghton Mifflin 2001, 5 pages.
Webster's New Collegiate Dictionary, Merriam Co., 1981, 5 pages.
Webster's New Collegiate Dictionary, Merriam Co., 1981, 4 pages.
The Oxford American Dictionary and Language Guide, Oxford University Press, 1999, 5 pages.
The Oxford Duden German Dictionary, Edited by the Dudenredaktion and the German Section of the Oxford University Press, W. Scholze-Stubenrecht et al. (Eds), Clarendon Press, Oxford, 1990, 7 pages.
Oxford Dictionary of Computing, Oxford University Press, 2008, 4 pages.
Modern Dictionary of Electronics, Sixth Edition Revised and Updated, Rudolf F. Graf (Ed.), Butterworth-Heinemann, 1997, 7 pages.
Modern Dictionary of Electronics, Sixth Edition Revised and Updated, Rudolf F. Graf (Ed.), Butterworth-Heinemann, 1997, 5 pages.
Garner's Modern American Usage, Bryan A. Garner (Ed.), Oxford University Press, 2003, 3 pages.
The New Fowler's Modern English Usage, R.W. Burchfield (Ed.), Oxford University Press, 2000, 3 pages.
Wikipedia, the free encyclopedia, "Granularity", at http://en.wikipedia.org/wiki/Granularity, Jun. 18, 2010, 4 pages.
Wordsmyth, The Premier Educational Dictionary-Thesaurus, at http://www.wordsmyth.net, "communication", Jun. 18, 2010, 1 page.
Yahoo! Education, "affect", at http://education.yahoo.com/reference/dictionary/entry/affect, Jun. 18, 2010, 2 pages.
mPulse Living Language, "high-level", at http://www.macmillandictionary.com/dictionary/american/high-level, Jun. 18, 2010, 1 page.
MSN Encarta, "regroup", at http://encarta.msn.com/encnet/features/dictionary/DictionaryResults.aspx?lextype=3&search=regroup, Jun. 17, 2010, 2 pages.
MSN Encarta, "synchronize", at http://encarta.msn.com/encnet/features/dictionary/DictionaryResults.aspx?lextype=3&search=synchronize, Jun. 17, 2010, 2 pages.
MSN Encarta, "pattern", at http://encarta.msn.com/encnet/features/dictionary/DictionaryResults.aspx?lextype=3&search=pattern, Jun. 17, 2010, 2 pages.
MSN Encarta, "dimension", at http://encarta.msn.com/encnet/features/dictionary/DictionaryResults.aspx?lextype=3&search=dimension, Jun. 17, 2010, 2 pages.
MSN Encarta, "communication", at http://encarta.msn.com/encnet/features/dictionary/DictionaryResults.aspx?lextype=3&search=communication, Jun. 17, 2010, 2 pages.
MSN Encarta, "arrangement", at http://encarta.msn.com/encnet/features/dictionary/DictionaryResults.aspx?lextype=3&search=arrangement, Jun. 17, 2010, 2 pages.
MSN Encarta, "vector", at http://encarta.msn.com/encnet/features/dictionary/DictionaryResults.aspx?lextype=3&search=vector, Jul. 30, 2010, 2 pages.
Dictionary.com, "address", at http://dictionary.reference.com/browse/address, Jun. 18, 2010, 4 pages.
P.R. 4-3 Joint Claim Constructions Statement, *PACT XPP Technologies, AG v. Xilinx, Inc. and Avnet, Inc et al.*, E.D. Texas, 2:07-cv-00563-CE, Jul. 19, 2010, pp. 1-50.
Order Granting Joint Motion for Leave to File An Amended Joint Claim Construction and Prehearing Statement and Joint Motion to File an Amended Joint Claim Construction and Prehearing Statement Pursuant to Local Patent Rule 4-3, and Exhibit A: P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, 72 pages.
P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 3, 2010, pp. 1-65.
Exhibit A—P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, pp. 1-66.
PACT's Opening Claim Construction Brief, *PACT XPP Technologies, AG v. Xilinx, Inc. and Avnet, Inc.*, E.D. Texas, 2:07-cv-00563-CE, Nov. 1, 2010, pp. 1-55.
Declaration of Harry L. (Nick) Tredennick in Support of PACT's Claim Constructions, *PACT XPP Technologies, AG v. Xilinx, Inc. and Avnet, Inc. et al.*, E.D. Texas, 2:07-cv-00563-CE, Nov. 1, 2010, pp. 1-87.
Transcript of Harry (Nick) L. Tredennick III, Ph.D., Oct. 11, 2010, vol. 1, Exhibit 16 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-3.
Agreed and Disputed Terms, Exhibit 17 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-16.
Oral Videotaped Deposition—Joseph McAlexander dated Oct. 12, 2010, vol. 1, Exhibit 18 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-17.
Expert Report of Joe McAlexander Re Claim Construction dated Sep. 27, 2010, Exhibit 19 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-112.
Documents from File History of U.S. Appl. No. 09/290,342, filed Apr. 12, 1999, Exhibit 20 of PACT's Opening Claim Construction

(56) References Cited

OTHER PUBLICATIONS

Brief, *PACT XPP Technologies, AG v. Xilinx, Inc. and Avnet, Inc. et al.*, E.D. Texas, 2:07-cv-00563-CE, Nov. 1, 2010, pp. 1-37.
Amendment from File History of U.S. Appl. No. 10/156,397, filed May 28, 2002, Exhibit 25 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.
Documents from File History U.S. Appl. No. 09/329,132, filed Jun. 9, 1999, Exhibit 27 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-36.
Amendment from File History of U.S. Appl. No. 10/791,501, filed Mar. 1, 2004, Exhibit 39 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-9.
Amendment from File History of U.S. Appl. No. 10/265,846, filed Oct. 7, 2002, Exhibit 40 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.
Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-55.
Declaration of Aaron Taggart in Support of Defendants Xilinx, Inc. and Avnet, Inc.'s Responsive Claim Construction Brief, Defendants Xilinx, Inc. and Avnet, Inc.'s Responsive Claim Construction Brief (Exhibit A), *PACT XPP Technologies, AG v. Xilinx, Inc. and Avnet, Inc. et al.*, E.D. Texas, 2:07-cv-00563-CE, Dec. 6, 2010, pp. 1-5.
Oral Videotaped Deposition Joseph McAlexander (Oct. 12, 2010), Exhibit 1 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-9.
Expert Report of Joe McAlexander re Claim Construction, Exhibit 2 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-137.
Various Documents from File History of U.S. Appl. No. 09/290,342, filed Apr. 12, 1999, Exhibit 6 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-181.
Transcript of Harry (Nick) L. Tredennick III, Ph.D., Oct. 11, 2010, vol. 1, Exhibit 7 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-28.
Amendment, Response from File History of U.S. Appl. No. 10/156,397, filed May 28, 2002, Exhibit 15 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-137.
Application from File History of U.S. Appl. No. 08/544,435, filed Nov. 17, 1995, Exhibit 20 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-102.
Documents from File History of U.S. Appl. No. 09/329,132, filed Jun. 9, 1999, Exhibit 24 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-13.
Documents from File History of U.S. Appl. No. 10/791,501, filed Mar. 1, 2004, Exhibit 25 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-14.
Amendment from File History of U.S. Appl. No. 11/246,617, filed Oct. 7, 2005, Exhibit 26 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-9.
Documents from File History of U.S. Appl. No. 08/947,254, filed Oct. 8, 1997, Exhibit 27 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-38.
Documents from File History of U.S. Appl. No. 08/947,254, filed Oct. 8, 1997, specifically, German priority application specification [English translation provided], Exhibit 33 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, 54 pages [including English translation].
Documents from File History of U.S. Appl. No. 09/335,974, filed Jun. 18, 1999, Exhibit 28 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-32.
Documents from File History of U.S. Patent Reexamination Control No. 90/010,450 (filed Mar. 27, 2009), Exhibit 30 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-71.
Documents from File History of U.S. Appl. No. 10/265,846, filed Oct. 7, 2002, Exhibit 32 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-23.
PACT's Claim Construction Reply Brief, *PACT XPP Technologies, AG v. Xilinx, Inc. and Avnet, Inc. et al.*, E.D. Texas, 2:07-cv-00563-CE, Jan. 7, 2011, pp. 1-20.
Defendants Xilinx, Inc. and Avnet, Inc.'s Claim Construction Surreply Brief, *PACT XPP Technologies, AG v. Xilinx, Inc. and Avnet, Inc. et al.*, E.D. Texas, 2:07-cv-00563-CE, Jan. 18, 2011, 142 pages.
Markman Hearing Minutes and Attorney Sign-In Sheet, *PACT XPP Technologies, AG v. Xilinx, Inc. and Avnet, Inc. et al.*, E.D. Texas, 2:07-cv-00563-CE, Feb. 22, 2011, 3 pages; and court transcript, 245 pages.
Memorandum Opinion and Order, *PACT XPP Technologies, AG v. Xilinx, Inc. and Avnet, Inc. et al.*, E.D. Texas, 2:07-cv-00563-CE, Jun. 17, 2011, pp. 1-71.
Atmel Corporation, Atmel 5-K-50K Gates Coprocessor FPGA and FreeRAM, (www.atmel.com), Apr. 2002 , pp. 1-68.
Glaskowsky, Peter N., "PACT Debuts Extreme Processor; Reconfigurable ALU Array Is Very Powerful—and Very Complex" Microprocessor, The Insider's Guide to Microprocessor Hardware, MicroDesign Resources—Microprocessor Report, Oct. 9, 2000 (www.MPRonline.com), 6 pages.
Glaskowsky, Peter N., "Analysis' Choice Nominees Named; Our Picks for 2002's Most Important Products and Technologies" Microprocessor, The Insider's Guide to Microprocessor Hardware, MicroDesign Resources—Microprocessor Report, Dec. 9, 2002 (www.MPRonline.com), 4 pages.
Lattice Semiconductor Corporation, ispLSI 2000E, 2000VE and 2000 VL Family Architectural Description, Oct. 2001, pp. 1-88.
Olukotun, K. et al., "Rationale, Design and Performance of the Hydra Multiprocessor," Computer Systems Laboratory, Stanford University, CA, Nov. 1994, pp. 1-19.
PACT Corporate Backgrounder, PACT company release, Oct. 2008, 4 pages.
Page, Ian., "Reconfigurable processor architectures," Oxford University Computing Laboratory, Oxford UK, Elsevier Science B.V., Microprocessors an Microsystems 20 (1996) pp. 185-196.
Singh, Hartej et al., "Morpho-Sys: A Reconfigurable Architecture for Multimedia Applications," Univ. of California, Irvine, CA and Federal University of Rio de Janeiro, Brazil, at http://www.eng.uci.edu/morphosys/docs/sbcci98.html, 10 pages.
Theodoridis, G. et al., "Chapter 2—A Survey of Coarse-Grain Reconfigurable Architectures and Cad Tools, Basic Definitions, Critical Design Issues and Existing Coarse-grain Reconfigurable

(56) References Cited

OTHER PUBLICATIONS

Systems," from S. Vassiliadis, and D. Soudris (eds.) *Fine- and Coarse-Grained Reconfigurable Computing*, Springer 2007, pp. 89-149.
Weinhardt, Markus et al., "Using Function Folding to Improve Silicon Efficiency of Reconfigurable Arithmetic Arrays," PACT XPP Technologies AG, Munich, Germany, IEEE 2004, pp. 239-245.
Xilinx, XC6200 Field Programmable Gate Arrays, Advance Product Specification, Jun. 1, 1996 (Version 1.0), pp. 4-255 through 4-286.
Xilinx, Virtex-II Platform FPGA User Guide, UG002 (V2.1) Mar. 28, 2007, pp. 1-502 [Parts 1-3].
Xilinx, XC4000E and SC4000X Serial Field Programmable Gate Arrays, Product Specification (Version 1.6), May 14, 1999, pp. 1-107.
Agarwal, A., et al., "APRIL: A Processor Architecture for Multiprocessing," Laboratory for Computer Science, MIT, Cambridge, MA, IEEE 1990, pp. 104-114.
Almasi and Gottlieb, *Highly Parallel Computing*, The Benjamin/Cummings Publishing Company, Inc., Redwood City, CA, 1989, 3 pages (Fig. 4.1).
Advanced RISC Machines Ltd (ARM), "AMBA—Advanced Microcontroller Bus Architecture Specification," (Document No. ARM IHI 0001C), Sep. 1995, 72 pages.
Alfke, Peter; New, Bernie, *Xilinx Application Note*, "Additional XC3000 Data," XAPP 024.000, 1994, pp. 8-11 through 8-20.
Alfke, Peter; New, Bernie, *Xilinx Application Note*, "Adders, Subtracters and Accumulators in XC3000," XAPP 022.000, 1994, pp. 8-98 through 8-104.
Alfke, Peter, *Xilinx Application Note*, "Megabit FIFO in Two Chips: One LCA Device and One DRAM," XAPP 030.000, 1994, pp. 8-148 through 8-150.
Alfke, Peter, *Xilinx Application Note*, "Dynamic Reconfiguration," XAPP 093, Nov. 10, 1997, pp. 13-45 through 13-46.
Alfke, Peter; New, Bernie, *Xilinx Application Note*, "Implementing State Machines in LCA Devices," XAPP 027.001, 1994, pp. 8-169 through 8-172.
Algotronix, Ltd., CAL64K Preliminary Data Sheet, Apr. 1989, pp. 1-24.
Algotronix, Ltd., CAL4096 Datasheet, 1992, pp. 1-53.
Algotronix, Ltd., CHS2x4 User Manual, "CHA2x4 Custom Computer," 1991, pp. 1-38.
Allaire, Bill; Fischer, Bud, *Xilinx Application Note*, "Block Adaptive Filter," XAPP 055, Aug. 15, 1996 (Version 1.0), pp. 1-10.
Altera Application Note (73), "Implementing FIR Filters in FLEX Devices," Altera Corporation, Feb. 1998, ver. 1.01, pp. 1-23.
Athanas, P. (Thesis), "An adaptive machine architecture and compiler for dynamic processor reconfiguration," Brown University 1992, pp. 1-157.
Berkeley Design Technology, Inc., *Buyer's Guide to DSP Processors*, 1995, Fremont, CA., pp. 673-698.
Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.
Camilleri, Nick; Lockhard, Chris, *Xilinx Application Note*, "Improving XC4000 Design Performance," XAPP 043.000, 1994, pp. 8-21 through 8-35.
Cartier, Lois, *Xilinx Application Note*, "System Design with New XC4000EX I/O Features," Feb. 21, 1996, pp. 1-8.
Chen, D., (Thesis) "Programmable arithmetic devices for high speed digital signal processing," U. California Berkeley 1992, pp. 1-175.
Churcher, S., et al., "The XC6200 FastMap TM Processor Interface," Xilinx, Inc., Aug. 1995, pp. 1-8.
Cowie, Beth, *Xilinx Application Note*, "High Performance, Low Area, Interpolator Design for the XC6200," XAPP 081, May 7, 1997 (Version 1.0), pp. 1-10.
Duncan, Ann, *Xilinx Application Note*, "A32x16 Reconfigurable Correlator for the XC6200," XAPP 084, Jul. 25, 1997 (Version 1.0), pp. 1-14.

Ebeling, C., et al., "RaPiD—Reconfigurable Pipelined Datapath," Dept. of Computer Science and Engineering, U. Washington, 1996, pp. 126-135.
Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.
Fawcett, B., "New SRAM-Based FPGA Architectures Address New Applications," Xilinx, Inc. San Jose, CA, Nov. 1995, pp. 231-236.
Goslin, G; Newgard, B, *Xilinx Application Note*, "16-Tap, 8-Bit FIR Filter Applications Guide," Nov. 21, 1994, pp. 1-5.
Iwanczuk, Roman, *Xilinx Application Note*, "Using the XC4000 RAM Capability," XAPP 031.000, 1994, pp. 8-127 through 8-138.
Knapp, Steven, "Using Programmable Logic to Accelerate DSP Functions," Xilinx, Inc., 1995, pp. 1-8.
New, Bernie, *Xilinx Application Note*, "Accelerating Loadable Counters in SC4000," XAPP 023.001, 1994, pp. 8-82 through 8-85.
New, Bernie, *Xilinx Application Note*, "Boundary Scan Emulator for XC3000," XAPP 007.001, 1994, pp. 8-53 through 8-59.
New, Bernie, *Xilinx Application Note*, "Ultra-Fast Synchronous Counters," XAPP 014.001, 1994, pp. 8-78 through 8-81.
New, Bernie, *Xilinx Application Note*, "Using the Dedicated Carry Logic in XC4000," XAPP 013.001, 1994, pp. 8-105 through 8-115.
New, Bernie, *Xilinx Application Note*, "Complex Digital Waveform Generator," XAPP 008.002, 1994, pp. 8-163 through 8-164.
New, Bernie, *Xilinx Application Note*, "Bus-Structured Serial Input-Output Device," XAPP 010.001, 1994, pp. 8-181 through 8-182.
Ridgeway, David, *Xilinx Application Note*, "Designing Complex 2-Dimensional Convolution Filters," XAPP 037.000, 1994, pp. 8-175 through 8-177.
Rowson, J., et al., "Second-generation compilers optimize semicustom circuits," Electronic Design, Feb. 19, 1987, pp. 92-96.
Schewel, J., "A Hardware/Software Co-Design System using Configurable Computing Technology," Virtual Computer Corporation, Reseda, CA, IEEE 1998, pp. 620-625.
Segers, Dennis, Xilinx Memorandum, "MIKE—Product Description and MRD," Jun. 8, 1994, pp. 1-29.
Texas Instruments, "TMS320C8x System-Level Synopsis," Sep. 1995, 75 pages.
Texas Instruments, "TMS320C80 Digital Signal Processor," Data Sheet, Digital Signal Processing Solutions 1997, 171 pages.
Texas Instruments, "TMS320C80 (MVP) Parallel Processor," User's Guide, Digital Signal Processing Products 1995, 73 pages.
Trainor, D.W., et al., "Implementation of the 2D DCT Using A Xilinx XC6264 FPGA," 1997, IEEE Workshop of Signal Processing Systems SiPS 97, pp. 541-550.
Trimberger, S, (Ed.) et al., "Field-Programmable Gate Array Technology," 1994, Kluwer Academic Press, pp. 1-258 (and the Title Page, Table of Contents, and Preface) [274 pages total].
Trimberger, S., "A Reprogrammable Gate Array and Applications," IEEE 1993, Proceedings of the IEEE, vol. 81, No. 7, Jul. 1993, pp. 1030-1041.
Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 To Microprocessors (TMS320C50 Example)," XAPP 064, Oct. 9, 1996 (Version 1.1), pp. 1-9.
Wilkie, Bill, *Xilinx Application Note*, "Interfacing XC6200 To Microprocessors (MC68020 Example)," XAPP 063, Oct. 9, 1996 (Version 1.1), pp. 1-8.
XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253-4-286.
*Xilinx Application Note*, "A Fast Constant Coefficient Multiplier for the XC6200," XAPP 082, Aug. 24, 1997 (Version 1.0), pp. 1-5.

(56) References Cited

OTHER PUBLICATIONS

Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.
ZILOG Preliminary Product Specification, "Z89120 Z89920 (ROM-less) 16-Bit Mixed Signal Processor," 1992, pp. 1-82.
Defendants' Invalidity Contentions in *PACT XPP Technologies, AG v. Xilinx, Inc., et al.*, (E.D. Texas Dec. 28, 2007) (No. 2:07cv563)., including Exhibits A through K in separate PDF files.
U.S. Reexamination Application Control No. 90/010,979, Vorbach et al., filed May 4, 2010.
U.S. Reexamination Application Control No. 90/011,087, Vorbach et al., filed Jul. 8, 2010.
U.S. Reexamination Application Control No. 90/010,450, Vorbach et al. filed Mar. 27, 2009.
U.S. Appl. No. 60/109,417, Jefferson et al., filed Nov. 18, 1998.
Abnous et al., "Ultra-Low-Power Domain-Specific Multimedia Processors," U.C. Berkeley, 1996 IEEE, pp. 461-470.
Abnous, A., et al., "The Pleiades Architecture," Chapter I of *The Application of Programmable DSPs in Mobile Communications*, A. Gatherer and A. Auslander, Ed., Wiley, 2002, pp. 1-33.
Ade, et al., "Minimum Memory Buffers in DSP Applications," Electronics Letters, vol. 30, No. 6, Mar. 17, 1994, pp. 469-471.
Advanced RISC Machines, "Introduction to AMBA," Oct. 1996, Section 1, pp. 1-7.
ARM, "The Architecture for the Digital World," http://www.arm.com/products/ Mar. 18, 2009, 3 pages.
ARM, "The Architecture for the Digital World; Milestones," http://www.arm.com/aboutarm/milestones.html Mar. 18, 2009, 5 pages.
ARM Limited, "ARM Architecture Reference Manual," Dec. 6, 2000, pp. A10-6-A10-7.
Albaharna, O.T. et al., "On the Viability of FPGA-Based Integrated Coprocessors," Dept. of Electrical and Electronic Engineering, Imperial College of Science, London, 1999 IEEE, pp. 206-215.
Alippi, et al., "Determining the Optimum Extended Instruction Set Architecture for Application Specific Reconfigurable VLIW CPUs," IEEE, 2001, pp. 50-56.
Altera, "Flex 8000 Programmable Logic Device Family," Altera Corporation Data Sheet, Jan. 2003, pp. 1-62.
Altera, "Flex 10K Embedded Programmable Logic Device Family," Altera Corporation Data Sheet, Jan. 2003, pp. 1-128.
Altera, "APEX 20K Programmable Logic Device Family," Altera Corporation Data Sheet, Mar. 2004, ver. 5.1, pp. 1-117.
Altera, "2. TriMatrix Embedded Memory Blocks in Stratix & Stratix GX Devices," Altera Corporation, Jul. 2005, 28 pages.
Altera, "APEX II Programmable Logic Device Family," Altera Corporation Data Sheet, Aug. 2002, Ver. 3.0, 99 pages.
Arabi, et al., "PLD Integrates Dedicated High-speed Data Buffering, Complex State machine, and Fast Decode Array," conference record on WESCON '93, Sep. 28, 1993, pp. 432-436.
Asari, K. et al., "FeRAM circuit technology for system on a chip," *Proceedings First NASA/DoD Workshop on Evolvable Hardware* (1999), pp. 193-197.
Athanas, "A Functional Reconfigurable Architecture and Compiler for Adoptive Computing," IEEE 1993, pp. 49-55.
Athanas, et al., "An Adaptive Hardware Machine Architecture and Compiler for Dynamic Processor Reconfigugation," IEEE, Laboratory for Engineering man/Machine Systems Division of Engineering, Box D, Brown University, Providence, Rhode Island, 1991, pp. 397-400.
Athanas et al., "Processor Reconfiguration Through Instruction-Set Metamorphosis," 1993, IEEE Computers, pp. 11-18.
Atmel, 5-K-50K Gates Coprocessor FPGA with Free Ram, Data Sheet, Jul. 2006, 55 pages.
Atmel, FPGA-based FIR Filter Application Note, Sep. 1999, 10 pages.
Atmel, "An Introduction to DSP Applications using the AT40K FPGA," FPGA Application Engineering, San Jose, CA, Apr. 2004, 15 pages.
Atmel, Configurable Logic Design & Application Book, Atmel Corporation, 1995, pp. 2-19 through 2-25.
Atmel, Field Programmable Gate Array Configuration Guide, AT6000 Series Configuration Data Sheet, Sep. 1999, pp. 1-20.
Bacon, D. et al., "Compiler Transformations for High-Performance Computing," ACM Computing Surveys, 26(4):325-420 (1994).
Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.
Ballagh et al., "Java Debug Hardware Models Using JBits," $8^{th}$ Reconfigurable Architectures Workshop, 2001, 8 pages.
Baumgarte, V. et al., "PACT XPP—A Self-reconfigurable Data Processing Architecture," PACT Info. GMBH, Munchen Germany, 2001, 7 pages.
Beck et al., "From control flow to data flow," TR 89-1050, Oct. 1989, Dept. of Computer Science, Cornell University, Ithaca, NY, pp. 1-25.
Becker, J., "A Partitioning Compiler for Computers with Xputer-based Accelerators," 1997, Kaiserslautern University, 326 pp.
Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003), 6 pages.
Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002), 6 pages.
Becker et al., "Automatic Parallelism Exploitation for FPL-Based Accelerators," 1998, Proc. $31^{st}$ Annual Hawaii International Conference on System Sciences, pp. 169-178.
Becker, J. et al., "Parallelization in Co-compilation for Configurable Accelerators—a Host/accelerator Partitioning Compilation Method," Proceedings of Asia and South Pacific Design Automation Conference, Yokohama, Japan, Feb. 10-13, 1998, 11 pages.
Bellows et al., "Designing Run-Time Reconfigurable Systems with JHDL," Journal of VLSI Signal Processing 28, Kluwer Academic Publishers, The Netherlands, 2001, pp. 29-45.
Bittner, "Wormhole Run-time Reconfiguration: Conceptualization and VLSI Design of a High Performance Computing System," *Dissertation*, Jan. 23, 1997, pp. I-XX, 1-415.
"BlueGene/L—Hardware Architecture Overview," BlueGene/L design team, IBM Research, Oct. 17, 2003 slide presentation, pp. 1-23.
"BlueGene/L: the next generation of scalable supercomputer," Kissel et al., Lawrence Livermore National Laboratory, Livermore, California, Nov. 18, 2002, 29 pages.
BlueGene Project Update, Jan. 2002, IBM slide presentation, 20 pages.
BlueGene/L, "An Overview of the BlueGene/L Supercomputer," The BlueGene/L Team, IBM and Lawrence Livermore National Laboratory, 2002 IEEE. pp. 1-22.
Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.
Cadambi, et al., "Managing Pipeline-reconfigurable FPGAs," ACM, 1998, pp. 55-64.
Callahan, et al., "The Garp Architecture and C Compiler," Computer, Apr. 2000, pp. 62-69.
Cardoso, J.M.P., et al., "A novel algorithm combining temporal partitioning and sharing of functional units," University of Algarve, Faro, Portugal, 2001 IEEE, pp. 1-10.
Cardoso, Joao M.P., and Markus Weinhardt, "XPP-VC: A C Compiler with Temporal Partitioning for the PACT-XPP Architecture," Field-Programmable Logic and Applications. Reconfigurable Computing is Going Mainstream, $12^{th}$ International Conference FPL

(56) References Cited

OTHER PUBLICATIONS

2002, Proceedings (Lecture Notes in Computer Science, vol. 2438) Springer-Verlag Berlin, Germany, 2002, pp. 864-874.

Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and English Abstract only).

Cardoso, J.M.P., et al., "Compilation and Temporal Partitioning for a Coarse-Grain Reconfigurable Architecture," New Algorithms, Architectures and Applications for Reconfigurable Computing, Lysacht, P. & Rosentiel, W. eds., (2005) pp. 105-115.

Cardoso, J.M.P., et al., "Macro-Based Hardware Compilation of Java™ Bytecodes into a Dynamic Reconfigurable Computing System," IEEE, Apr. 21, 1999, pp. 2-11.

Chaudhry, G.M. et al., "Separated caches and buses for multiprocessor system," Circuits and Systems, 1993; Proceedings of the $36^{th}$ Midwest Symposium on Detroit, MI, USA, Aug. 16-18, 1993, New York, NY IEEE, Aug. 16, 1993, pp. 1113-1116, XP010119918 ISBN: 0-7803-1760-2.

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Compton, K., et al., "Configurable Computing: A Survey of Systems and Software," Northwestern University, Dept. of ECE, Technical Report, 1999, (XP-002315148), 39 pages.

Cook, Jeffrey J., "The Amalgam Compiler Infrastructure," Thesis at the University of Illinois at Urbana-Champaign (2004) Chapter 7 & Appendix G.

Cronquist, D., et al., "Architecture Design of Reconfigurable Pipelined Datapaths," Department of Computer Science and Engineering, University of Washington, Seattle, WA, Proceedings of the $20^{th}$ Anniversary Conference on Advanced Research in VSLI, 1999, pp. 1-15.

Culler, D.E; Singh, J.P., "Parallel Computer Architecture," pp. 434-437, 1999, Morgan Kaufmann, San Francisco, CA USA, XP002477559.

Culler, D.E; Singh, J.P., "Parallel Computer Architecture," p. 17, 1999, Morgan Kaufmann, San Francisco, CA USA, XP002477559.

DeHon, A., "DPGA Utilization and Application," MIT Artificial Intelligence Laboratory, Proceedings of the Fourth International ACM Symposium on Field-Programmable Gate Arrays (FPGA 1996), IEEE Computer Society, pp. 1-7.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.

Del Corso et al., "Microcomputer Buses and Links," Academic Press Inc. Ltd., 1986, pp. 138-143, 277-285.

Diniz, P., et al., "Automatic Synthesis of Data Storage and Control Structures for FPGA-based Computing Engines," 2000, IEEE, pp. 91-100.

Diniz, P., et al., "A behavioral synthesis estimation interface for configurable computing," University of Southern California, Marina Del Rey, CA, 2001 IEEE, pp. 1-2.

Donandt, "Improving Response Time of Programmable Logic Controllers by use of a Boolean Coprocessor," AEG Research Institute Berlin, IEEE, 1989, pp. 4-167-4-169.

Dutt, et al., "If Software is King for Systems-in-Silicon, What's New in Compilers?" IEEE, 1997, pp. 322-325.

Ebeling, C., et al., "Mapping Applications to the RaPiD Configurable Architecture," Department of Computer Science and Engineering, University of Washington, Seattle, WA, *FPGAs for Custom Computing Machines*, 1997. *Proceedings., The 5th Annual IEEE Symposium*, Publication Date: Apr. 16-18, 1997, 10 pages.

Equator, Pixels to*Packets, Enabling Multi-Format High Definition Video, Equator Technologies BSP-15 Product Brief, www.equator.com, 2001, 4 pages.

Fawcett, B.K., "Map, Place and Route: The Key to High-Density PLD Implementation," Wescon Conference, IEEE Center (Nov. 7, 1995) pp. 292-297.

Ferrante, J., et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.

Fornaciari, et al., System-level power evaluation metrics, 1997 Proceedings of the $2^{nd}$ Annual IEEE International Conference on Innovative Systems in Silicon, New York, NY, Oct. 1997, pp. 323-330.

Forstner, "Wer Zuerst Kommt, Mahlt Zuerst!: Teil 3: Einsatzgebiete und Anwendungbeispiele von FIFO-Speichern," Elektronik, Aug. 2000, pp. 104-109.

Franklin, Manoj, et al., "A Fill-Unit Approach to Multiple Instruction Issue," Proceedings of the Annual International Symposium on Microarchitecture, Nov. 1994, pp. 162-171.

Freescale Slide Presentation, An Introduction to Motorola's RCF (Reconfigurable Compute Fabric) Technology, Presented by Frank David, Launched by Freescale Semiconductor, Inc., 2004, 39 pages.

Galanis, M.D. et al., "Accelerating Applications by Mapping Critical Kernels on Coarse-Grain Reconfigurable Hardware in Hybrid Systems," Proceedings of the $13^{th}$ Annual IEEE Symposium on Field-Programmable Custom Computing Machines, 2005, 2 pages.

Genius, D., et al., "A Case for Array Merging in Memory Hierarchies," Proceedings of the 9th International Workshop on Compilers for Parallel Computers, CPC'01 (Jun. 2001), 10 pages.

Gokhale, M.B., et al., "Automatic Allocation of Arrays to Memories in FPGA processors with Multiple Memory Banks," Field-Programmable Custom Computing Machines, 1999, IEEE, pp. 63-69.

Guccione et al., "JBits: Java based interface for reconfigurable computing," Xilinx, Inc., San Jose, CA, 1999, 9 pages.

Guo, Z. et al., "A Compiler Intermediate Representation for Reconfigurable Fabrics," University of California, Riverside, Dept. of Electrical Engineering, IEEE 2006, 4 pages.

Gwennap, Linley, "P6 Underscores Intel's Lead," Microprocessor Report, vol. 9., No. 2, Feb. 16, 1995 (MicroDesign Resources), p. 1 and pp. 6-15.

Gwennap, Linley, "Intel's P6 Bus Designed for Multiprocessing," Microprocessor Report, vol. 9, No. 7 (MicroDesign Resources), May 30, 1995, p. 1 and pp. 6-10.

Hammes, Jeff, et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hartenstein, R. et al., "A new FPGA architecture for word-oriented datapaths," Proc. FPL'94, Springer LNCS, Sep. 1994, pp. 144-155.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hartenstein et al., "Parallelizing Compilation for a Novel Data-Parallel Architecture," 1995, PCAT-94, Parallel Computing: Technology and Practice, 13 pp.

Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.

Hastie et al., "The implementation of hardware subroutines on field programmable gate arrays," Custom Integrated Circuits Conference, 1990, Proceedings of the IEEE 1990, May 16, 1990, pp. 31.3.1-31. 4.3 (3 pages).

Hauck, "The Roles of FPGAs in Reprogrammable Systems," IEEE, Apr. 1998, pp. 615-638.

Hauser, J.R., et al., "Garp: A MIPS Processor with a Reconfigurable Coprocessor," University of California, Berkeley, IEEE, Apr. 1997, pp. 12-23.

(56) References Cited

OTHER PUBLICATIONS

Hauser, John Reid, (Dissertation) "Augmenting A Microprocessor with Reconfigurable Hardware," University of California, Berkeley, Fall 2000, 255 pages. (submitted in 3 PDFs, Parts 1-3).
Hauser, John R., "The Garp Architecture," University of California at Berkeley, Computer Science Division, Oct. 1997, pp. 1-55.
Hedge, S.J., "3D WASP Devices for On-line Signal and Data Processing," 1994, International Conference on Wafer Scale Integration, pp. 11-21.
Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.
Huang, Libo et al., "A New Architecture for Multiple-Precision Floating-Point Multiply-Add Fused Unit Design," School of Computer National University of Defense Technology, China, IEEE 2007, 8 pages.
Hwang, K., "Advanced Computer Architecture—Parallelism, Scalability, Programmability," 1993, McGraw-Hill, Inc., pp. 348-355.
Hwang, K., "Computer Architecture and Parallel Processing," Data Flow Computers and VLSI Computations, XP-002418655, 1985 McGraw-Hill, Chapter 10, pp. 732-807.
Hwang, L., et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.
IBM Technical Disclosure Bulletin, IBM Corp., New York, XP000424878, Bd. 36, Nr. 11, Nov. 1, 1993, pp. 335-336.
"IEEE Standard Test Access Port and Boundary-Scan Architecture," IEEE Std. 1149.1-1990, 1993, pp. 1-127.
IMEC, "ADRES multimedia processor & 3MF multimedia platform," Transferable IP, IMEC Technology Description, (Applicants believe the date to be Oct. 2005), 3 pages.
Intel, "Pentium Pro Family Developer's Manual, vol. 3: Operating System Writer's Guide," Intel Corporation, Dec. 1995, [submitted in 4 PDF files: Part I, Part II, Part III and Part IV], 458 pages.
Intel, Intel MXP5800/MXP5400 Digital Media Processors, Architecture Overview, Jun. 2004, Revision 2.4, pp. 1-24.
Inside DSP, "Ambric Discloses Massively Parallel Architecture," Aug. 23, 2006, http://www.insidedsp.com/Articles/tabid/64/articleType/ArticleView/articleId/155/Default.aspx, 2 pages.
Iseli, C., et al. "A C++ Compiler for FPGA Custom Execution Units Synthesis," IEEE, 1995, pp. 173-179.
Isshiki, Tsuyoshi, et al., "Bit-Serial Pipeline Synthesis for Multi-FPGA Systems with C++ Design Capture," 1996 IEEE, pp. 38-47.
Jacob, J., et al., "Memory Interfacing and Instruction Specification for Reconfigurable Processors," ACM Feb. 1999, pp. 145-154.
Jantsch, Axel et al., "A Case Study on Hardware/Software Partitioning," Royal Institute of Technology, Kista, Sweden, Apr. 10, 1994, IEEE, pp. 111-118.
Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.
Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.
John, L., et al., "A Dynamically Reconfigurable Interconnect for Array Processors," vol. 6, No. 1, Mar. 1998, IEEE, pp. 150-157.
Kanter, David, "NVIDIA's GT200: Inside a Parallel Processor," http://www.realworldtech.com/page.cfm?ArticleID=RWT090989195242&p=1, Sep. 8, 2008, 27 pages.
Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.
Kaul, M., et al.; "An automated temporal partitioning and loop fission approach of FPGA based reconfigurable synthesis of DSP applications," University of Cincinnati, Cincinnati, OH, ACM 1999, pp. 616-622.

Kean, T.A., "Configurable Logic: A Dynamically Programmable Cellular Architecture and its VLSI Implementation," University of Edinburgh (Dissertation) 1988, pp. 1-286. [in two PDFs, Pt.1 and Pt.2.].
Kean, T., et al., "A Fast Constant Coefficient Multiplier for the XC6200," Xilinx, Inc., Lecture Notes in Computer Science, vol. 1142, Proceedings of the $6^{th}$ International Workshop of Field-Programmable Logic, 1996, 7 pages.
Kim et al., "A Reconfigurable Multifunction Computing Cache Architecture," IEEE Transactions on Very Large Scale Integration (VLSI) Systems vol. 9, Issue 4, Aug. 2001 pp. 509-523.
Knittel, Gunter, "A PCI-compatible FPGA-Coprocessor for 2D/3D Image Processing," University of Turgingen, Germany, 1996 IEEE, pp. 136-145.
Koch, A., et al., "Practical Experiences with the SPARXIL Co-Processor," 1998, IEEE, pp. 394-398.
Koch, Andreas et al., "High-Level-Language Compilation for Reconfigurable Computers," Proceedings of European Workshop on Reconfigurable Communication-Centric SOCS (Jun. 2005) 8 pages.
Koren et al., "A data-driven VLSI array for arbitrary algorithms," IEEE Computer Society, Long Beach, CA vol. 21, No. 10, Oct. 1, 1988, pp. 30-34.
Kung, "Deadlock Avoidance for Systolic Communication," 1988 Conference Proceedings of the $15^{th}$ Annual International Symposium on Computer Architecture, May 30, 1998, pp. 252-260.
Lange, H. et al., "Memory access schemes for configurable processors," Field-Programmable Logic and Applications, International Workshop, FPL, Aug. 27, 2000, pp. 615-625, XP02283963.
Larsen, S., et al., "Increasing and Detecting Memory Address Congruence," Proceedings of the 2002 IEEE International Conference on Parallel Architectures and Compilation Techniques (PACT'02), pp. 1-12 (Sep. 2002).
Lee et al., "A new distribution network based on controlled switching elements and its applications," IEEE/ACT Trans. of Networking, vol. 3, No. 1, pp. 70-81, Feb. 1995.
Lee, Jong-eun, et al., "Reconfigurable ALU Array Architecture with Conditional Execution," International Soc. Design Conference (ISOOC) [online] Oct. 25, 2004, Seoul, Korea, 5 pages.
Lee, R. B., et al., "Multimedia extensions for general-purpose processors," *IEEE Workshop on Signal Processing Systems, SIPS 97—Design and Implementation* (1997), pp. 9-23.
Lee, Ming-Hau et al., "Design and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.
Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.
Ling, X., "WASMII: An MPLD with Data-Driven Control on a Virtual Hardware," Journal of Supercomputing, Kluwer Acdemic Publishers, Dordrecht, Netherlands, 1995, pp. 253-276.
Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317.
Mano, M.M., "Digital Design," by Prentice Hall, Inc., Englewood Cliffs, New Jersey 07632, 1984, pp. 119-125, 154-161.
Margolus, N., "An FPGA architecture for DRAM-based systolic computations," Boston University Center for Computational Science and MIT Artificial Intelligence Laboratory, IEEE 1997, pp. 2-11.
Maxfield,C., "Logic that Mutates While-U-Wait," EDN (Bur. Ed) (USA), EDN (European Edition), Nov. 7, 1996, Cahners Publishing, USA, pp. 137-140, 142.
Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).
Mei, Bingfeng et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

(56) References Cited

OTHER PUBLICATIONS

Mei, Bingfeng et al., "Adres: An Architecture with Tightly Coupled VLIW Processor and Coarse-Grained Reconfigurable Matrix," Proc. *Field-Programmable Logic and Applications* (FPL 03), Springer, 2003, pp. 61-70.
Melvin, Stephen et al., "Hardware Support for Large Atomic Units in Dynamically Scheduled Machines," Computer Science Division, University of Califormia, Berkeley, IEEE (1988), pp. 60-63.
Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.
Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.
Miyamori, T., et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.
Moraes, F., et al., "A Physical Synthesis Design Flow Based on Virtual Components," XV Conference on Design of Circuits and Integrated Systems (Nov. 2000) 6 pages.
Muchnick, S., "Advanced Compiler Design and Implementation," (Morgan Kaufmann 1997), Table of Contents, 11 pages.
Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.
Myers, G. "Advances in Computer Architecture," Wiley-Interscience Publication, 2nd ed., John Wiley & Sons, Inc., 1978, pp. 463-494.
Nageldinger, U., "Design-Space Exploration for Coarse Grained Reconfigurable Architectures," (Dissertation) Universitaet Kaiserslautern, 2000, Chapter 2, pp. 19-45.
Neumann, T., et al., "A Generic Library for Adaptive Computing Environments," Field Programmable Logic and Applications, 11$^{th}$ International Conference, FPL 2001, Proceedings (Lecture Notes in Computer Science, vol. 2147) (2001) pp. 503-512.
Nilsson, et al., "The Scalable Tree Protocol—A Cache Coherence Approaches for Large-Scale Multiprocessors," IEEE, pp. 498-506, Dec. 1992.
Norman, R.S., "Hyperchip Business Summary, The Opportunity," Jan. 31, 2000, pp. 1-3.
Ohmsha, "Information Processing Handbook," edited by the Information Processing Society of Japan, pp. 376, Dec. 21, 1998.
Olukotun, K., "The Case for a Single-Chip Microprocessor," ACM Sigplan Notices, ACM, Association for Computing Machinery, New York, vol. 31, No. 9, Sep. 1996 pp. 2-11.
Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.
PACT Corporation, "The XPP Communication System," Technical Report 15 (2000), pp. 1-16.
Parhami, B., "Parallel Counters for Signed Binary Signals," Signals, Systems and Computers, 1989, Twenty-Third Asilomar Conference, vol. 1, pp. 513-516.
PCI Local Bus Specification, Production Version, Revision 2.1, Portland, OR, Jun. 1, 1995, pp. 1-281.
Piotrowski, A., "IEC-BUS, Die Funktionsweise des IEC-Bus unde seine Anwendung in Geräten und Systemen," 1987, Franzis-Verlag GmbH, München, pp. 20-25. [English Abstract Provided].
Pirsch, P. et al., "VLSI implementations of image and video multimedia processing systems," *IEEE Transactions on Circuits and Systems for Video Technology*, vol. 8, No. 7, Nov. 1998, pp. 878-891.
Price et al., "Debug of Reconfigurable Systems," Xilinx, Inc., San Jose, CA, Proceedings of SPIE, 2000, pp. 181-187.
Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.
Razdan et al., A High-Performance Microarchitecture with Hardware-Programmable Functional Units, Micro-27, Proceedings of the 27$^{th}$ Annual International Symposium on Microarchitecture, IEEE Computer Society and Association for Computing Machinery, Nov. 30-Dec. 2, 1994, pp. 172-180.
Roterberg, Eric., et al., "Trace Cache: a Low Latency Approach to High Bandwidth Instruction Fetching," Proceedings of the 29$^{th}$ Annual Internatinoal Symposium on Michoarchitecture, Paris, France, IEEE (1996), 12 pages.
Ryo, A., "Auszug aus Handbuch der Informationsverarbeitung," ed. Information Processing Society of Japan, *Information Processing Handbook, New Edition*, Software Information Center, Ohmsha, Dec. 1998, 4 pages. [Translation provided].
Saleeba, Z.M.G., "A Self-Reconfiguring Computer System," Department of Computer Science, Monash University (Dissertation) 1998, pp. 1-306.
Saleeba, M. "A Self-Contained Dynamically Reconfigurable Processor Architecture," Sixteenth Australian Computer Science Conference, ASCS-16, QLD, Australia, Feb. 1993, pp. 59-70.
Salefski, B. et al., "Re-configurable computing in wireless," *Annual ACM IEEE Design Automation Conference: Proceedings of the 38$^{th}$ conference on Design automation* (2001) pp. 178-183.
Schmidt, H. et al., "Behavioral synthesis for FGPA-based computing," Carnegie Mellon University, Pittsburgh, PA, 1994 IEEE, pp. 125-132.
Schmidt, U. et al., "Datawave: A Single-Chip Multiprocessor for Video Applications," *IEEE Micro*, vol. 11, No. 3, May/Jun. 1991, pp. 22-25, 88-94.
Schmit, et al., "Hidden Markov Modeling and Fuzzy Controllers in FPGAs, FPGAs for Custom Computing Machines," 1995; Proceedings, IEEE Symposium in Napa Valley, CA, Apr. 1995, pp. 214-221.
Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, ( Oct. 1, 1995) vol. 11(1/2), pp. 51-74.
Shin, D., et al., "C-based Interactive RTL Design Methodology," Technical Report CECS-03-42 (Dec. 2003) pp. 1-16.
Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.
Short, Kenneth L., *Microprocessors and Programmed Logic*, Prentice Hall, Inc., New Jersey 1981, p. 34.
Siemers, C., "Rechenfabrik Ansaetze Fuer Extrem Parallele Prozessoren," Verlag Heinze Heise GmbH., Hannover, DE No. 15, Jul. 16, 2001, pp. 170-179.
Siemers et al., "The .>S<puter: A Novel Micoarchitecture Model for Execution inside Superscalar and VLIW Processors Using Reconfigurable Hardware," Australian Computer Science Communications, vol. 20, No. 4, Computer Architecture, Proceedings of the 3$^{rd}$ Australian Computer Architecture Conference, Perth, John Morris, Ed., Feb. 2-3, 1998, pp. 169-178.
Simunic, et al., Source Code Optimization and Profiling of Energy Consumation in Embedded Systems, Proceedings of the 13$^{th}$ International Symposium on System Synthesis, Sep. 2000, pp. 193-198.
Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.
Skokan, Z.E., "Programmable logic machine (A programmable cell array)," IEEE Journal of Solid-State Circuits, vol. 18, Issue 5, Oct. 1983, pp. 572-578.
Sondervan, J., "Retiming and logic synthesis," Electronic Engineering (Jan. 1993) vol. 65(793), pp. 33, 35-36.
Soni, M., "VLSI Implementation of a Wormhole Run-time Reconfigurable Processor," Jun. 2001, (Masters Thesis)Virginia Polytechnic Institute and State University, 88 pages.

(56) References Cited

OTHER PUBLICATIONS

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].
Sundararajan et al., "Testing FPGA Devices Using JBits," Proc. MAPLD 2001, Maryland, USA, Katz (ed.), NASA, CA, 8 pages.
Sutton et al., "A Multiprocessor DSP System Using PADDI-2," U.C. Berkeley, 1998 ACM, pp. 62-65.
Tau, E., et al., "A First Generation DPGA Implementation," *FPD '95*, pp. 138-143.
Tenca, A.F., et al., "A Variable Long-Precision Arithmetic Unit Design for Reconfigurable Coprocessor Architectures," University of California, Los Angeles, 1998, pp. 216-225.
The XPP White Paper, Release 2.1, PACT—A Technical Perspective, Mar. 27, 2002, pp. 1-27.
TMS320C54X DSP: CPU and Peripherals, Texas Instruments, 1996, 25 pages.
TMS320C54x DSP: Mnemonic Instruction Set, Texas Instruments, 1996, 342 pages.
Tsutsui, A., et al., "YARDS: FPGA/MPU Hybrid Architecture for Telecommunication Data Processing," NTT Optical Network Systems Laboratories, Japan, 1997 ACM, pp. 93-99.
Vasell et al., "The Function Processor: A Data-Driven Processor Array for Irregular Computations," Chalmers University of Technology, Sweden, 1992, pp. 1-21.
Venkatachalam et al., "A highly flexible, distributed multiprocessor architecture for network processing," Computer Networks, The International Journal of Computer and Telecommunications Networking, vol. 41, No. 5, Apr. 5, 2003, pp. 563-568.
Villasenor, et al., "Configurable Computing Solutions for Automatic Target Recognition," *IEEE*, 1996 pp. 70-79.
Villasenor, et al., "Configurable Computing," *Scientific American*, vol. 276, No. 6, Jun. 1997, pp. 66-71.
Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.
Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.
Waingold, E., et al., "Baring it all to software: Raw machines," IEEE Computer, Sep. 1997, at 86-93.
Webster's Ninth New Collegiate Dictionary, Merriam-Webster, Inc., 1990, p. 332 (definition of "dedicated").
Weinhardt, M., "Compilation Methods for Structure-programmable Computers," dissertation, ISBN 3-89722-011-3, 1997. [Table of Contents and English Abstract Provided].
Weinhardt, Markus et al., "Pipeline Vectorization for Reconfigurable Systems," 1999, IEEE, pp. 52-62.
Weinhardt, Markus et al., "Pipeline Vectorization," IEEE Transactions on Computer-Aided Design of Integrated Circuits and Systems, vol. 20, No. 2, Feb. 2001, pp. 234-248.
Weinhardt, Markus et al., "Memory Access Optimization for Reconfigurable Systems," IEEE Proceedings Computers and Digital Techniques, 48(3) (May 2001) pp. 1-16.
Wittig, et al., "OneChip: An FPGA Processor with Reconfigurable Logic," IEEE, 1996, pp. 126-135.
Wolfe, M. et al., "High Performance Compilers for Parallel Computing," (Addison-Wesley 1996) Table of Contents, 11 pages.
Wu, et al., "A New Cache Directory Scheme," IEEE, pp. 466-472, Jun. 1996.
Xilinx, "Logic Cell Array Families: XC4000, XC4000A and XC4000H," 1994, product description, pp. 2-7, 2-9, 2-14, 2-15, 8-16, and 9-14.
Xilinx, "The Programmable Logic Data Book," 1994, Section 2, pp. 1-231, Section 8, pp. 1, 23-25, 29, 45-52, 169-172.
Xilinx, "Spartan and SpartanXL Families Field Programmable Gate Arrays," Jan. 1999, Xilinx, pp. 4-3 through 4-70.
Xilinx, "XC6200 Field Programmable Gate Arrays," Apr. 24, 1997, Xilinx product description, pp. 1-73.
Xilinx, "XC3000 Series Field Programmable Gate Arrays," Nov. 6, 1998, Xilinx product description, pp. 1-76.
Xilinx, "XC4000E and XC4000X Series Field Programmable Gate Arrays," May 14, 1999, Xilinx product description, pp. 1-68.
Xilinx, "Virtex-E 1.8 V Extended Memory Field Programmable Gate Arrays," (v1.5) Jul. 17, 2002, Xilinx Production Product Specification, pp. 1-118.
Xilinx, "Virtex-E 1.8 V Extended Memory Field Programmable Gate Arrays," (v2.2) Sep. 10, 2002, Xilinx Production Product Specification, pp. 1-52.
Xilinx, "Virtex-II and Virtex-II Pro X FPGA User Guide," Mar. 28, 2007, Xilinx user guide, pp. 1-559.
Xilinx, "Virtex-II and Virtex-II Pro X FPGA Platform FPGAs: Complete Data Sheet," (v4.6) Mar. 5, 2007, pp. 1-302.
Xilinx, "Virtex-II Platform FPGAs: Complete Data Sheet," (v3.5) Nov. 5, 2007, pp. 1-226.
Xilinx, White Paper 370: (Virtex-6 and Spartan-6 FPGA Families) "Reducing Switching Power with Intelligent Clock Gating," Frederic Rivoallon, May 3, 2010, pp. 1-5.
Xilinx, White Paper 298: (Spartan-6 and Virtex-6 Devices) "Power Consumption at 40 and 50 nm," Matt Klein, Apr. 13, 2009, pp. 1-21.
Xu, H. et al., "Parallel QR Factorization on a Block Data Flow Architecture," Conference Proceeding Article, Mar. 1, 1992, pp. 332-336.
Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.
Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.
Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.
Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.
Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.
Zhang et al., "Abstract: Low-Power Heterogeneous Reconfigurable Digital Signal Processors with Energy-Efficient Interconnect Network," U.C. Berkeley (2004), pp. 1-120.
Zima, H. et al., "Supercompilers for parallel and vector computers," (Addison-Wesley 1991) Table of Contents, 5 pages.
Xilinx, Inc.'s and Avnet, Inc.'s Disclosure Pursuant to P.R. 4-2; *PACT XPP Technologies, AG. V. Xilinx, Inc.* and *Avnet, Inc.*, Case No. 2:07-cv-00563-TJW-CE, U.S. District Court for the Eastern District of Texas, Dec. 28, 2007, 4 pages.
Xilinx, Inc.'s and Avnet, Inc.'s Disclosure Pursuant to P.R. 4-1; *PACT XPP Technologies, AG. V. Xilinx, Inc.* and *Avnet, Inc.*, Case No. 2:07-cv-00563-TJW-CE, U.S. District Court for the Eastern District of Texas, Dec. 28, 2007, 9 pages.
Defendant's Claim Construction Chart for P.R. 4-2 Constructions and Extrinsic Evidence for Terms Proposed by Defendants, *PACT XPP Technologies, AG. V. Xilinx, Inc.* and *Avnet, Inc.*, Case No. 2:07-cv-00563-TJW-CE, U.S. District Court for the Eastern District of Texas, Dec. 28, 2007, pp. 1-19.
PACT's P.R. 4-1 List of Claim Terms for Construction, *PACT XPP Technologies, AG. V. Xilinx, Inc.* and *Avnet, Inc.*, Case No. 2:07-cv-00563-TJW-CE, U.S. District Court for the Eastern District of Texas, Dec. 28, 2007, pp. 1-7.
PACT's P.R. 4-2 Preliminary Claim Constructions and Extrinsic Evidence, *PACT XPP Technologies, AG. V. Xilinx, Inc.* and *Avnet, Inc.*, Case No. 2:07-cv-00563-TJW-CE, U.S. District Court for the

(56) References Cited

OTHER PUBLICATIONS

Eastern District of Texas, Dec. 28, 2007, pp. 1-16, and Exhibits re Extrinsic Evidence Parts in seven (7) separate additional PDF files (Parts 1-7).
Coelho, F., "Compiling dynamic mappings with array copies," Jul. 1997, 12 pages, http://delivery.acm.org/10.1145/270000/263786/p168-coelho.pdf.
Janssen et al., "A Specification Invariant Technique for Regularity Improvement between Flow-Graph Clusters," Mar. 1996, 6 pages, http://delivery.acm.org/10.1145/790000/787534/74230138.pdf.
Microsoft Press Computer Dictionary, Second Edition, 1994, Microsoft Press, ISBN 1-55615-597-2, p. 10.
Newton, Harry, "Newton's Telecom Dictionary," Ninteenth Edition, 2003, CMP Books, p. 40.
Rehmouni et al., "Formulation and evaluation of scheduling techniques for control flow graphs," Dec. 1995, 6 pages, http://delivery.acm.org/10.1145/230000/224352/p386-rahmouni.pdf.
Sinha et al., "System-dependence-graph-based slicing of programs with arbitrary interprocedural control flow," May 1999, 10 pages, http://delivery.acm.org/10.1145/310000/203675/p432-sinha.pdf.
Stallings, William, "Data & Computer Communications," Sixth Edition, Jun. 2000, Prentice-Hall, Inc., ISBN 0-084370-9, pp. 195-196.
Bondalapati et al., "Reconfigurable Meshes: Theory and Practice," Dept. of Electrical Engineering-Systems, Univ. of Southern California, Apr. 1997, Reconfigurable Architectures Workshop, International Parallel Processing Symposium, 15 pages.
Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.
Cong et al., "Structural Gate Decomposition for Depth-Optimal Technology Mapping in LUT-Based FPGA Designs," Univ. of California, ACM Transactions on Design Automation of Electronic Systems, vol. 5, No. 2, Apr. 2000, pp. 193-225.
FOLDOC, The Free On-Line Dictionary of Computing, "handshaking," online Jan. 13, 1995, retrieved from Internet Jan. 23, 2011 at http://foldoc.org/handshake.
Li et al., "Hardware-Software Co-Design of Embedded Reconfigurable Architectures," Los Angeles, CA, 2000, ACM, pp. 507-512.
Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.
Pistorius et al., "Generation of Very Large Circuits to Benchmark the Partitioning of FPGAs," Monterey, CA, 1999, ACM, pp. 67-73.
Translation of DE 101 39 170 by examiner using Google Translate, 10 pages.
Bolsens, Ivo (CTO Xilinx), "FPGA, a history of interconnect," Xilinx slide presentation, posted on the internet Oct. 30, 2008 at http://www.docstoc.com/docs/2198008/FPGA-a-history-of-interconnect, 32 pages.
Altera, "Implementing High-Speed Search Applications with Altera CAM," Jul. 2001, Ver. 2.1, Application Note 119, 50 pages.

\* cited by examiner

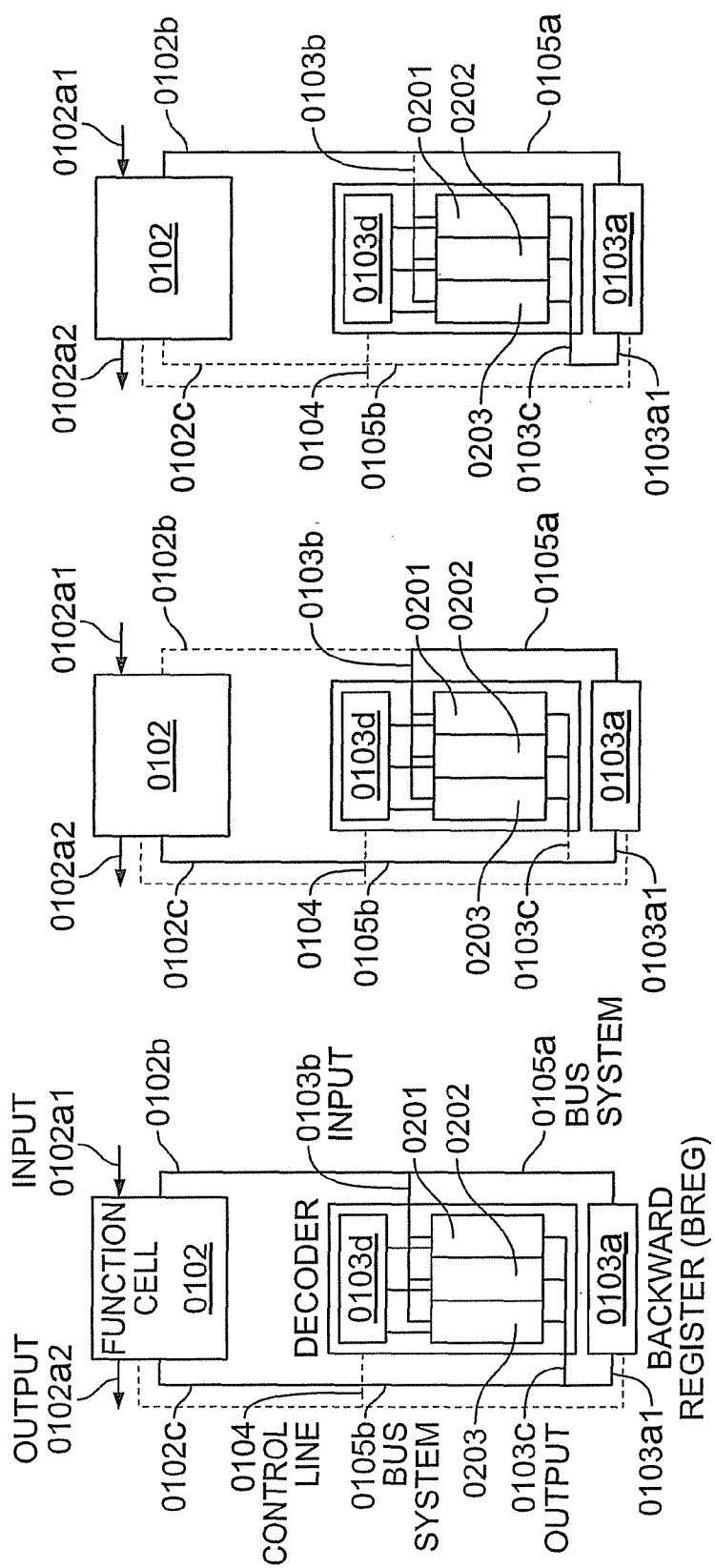

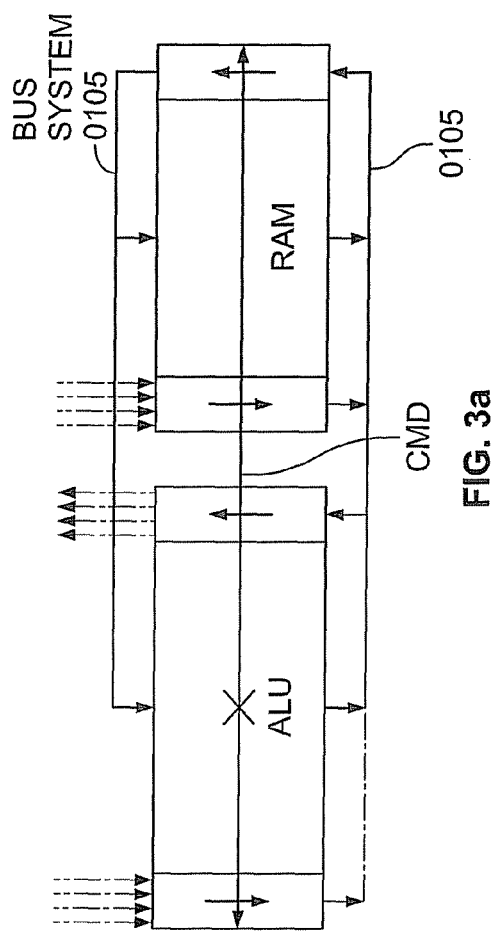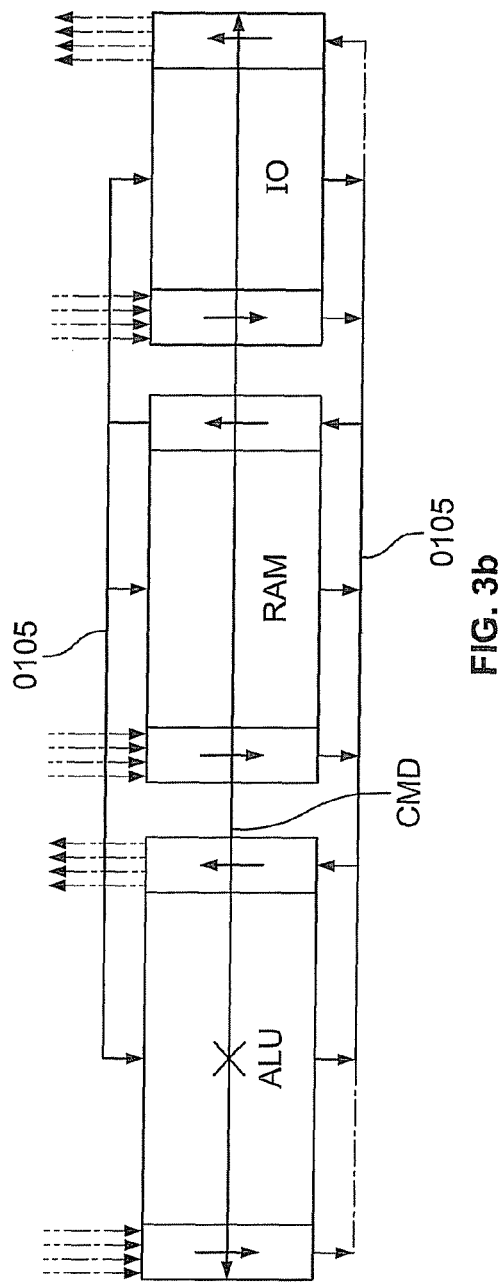

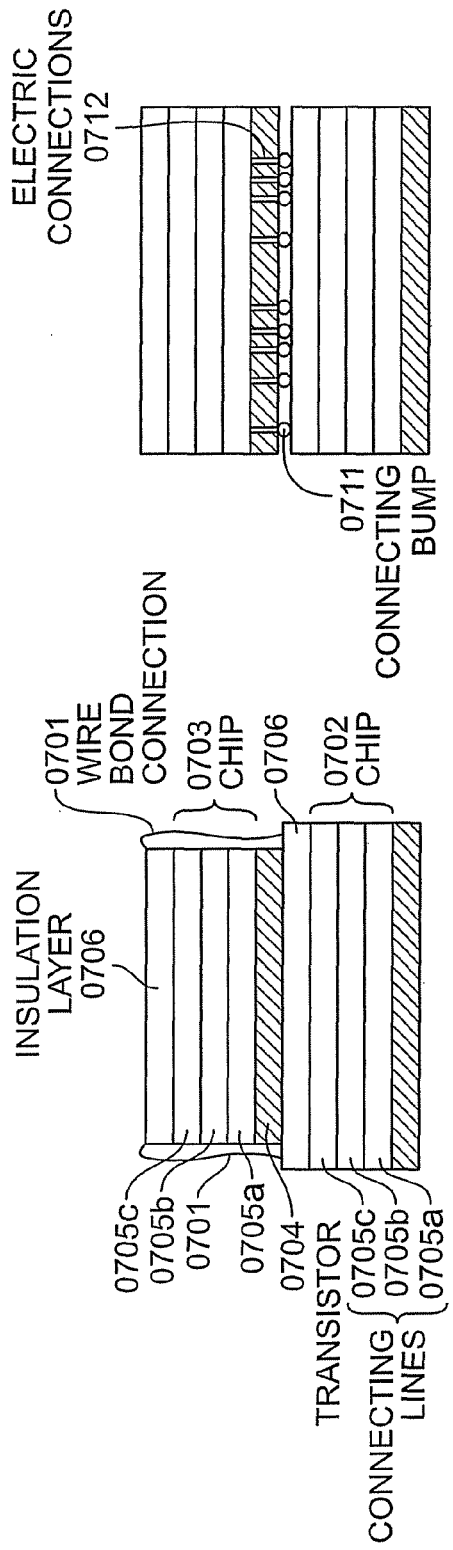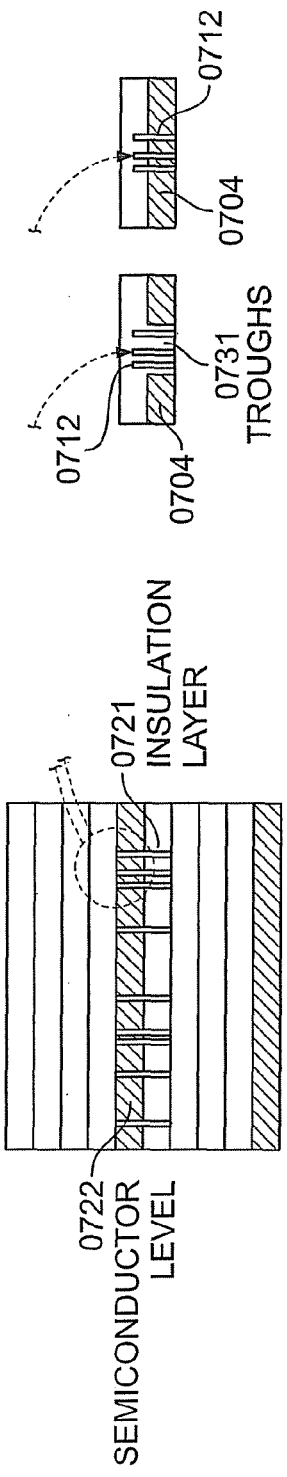

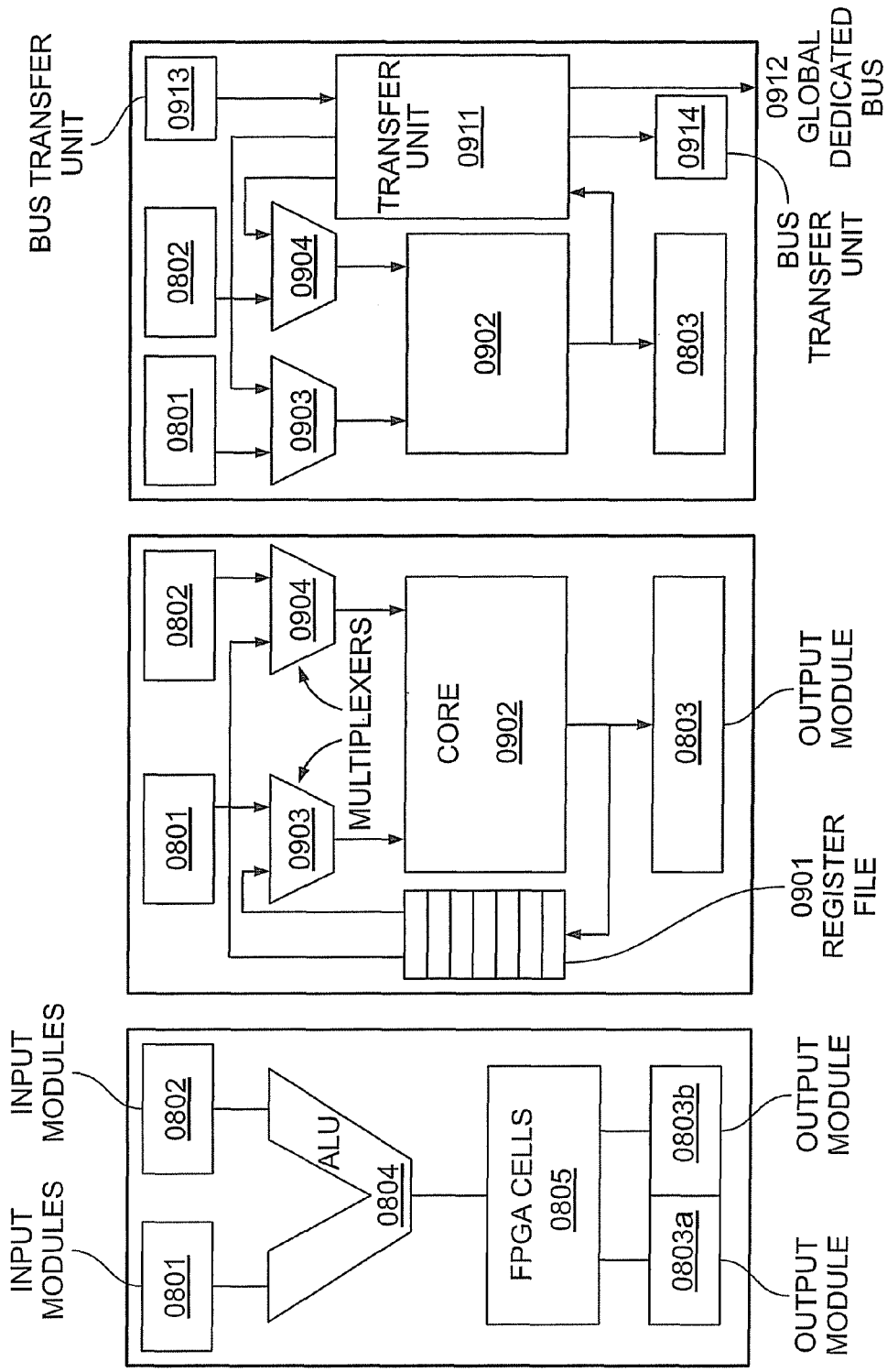

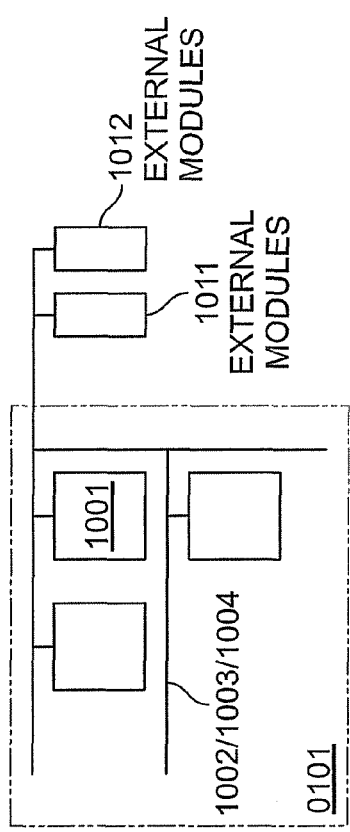
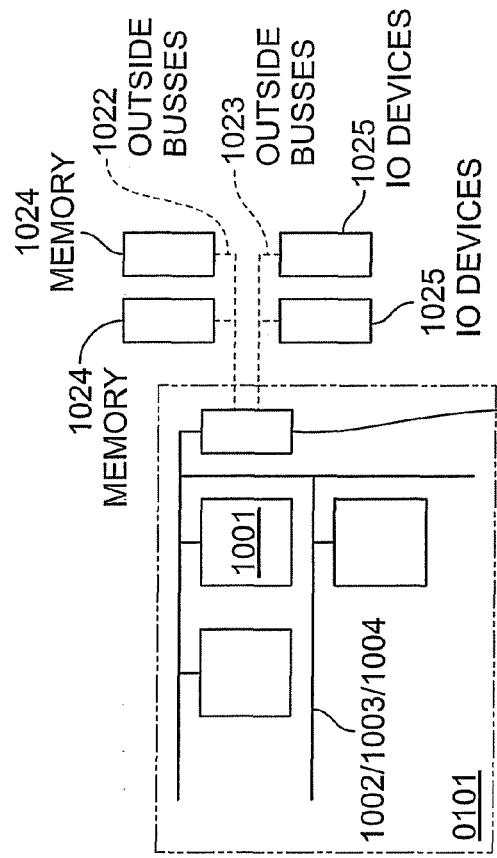
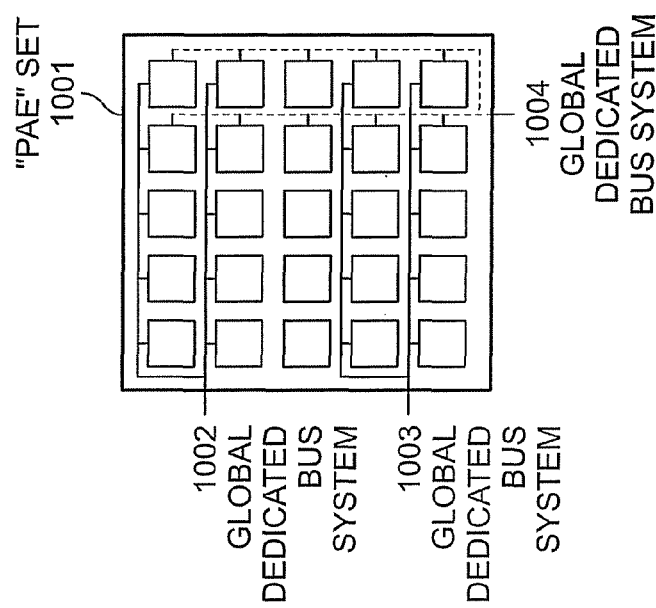
FIG. 10b
FIG. 10c
FIG. 10a

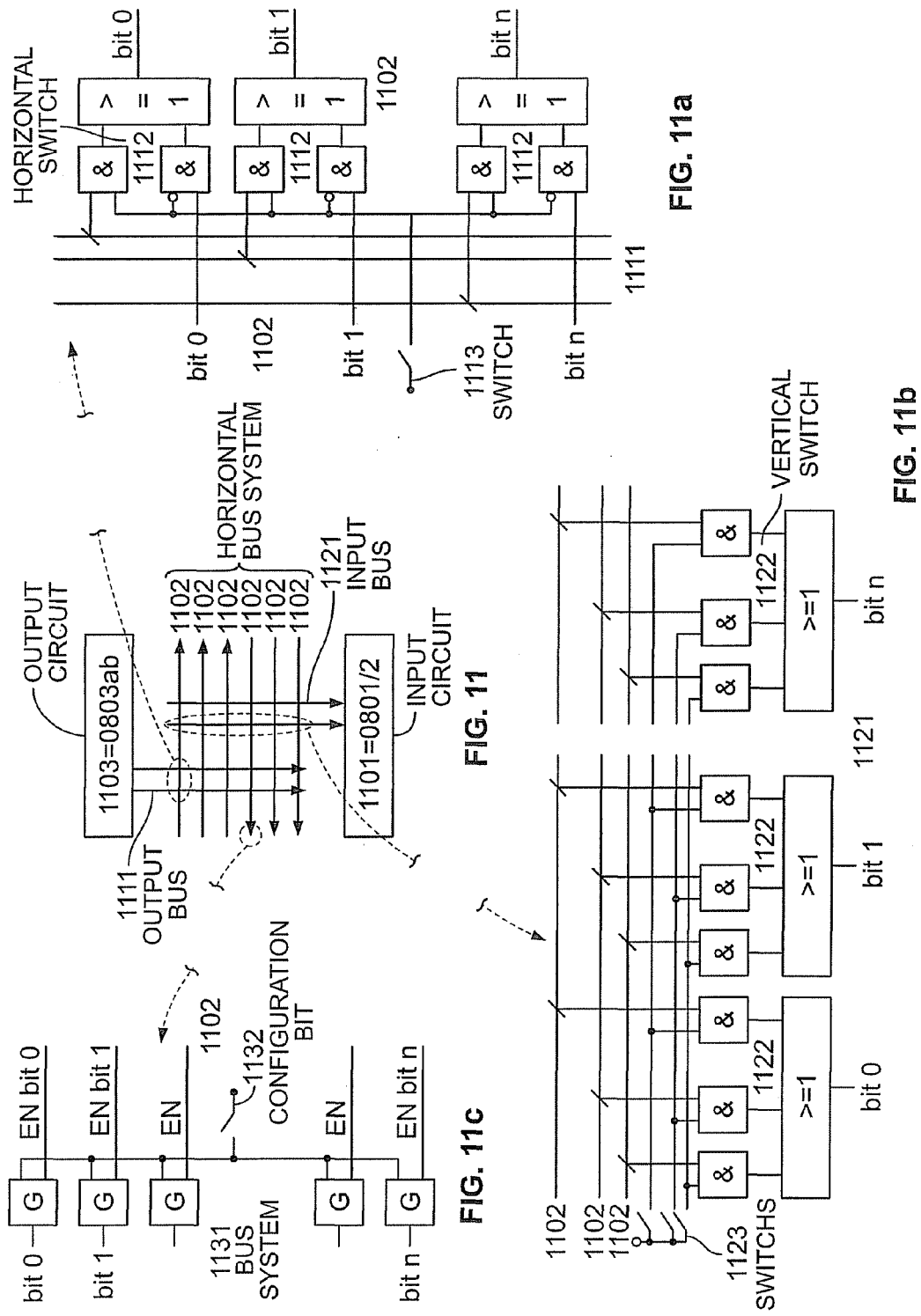

RECONFIGURABLE ELEMENTS

CROSS-REFERENCE TO RELATED APPLICATIONS

This application is a continuation of U.S. patent application Ser. No. 12/571,173, filed Sep. 30, 2009, which is a continuation of U.S. patent application Ser. No. 10/490,081, filed on Nov. 29, 2004, now U.S. Pat. No. 8,429,385 which is a national phase of International Application Serial No. PCT/EP02/10572, filed on Sep. 19, 2002, which claims priority to German Patent Application Serial Nos. DE 101 42 904.5, filed on Sep. 3, 2001, and DE 101 46 132.1, filed on Sep. 19, 2001, the entire contents of each of which are expressly incorporated herein by reference thereto.

FIELD OF THE INVENTION

The present invention relates to a die stack arrangement, where configurable cells including processing units and a configurable interconnect structure are implemented on the dies.

BACKGROUND INFORMATION

Reconfigurable elements are designed differently depending on the application to be executed and according to the application.

A reconfigurable architecture in the present context refers to modules or units having a configurable function and/or interconnection—Virtual Processing Units (VPUs)—in particular integrated modules having a plurality of arithmetic, logic, analog, memory, and/or internal/external interconnecting modules in one or more dimensions that are interconnected directly or via a bus system.

The generic type of such units includes in particular systolic arrays, neural networks, multiprocessor systems, processors having a plurality of arithmetic units and/or logic cells, communicative/peripheral cells (IO), interconnection and network modules such as crossbar switches, and/or known modules of the generic types Field Programmable Gate Array (FPGA), Dynamically Programmable Gate Array (DPGA), Chameleon, XPUTER, etc. Reference is made in this connection in particular to the following patents and patent applications that have a common assignee with the present application, and all of which are incorporated herein by reference: DE 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE00/01869, DE 100 36 627.9-33, DE 100 28 397.7, DE 101 10 530.4, DE 101 11 014.6, PCT/EP 00/10516, EP 01 102 674.7, DE 196 51 075.9-53, DE 196 54 846.2-53, DE 196 54 593.5-53, DE 197 04 728.9, DE 198 07 872.2, DE 101 39 170.6, DE 199 26 538.0, DE 101 42 904.5, DE 102 06 653.1, DE 102 06 857.7, DE 100 28 397.7, DE 101 10 530.4, DE 102 02 044.2, DE 101 29 237.6-53, DE 101 42 904.5, DE 100 50 442.6, DE 101 35 210.7-53, EP 02 001 331.4, 60/317,876.

The architecture mentioned above is used for illustration and is referred to below as a VPU. This architecture is composed of any arithmetic or logic cells (including memories), memory cells, interconnection cells, and/or communicative/peripheral (IO) cells (PAEs) which may be arranged in a one-dimensional or multi-dimensional matrix (PA). The matrix may have different cells of any desired design. The bus systems are also understood to be cells herein. A configuration unit (CT, load logic), which configures the interconnection and function of the PA, may be assigned to the matrix as a whole or parts thereof. The CT may be designed, for example, as a dedicated unit according to PACT05, PACT10, PACT17 or a host microprocessor system according to DE 44 16 881.0-53, DE 102 06 856.9, and assigned to the PA and/or implemented with the help of or through PAs.

Different PAE structures are known from the related art. The most conventional ones are defined in DE 196 51 075.9-53 and DE 100 50 442.6, as well as Chameleon CS2112. In addition, reference should also be made to the known FPGA cells.

From the university environment, cell structures such as DPGAs, RawMachine (DeHuon), KressArrays (Kress, University of Kaiserslautern), XPUTER (Hartenstein, University of Kaiserslautern) as well as other structures are known.

SUMMARY OF THE INVENTION

The expansions described below which are useable with all the aforementioned structures, may improve the usability of the architectures and PAE structures in complex applications, in particular including highly sequential and/or less data flow-oriented applications. Furthermore, the connection to external units (e.g., memories and/or peripherals) is simplified and homogenized.

Indirect Configuration

In a special embodiment of a PAE (IPAE), it or a group of PAEs is coupled to a memory (RRAM), preferably a RAM-PAE. The IPAE may have its own internal sequencer or it is coupled to a sequencer and/or microcontroller having a, e.g., limited, i.e., comparatively small, number of different possible instructions, like RISC processors and/or a complete set of instructions (see ARC microprocessor). In other words, a risk processor with the smallest possible set of instructions, but which is still complete from the standpoint of computation theory, may be used. In one embodiment, the sequencer may also be formed by configuring one or more PAEs. The sequencer may be designed to be configurable in its function and its sequence behavior (as is known, for example, from the related art, e.g., from EPS448 by Altera (Altera Data Book 1993)). The sequencer/microcontroller may respond to states (e.g., status signals, events) in the IPAE and/or to states (e.g., including triggers) of other PAEs connected to the IPAE (e.g., via a bus system). A pointer to an RRAM memory content may be configured in a register of the IPAE. For example, program pointer Rpp may be set at the starting address of the code during the reset cycle. An address generator in the sequencer may read the memory contents referenced by the pointer out of the RRAM and may either write the contents (or a portion thereof) into a configuration register of an addressed PAE, said configuration register being addressed by the memory content, for example, or may use the memory content as an instruction for the next processing. The pointer may be incremented and/or decremented by the address generator according to the usual procedure of address pointers, and/or reset in the case of jump instructions (JUMP, CALL, RETURN). To this extent, the memory RRAM may also make available a code memory, and, in one embodiment, also a data memory for a sequencer and/or may be used as such. The sequencer may be able to freely read code out of the memory (RRAM), and, in one embodiment, may also read data from or write data into the memory. To this extent, the memory may also constitute a data memory for the sequencer.

The RRAM memory content may be loaded from a higher-level configuration unit (CT). In an extended embodiment, the memory content may, if necessary, also be loaded by the IPAE independently, additionally, or alternatively from another memory (e.g., an external memory) or it may be written into this memory, e.g., via a front-end connection.

In one variant of the embodiment, the memory and/or the IPAE may have a direct connection (EXTBUS) to an external RAM and/or external IO. In one example embodiment, the EXTBUS may be implemented via an optionally dedicated connection of the PAE system to an interface module (IOAG), as is known from PACT03 or PACT15, for example. The memory (RAM) and/or peripheral (IO) may be triggered via the interface module.

In an example embodiment of the present invention, the RRAM may automatically load code and/or data for the sequencer from the RAM or an external RAM via the EXTBUS. This function may be implemented by independent address generators implemented or implementable in RRAM. For example, DMA controllers are particularly suitable for this task since they copy data in blocks from one memory to another. The address space of the data to be read and the last target address space may be set accordingly, optionally by the IPAE, and the copying operation may be started.

In an embodiment that is more complex in teens of hardware, the function may be implemented by an implemented memory management unit (MMU) whose general mode of operation is defined by the related art and is known. In the present invention, the MMU may operate as follows:

The RRAM memory managed by the MMU may be divided into multiple pages. Each page may contain data of a virtual memory space within an external memory. For example, the hexadecimal RRAM addresses 0x0a00 . . . 0x0aff may contain data of the external memory at the addresses 0xbd13200 . . . 0xbd132ff. To manage the address conversion, an address translation unit may be used. The unit may be implemented by lookup tables provided in the RRAM cell. The MMU may now be provided in particular for translating a large memory space to the much smaller space of the RRAM. This may be mainly accomplished by copying pages as needed from the large memory space into the small memory space. As soon as a page is no longer needed, it may be deleted and/or overwritten. When the data on the page has been altered, the page may be written back into the large memory space before being deleted/overwritten.

The address conversion unit may then operate in such a way that a high part of the physical address (i.e., the address of the page) is stored in the lookup memory and points to the corresponding data of the page in RRAM as soon as the page is available within the small memory (RRAM). The page may thus be accessed. If the page is not in RRAM, no reference is to be entered either. In this case, the page may first be copied from a large (external) memory space into RRAM. To this end, another page, e.g., one not currently being used, may be overwritten according to the preceding sequence.

The copying may be automated, i.e., it may take place without any major involvement by the sequencer, by having a DMA controller triggered by the MMU. The MMU according to the present invention of the RRAM of the present invention may therefore be provided with a trigger for a DMA controller and/or may be connectable to one. The corresponding page addresses in RRAM and external RAM, as well as the page size, may be made available to the DMA controller by the MMU, e.g., by being entered into registers.

In an example embodiment which may be preferred depending on the application, multiple EXTBUS interfaces may be implemented.

In one example embodiment, the RRAM may be subdivided into multiple segments which are in different address regions. The segments may be divided and/or may be divisible for some of the following functions, for example, and in particular may have a size which permits implementation of some or all of the following functions and corresponding controls which are optionally configurable, but which may be fixedly implemented:

Sequencer/code memories, stacks (e.g., for register sets), data memories, heaps, TO buffers, buffers to external RAM and/or cache, lookup tables, configurations for PAEs and/or buses, and the register set of the IPAE.

Depending on the function the following triggering mechanisms may be provided and/or configured:

Sequencer/code memories: program pointers to the corresponding memory locations (Rpp);

Stack: stack pointers to the top memory location of the stack (Rsp), if necessary also a frame pointer (Rfp) such as known according to the related art (e.g., Intel Pentium);

Configurations for PAEs and/or buses: a pointer within the CT and/or, depending on the implementation, a pointer within the configuration control of the PAE may point to this; and Register set of the IPAE: if the register set of the IPAE is to be installed in the memory, it is may be addressed directly by the PAE in a fixedly predetermined manner through the hardware.

The remaining memory areas such as data memories, buffers, tables, etc. may be created by the compiler or programmer. These areas may be addressed by the program to be executed and/or the operating system, and the address may be calculated within the program and/or operating system, if necessary with the help of the register set and the ALU of the sequencer.

In one example embodiment of the present invention, the register set of the IPAE may be organized as a stack like the register set of transputers. The register set may thus be small in terms of hardware (typically three registers A, B and C are sufficient) and implemented in a particularly efficient manner. In addition, it is known from transputer technology that compilers are able to operate efficiently using such a register set that is inexpensive in terms of hardware. Likewise, the register set may be located in the RRAM.

In one embodiment the RRAM may be designed as a multiport memory. Multiport memories allow reading and/or write access, if necessary simultaneously, through multiple memory access units to the memory content. Memory access units may include, for example, internal and/or external peripherals, processors, or other PAEs. The function of multiport memories is also known from the related art.

In a special embodiment, the IPAE may operate with the RRAM as a local and, if necessary, also a global configuration unit like a CT for PAEs in the environment or under circumstances it may also fulfill this function. The PAE may operate according to the method known from DE 196 54 846.2-53 when used as a local configuration unit. If the PAE is used as a global configuration unit or if a great many local PAEs are to be configured, then the method according to DE 196 54 593.5-53 may be used; this method has a FILMO functionality and therefore may be capable of managing a great many configurations that are independent of one another. The IPAE may address configurations in the RRAM, e.g., in a manner that is controlled by the sequencer/microcontroller, and may configure them in PAEs and/or itself and/or determine the sequence of the sequencer/microcontroller. Synchronization with a higher-level CT like the inter-CT protocols that are already known may take place here (DE 198 07 872.2, DE 100 28 397.7, DE 199 26 538.0). The IPAE RRAM circuit may load a configuration itself via one of the EXTRAM interfaces and/or may request configurations from a higher-level CT via the CT interface. The mode of operation may be similar to that of the reconfiguration unit in DE 196 54 846.2-53. The configuration data for the PAEs may be relayed through the IRAM to the PAEs or, in one example embodiment, directly from RRAM. For dividing the data in the RRAM among a plurality of PAEs, a bus distribution method like that of the SIMD bus system described in DE 101 10 530.4 may be used.

In other words, the basic mode of operation of an IPAE RRAM circuit may be like that of a microcontroller system whose bus connection, data transfer, and/or program sequence correspond to those of a VPU system.

Pin an example embodiment of the present invention, IPAE RRAM circuits may be such that the IPAE and the RRAM are each designed as separate function elements (PAEs) of a reconfigurable module and may typically execute any desired connections and functions, but specifically may be configured and used accordingly for use of the sequencer structure described according to the present invention as composed of IPAE and RRAM. The configuration may be accomplished by the higher level configuration unit CT.

Likewise, in an example embodiment of the present invention, PAEs may have, in addition to their connection to the internal bus systems of the arrays of PAEs, a dedicated connection (IO channel) to a superregional bus system which may transmit, in particular, data over long distances within the array and/or, in particular, has direct connection to the peripherals. The connection to the peripherals may be accomplished, e.g., by the bus system already corresponding to the peripheral protocol or via corresponding protocol converters for converting the protocol. The dedicated bus system may already conform to an industrial standard, e.g., PCI, RapidIO, Firewire, USB, Ethernet, RAMBUS, DDR-RAM, etc. to thus permit simple and cost-effective connection of the peripheral devices. Protocol conversions may also be performed in IOAGs (see DE 196 54 595.1-53) connected in between so that an internal simplified and optionally proprietary bus protocol is translated into one or more complex external standard protocols. The peripherals may include memories such as those illustrated in the bus protocols listed above.

PAEs may also have multiple connections to dedicated bus systems.

In addition, depending on the application, there may also be architectures in which only a subset of the PAEs has connections to a dedicated bus system or in which different PAEs have a different number of connections to the same or different bus systems.

A detailed description of one example of the coupling of IPAE and RRAM according to the present invention is explained below:

According to an example embodiment of the present invention, in the case of a cell element field for data processing whose function and/or interconnection is reconfigurable, in particular during run time without disturbing the elements that are not to be reconfigured, and which has function cells for execution of algebraic and/or logic configurable functions and which has memory cells for receiving, storing, and/or outputting information, a control connection (CMD) may be created from the function cells to the memory cells. This control connection may be used to make the address input and/or output and/or data input and/or output of the memory be controllable via the associated function cell, e.g., an ALU-PAE. It may thus be possible to specify, for example, whether the next piece of information transmitted is to be handled as an address or as data and whether a read and/or write access is necessary. This data transfer from the memory cell, which may be a RAM-PAE, for example, to the ALU-PAE may allow new instructions which are to be processed by the ALU to be loaded into it. It may be possible in this way to construct a sequencer structure in a cell element field merely by providing a dedicated, exclusively function cell-controlled, control connection between the function cell and memory cell, having only two elements which are connected via suitable buses and to do so without necessitating any other measures and/or any structural changes. Data, addresses, program steps, etc. may be stored in the memory cell in a manner known from conventional processors. Since both elements may also be used accordingly in another manner with an appropriate configuration, this may yield a particularly efficient design which may be particularly readily adaptable to sequencer structures as well as vectorial and/or parallelizable structures.

Through the use of only two cells in a cell element field, namely the function cell and the information providing cell, a multitude of sequencer-like structures may be created in the reconfigurable cell element field. This is advantageous inasmuch as a number of varied tasks that are different from one another must often be processed in data processing, e.g., in an operating system capable of multitasking. A plurality of such tasks may then be processed in a single cell element field effectively and simultaneously. Advantages for real time applications are apparent. In addition, it is also possible to operate the individual sequencer structures that are constructed in a cell element field, providing the control connection according to the present invention, at different clock pulse rates, e.g., to reduce power consumption by processing tasks having a lower priority more slowly. It may also be possible to process sequencer-like program parts in the field in parallel or vectorially when executing algorithms which are largely parallel and vice versa.

The cell element field having the cells whose function and/or interconnection is reconfigurable may form a processor, a coprocessor, and/or a microcontroller, and/or a plurality or combination thereof in parallel.

The function cells may be in the form of arithmetic logic units, in particular representing coarse-grained elements, although they may be provided with a fine-grained status machine. In one example embodiment, the ALUs may be expanded ALUs (EALUs) such as those described in previous patent applications commonly assigned with the present application. An expansion may include the control line monitoring, instruction decoding unit, etc. inasmuch as necessary. At least a subset of the function cells may also be constructed from fine-grained FPGA elements.

The memory cells may provide volatile and/or nonvolatile storage of data and/or information. If information stored in the memory cells, whether program steps, addresses for access to data, or data deposited in a register or in a heap, is stored as volatile data, a complete reconfiguration during operation is possible. As an alternative, it is possible to provide nonvolatile memory cells. The nonvolatile memory cells may be provided as an EEPROM area and the like in which a rudimentary bios program is stored which is to be executed at the time of startup of the configuration. In this way it may be possible to start up operation of a data processing system without other components. A nonvolatile data memory may also be provided if it is decided for cost and/or space reasons that the same program parts are to be executed repeatedly, in which case it may then be possible to switch among such fixed program parts, e.g., in the manner of a WAVE reconfiguration during operation. The possibilities of providing and using such nonvolatile memories are the object of other protective rights commonly owned with the present application. It may be possible to store both volatile and nonvolatile data in the memory cells, e.g., to permanently store a bios program and nevertheless be able to use the memory cell for other purposes.

In an example embodiment of the present invention, the memory cell may be designed in such a way that it is able to store a sufficiently large number of data and/or program parts to be processed. These program parts may be designed as program steps, such that each step specifies what an individual PAE, in particular the assigned PAE, in particular the function cell controlling the memory cell, must do in the next step, and the program parts may also include entire configurations for field areas or other fields. In such a case, it may be possible for the sequencer structure that has been built up to output an instruction on the basis of which cell element field areas are reconfigured. The function cell triggering this configuration then may operate like a load logic (CT) at the same time. The configuration of other cells may in turn be done in such a way that a sequencer-like data processing takes place there, and it may be possible in these fields in turn to configure and/or reconfigure other cells in the course of program processing. This may yield an iterative configuration of cell element areas and nesting of programs with sequencer structures and parallel structures that are nested into one another in a similar manner like a babushka (a Russian stacking doll). By using input and output cells, access to other cell element fields outside of a single integrated module may be possible. Such access may massively increase the total computation capacity. It may be possible, in particular with the occurrence of configurations in a code part of a sequencer structure configured into a cell element field, to either perform the configuration requests on an assigned cell element field, which may be managed by the particular sequencer structure alone, and/or deliver such requests to a configuration master unit to ensure that there is a uniform occupancy of all cell element fields. This may yield more or less a subprogram call by transfer of required configurations to cells or load logics. The cells, if they themselves are responsible for the configuration of other cell element field areas, may be provided with FILMO structures and the like implemented in hardware or software to ensure proper reconfiguration. Another possibility may be that of writing into the memory cells while instructions are being processed in such a way that the code to be processed and/or the program to be processed is altered. In one example embodiment, this type of self-modification (SM) may be suppressed by a corresponding control via the function cell.

In an example embodiment of the present invention, the memory cell, in response to triggering of the function cell controlling it, may place stored information directly or indirectly on a bus leading to the function cell. Indirect output may take place when the two cells are situated side-by-side and the information requested by the triggering unit must arrive at the ALU-PAE via a bus segment that cannot be connected directly to the output of the memory cell. In such a case, the memory cell may output data onto this bus system in particular via a backward register. Accordingly, in an example embodiment of the present invention, at least one memory cell and/or function cell may have such a backward register which may be located in the information path between the memory cell and the function cell. In such a case, this register need not necessarily be provided with additional functionalities, although this may be the case, e.g., when requesting data from the memory cell for further processing according to a conventional LOAD instruction of a typical microprocessor for modification of the data even before being loaded into the PAE in order to implement a LOAD++ instruction, for example.

In other words, within the structure described here, bus connections may be run as needed through the forward register (FREG) and the backward register (BREG) which are typical of the XPP technology commonly owned with the present application. These, in particular, have the possibility of transmitting data vertically between horizontal bus systems and they are able to multiplex or demultiplex multiple buses. FREG and BREG (contrary to their naming) are not necessarily register stages, but, instead, may merely and optionally have configurable registers. The control connection (CMD) may go to the FREG and/or BREG of the particular function cells (PAEs) to control the bus data transfers according to the instruction currently being executed.

The memory cell may be set up in such a way as to receive information from the function cell controlling it, information storage via an input/output cell and/or a cell that does not control the memory cell also being possible. In particular, when data is to be written by an input-output cell into the memory cell, the input-output cell (I/O PAE) may be controlled by the function cell. Then, for example, the address at which information to be written into the memory cell or, if necessary, also to be transmitted directly to the function cell (PAE) is to be read may be sent to the I/O-PAE by the ALU-PAE. In this connection, this address may be stipulated via an address translation table, an address translation buffer, or an MMU-like structure in the I/O-PAE. In such a case, this may result, in particular, in the full functionalities of typical microprocessors.

In one example embodiment of the present invention, the function cell-memory cell combination may be assigned at least one input-output unit with the help of which information may then be sent to an external unit, another function cell, another function cell-memory cell combination, and/or other memory cells, and/or information may be received from them.

The input-output unit may be designed for receiving control instructions from the function cell.

The function cell-memory cell combination may have capabilities for data transfer to the other function cells and/or memory cells of a VPU module, in particular those situated in the array of PAEs (PA). For this purpose, access capabilities via the bus systems to the corresponding cells may be made available. Access may be accomplished via the forward and/or backward registers of the PAEs of the function cell-memory cell combination, through transfer of the "port" control instruction.

In one example embodiment of the present invention, the control connection (CMD) may be designed to transmit at least some, e.g., all, of the following control instructions: OPCODE FETCH, INTERNAL/EXTERNAL DATA ACCESSES, POSITIONING OF INTERNAL/EXTERNAL ADDRESS POINTERS, POSITIONING OF INTERNAL/EXTERNAL PROGRAM POINTERS, PROGRAM POINTER INCREMENT, POSITIONING OF INTERNAL/EXTERNAL STACK POINTERS, and STACK ACCESSES (PUSH, POP).

For example this functionality may be implemented through the following CMD control instructions:

| | |
|---|---|
| load_const: | load a constant into a register; |
| write_Rap: | set address pointer for memory access (e.g., heap); |
| read_Rap: | read address pointer for memory access (e.g., heap); |
| read_Reg: | read a register out of the memory (if the registers are implemented in the RAM-PAE); |

-continued

| | |
|---|---|
| write_Reg: | write data into a register in the memory (if the registers are implemented in the RAM-PAE); |
| write&decr_Rsp: | write a data word onto the stack and decrement the stack pointer; |
| read&incr_Rsp: | read a data word from the stack and increment the stack pointer; |
| set_Rpp: | set the program pointer; and |
| set&push_Rpp: | write the program pointer onto the stack and reset the program pointer. |

The control instructions may be used to control the connected memory cells and function cells (PAEs). In addition, the control instructions may control the data transfer on the bus systems, e.g., by triggering multiplexers, switches, transmission gates, etc., in the forward and backward registers (FREG/BREG).

Additional instructions may include:

| | |
|---|---|
| read_port: | read data from a port (e.g., implemented by an FREG) to the array; and |
| write_port: | write data to a port (e.g., implemented by a BREG) to the array. |

This may be accomplished by a corresponding bit width of the control line and an associated decoding at the receivers. The required control and decoding may be provided inexpensively and with no problem. As this shows, practically complete sequencer capability of the system may be obtained with the signals. An all-purpose data processing unit may be obtained in this way.

The system may be selected so that the function cell, as the only master, may access the control connection and/or a bus segment, i.e., a bus system that functions as the control connection. Therefore, this may yield a system in which the control line functions as an instruction line, as provided in conventional processors.

The function cell and the memory cell may be situated adjacent to the I/O cell. For example, they may be situated directly side-by-side. Alternatively, they may at least be close to one another. The system of function cells and memory cells in proximity to one another may ensure that there is no latency time or at least no significant latency time between triggering and data input of the required information in the function cell only because the connections between the cells are too long. If latency times must be taken into account, then pipelining may also be provided in the sequencer structures. This becomes particularly important in systems having a very high clock pulse frequency. It is possible to provide cell units having such a high clock pulse frequency, which are known in the related art and are also able to access suitable memory cells rapidly enough. In such a case, e.g., when architecture elements that are known are used for the function cells, reconfigurability of the function cell element and the respective interconnections are also to be provided at the same time. In one example embodiment, the function cells, the information providing cells such as memory cells, the I/O cells, and the like may be in a multidimensional arrangement, in particular in the manner of a matrix and/or at grid points of a one-dimensional grid, etc. If there is a regular structure, as is the case there, a cell may receive information, i.e., operands, configurations, trigger signals, etc., from a first row, while data, trigger signals, and other information is dispensed in a lower row. In such a case, it may be preferable for the cells to be situated in one and the same row, and then the information transfer from the information providing cell into the required input of the function cell may take place via a backward register. The registers may be used for pipelining.

In an example embodiment of the present invention, a method may be provided for operating a cell element field, in particular a multidimensional cell element field having function cells for executing algebraic and/or logic functions and having information providing cells, in particular memory cells and/or input/output cells, for receiving and/or outputting information and/or memories thereof. At least one of the function cells may output control instructions to at least one information-providing cell, where information may be provided for the function cell in response to the control instructions. The function cell may be designed to perform further data processing in response to the information provided, to thereby process data like a sequencer.

Thus, in an example embodiment of the present invention, in a reconfigurable field, data processing in a sequencer-like manner may be made possible by outputting the control instructions to the memory cell of a sequencer structure. The instructions, which may be output as control instructions by the function cell, may permit a sequencer-like operation such as that known from conventional processors. It may be possible to implement only parts of said instructions and nevertheless ensure fully sequencer-like data processing.

BRIEF DESCRIPTION OF THE DRAWINGS

FIG. 2a is a diagram that illustrates additional details of the cell element field illustrated in FIG. 1, according to an example embodiment of the present invention.

FIGS. 2b and 2c are diagrams that illustrate the details of FIG. 2a during different data processing times, according to an example embodiment of the present invention.

FIG. 3a is a diagram that illustrates the detail of FIG. 2, according to an alternative example embodiment of the present invention.

FIG. 3b is a diagram that illustrates further details of the embodiment presented with respect to FIG. 3a, according to an example embodiment of the present invention.

FIG. 8 is a diagram that illustrates an example PAE, according to an example embodiment of the present invention.

FIG. 9 illustrates example PAEs that may be implemented according to example embodiments of the present invention.

FIG. 10 illustrates the use of dedicated global bus systems according to example embodiments of the present invention.

FIG. 11 is a diagram that illustrates bus switches, according to example embodiments of the present invention.

DETAILED DESCRIPTION OF THE INVENTION

Figure 1A:
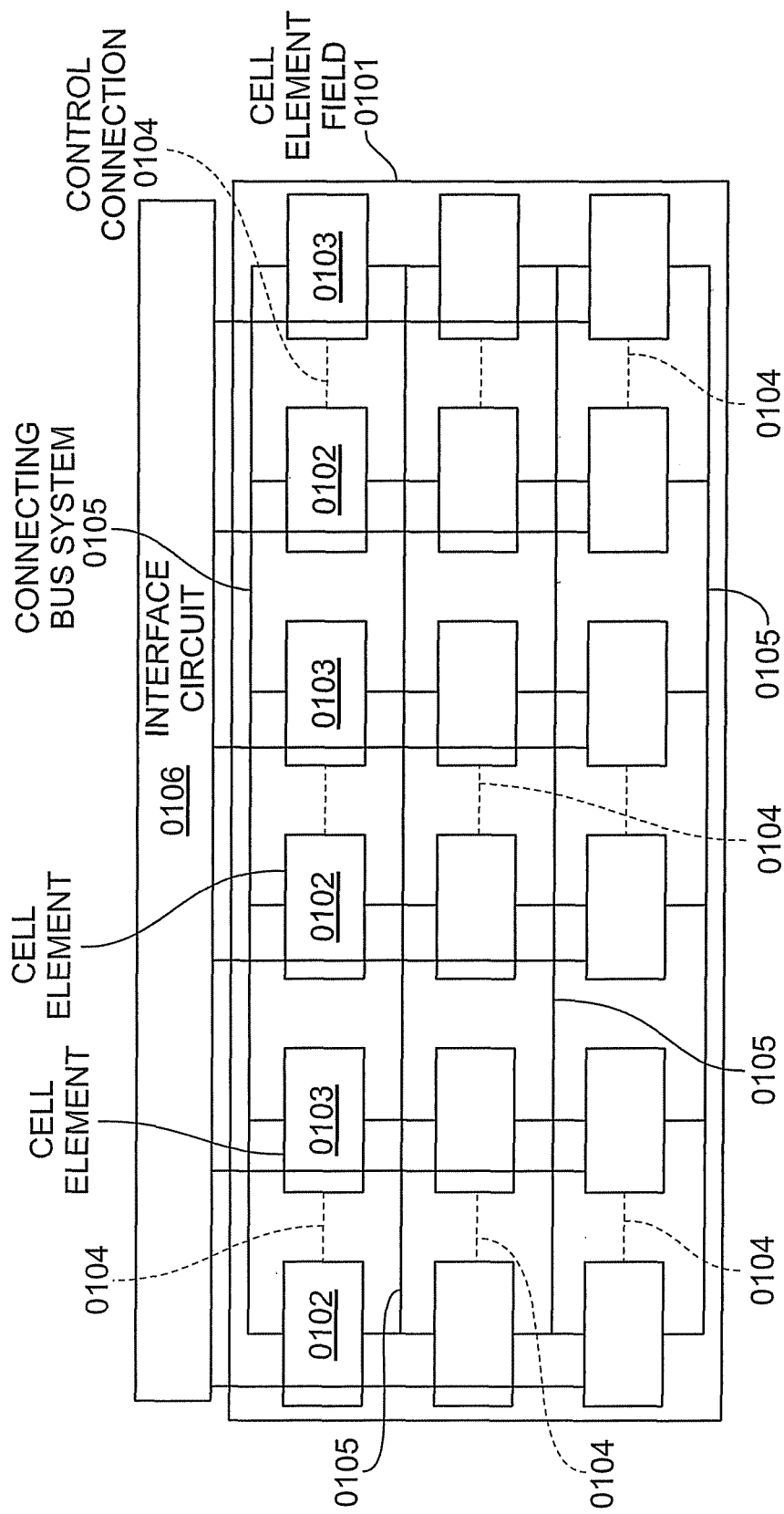
FIGS. 1a and 1b are diagrams that illustrate a cell element field according to an example embodiment of the present invention.
Figure 1B:
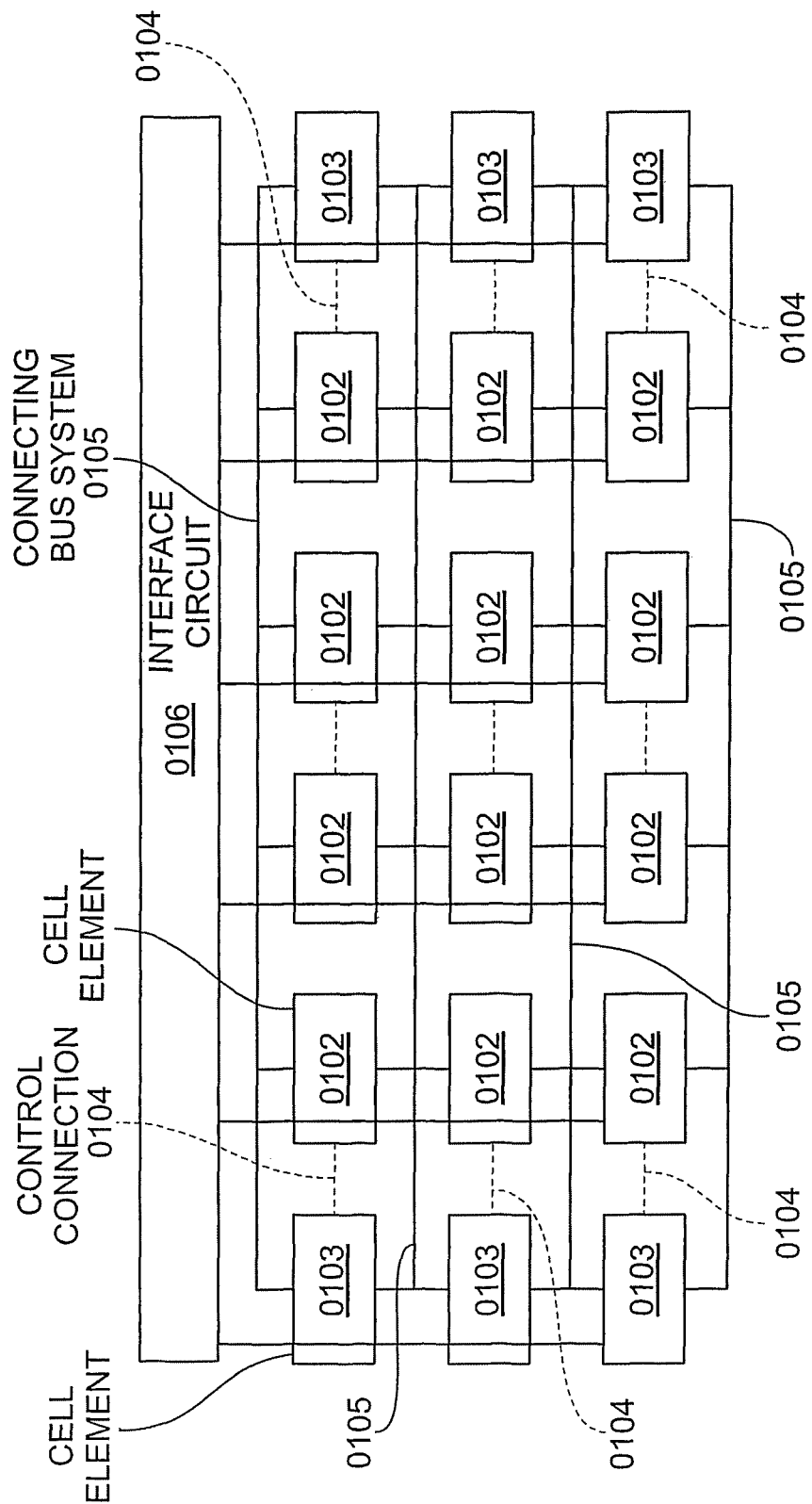

Referring to FIG. 1(a/b), a cell element field, designated in general as 0101, for data processing may include function cells 0102 for executing arithmetic and/or logic functions, as well as memory cells 0103 for receiving, storing, and/or outputting information, and a control connection 0104 leading from function cells 0102 to memory cells 0103.

Referring to FIG. 1a, the cell element field 0101 may be freely configurable in the interconnection of elements 0102, 0103, 0104, without interfering with ongoing operation of cell element parts that are not to be reconfigured. The connections may be configured by connecting bus systems 0105 as necessary. In addition, the particular function of function cells 0102 may be configurable. The function cells may be arithmetic logic units which have been expanded by certain circuits that permit reconfiguration such as status machines, interface circuits for communication with load logic 0106 situated outside of the cell element field, etc. Reference is made to the corresponding prior applications commonly owned with the present application.

Cell elements 0102, 0103 of cell element field 0101 may be situated in two dimensions, in rows and columns, with one memory cell 0103 being directly next to a function cell 0102, there being three memory cell-function cell pairs per row in which the function cells and memory cells are interconnected via control connections 0104. Function cells and memory cells 0102, 0103 may have inputs which are connectable to the bus system above the row in which the particular cell elements are connectable to receive data therefrom. In addition, cells 0102, 0103 may have outputs which output data to bus system 0105 beneath the row. As already explained, each memory cell 0103 may also be connected to a backward register (BW) through which data may be pushed from the bus beneath a row to the bus above the particular row.

With the exception of control connections 0104 and the associated circuits within the function cells (ALU in FIG. 2) and memory cells (RAM in FIG. 2), the cell element field for data processing in FIG. 1 may be a conventional cell element field such as that already known and conventional with reconfigurable data processing systems, e.g., a VPU corresponding to the XPP technology commonly owned with the present application. In particular, the cell element of FIG. 1 may be operated in the known way so it has the corresponding circuits for wave reconfiguration, for debugging, for transmission of trigger signals, etc.

The particulars of the cell element field of the present invention may be derived from control connection 0104 and the associated circuit which is described in greater detail below with reference to FIGS. 2a through 2c. Whereas a control connection 0104 in FIG. 1 may always lead from a function cell element further to the left to a memory cell further to the right, and specifically only to one such memory cell, a configurable interconnection may also be provided for the control lines to either respond to memory cells located elsewhere and/or if necessary be able to respond to more than one memory cell when there is a memory demand for information to be received, stored, and/or output by the memory cells on a large scale. For reasons of simplicity and to facilitate understanding of the present invention, however, reference is made in FIGS. 1 and 2 only to fixedly provided individual control connections. Moreover, the control connection may be, if necessary, substitutable by conventional lines, assuming there are appropriate protocols.

FIG. 2 shows function cell 0102 as an ALU and function cell 0103 as RAM. Above the row in which the cells are located, bus 0105a runs, connecting backward register 0103a already mentioned to inputs 0103b of the memory cell and 0102b of the ALU. The bus system running beneath the row is labeled as 0105b and only the relevant segments of bus system 0105a, 0105b are shown. This shows that bus system 0105b alternatively receives data from an output 0102c of ALU 0102 and an output 0103c of RAM 0103 and carries data into input 0103a1 of the backward register.

At the same time ALU 0102 may have additional inputs and outputs 0102a1, 0102a2 which may be connected to other bus segments and over which the ALU may receive data such as operands and/or outputs results.

Control connection 0104 may be permanently under the control of the expanded circuits of the ALU and may represent a connection via which a plurality of bits may be transmitted. The width of control connection 0104 may be selected so that at least the control instructions described previously may be transmitted to the memory cell and the forward/backward register (FREG/BREG). Memory cell 0103 at the same time may preferably have three memory areas, namely a stack area, a heap area, and a program area. Each area may be assigned its own pointer via which it may be determined which area of the stack, the heap and the program area is accessed for reading or writing.

Bus 0105a may be used jointly by units 0102 and 0103 by the time multiplex method. This is indicated in FIGS. 2b, 2c. For example, FIG. 2b shows a situation in which data may be sent from output 0102a2 of the ALU-PAE via the backward register to the input of the RAM cell, whereas the connection between output 0103 of the RAM to bus 0105b existing at the same time although not in use and the connection between the output of backward register BW and input 0102b of the ALU-PAE do not have any importance at the point in time of FIG. 2b, which is why this is indicated with a dashed line. However, FIG. 2c shows a point in time at which memory cell 0103 supplies information about the backward register to input 2b of ALU-PAE 0102 via its output 0103c from the memory area of stack (0203), heap (0202) and program (0201) determined via the control line 0104, while the output of ALU-PAE 0102c is inactive and no signal is received at input 0103b of the RAM-PAE. For this reason, the corresponding connections are indicated with dashed lines and are thus depicted as being inactive.

Within RAM cell 0103, a circuit 0103d may be provided in which the information received via control line 0104 and/or control line bus segment 0104 is decoded.

An embodiment of the present invention may be used as follows:

First, ALU 0102 may receive configuration information from a central load logic as is already known in the related art. The transfer of information may take place in a manner known using the RDY/ACK protocol and the like. Reference is made to the possibility of using a FILMO memory, etc. with the load logic to permit proper configuration of the system.

Using the data for the configuration of ALU 0102, a row of data may be transmitted from the load logic at the same time, representing a program to be processed in a sequencer-like manner. This program may either already be the program to be executed for calculation and/or execution of the application or it may be a boot program which first loads the application program to be executed from an external unit (memory, peripheral). Loading of the program may be omitted if a portion of the memory assigned to the ALU (e.g., RAM, EPROM, EEPROM, Flash ROM) is designed to be nonvolatile and a boot program or the application program is permanently stored there. This may be an advantage in particular when the application is known in advance and may be designed to be unmodifiable because fixed implementation may result in a considerable cost reduction. Therefore, during its configuration, the ALU may output on line 0104 a corresponding instruction which sets the program pointer for writing at a predetermined value within the RAM. Then, data received by the load logic in the ALU may be supplied via output 0102*c* over bus 0105*b* and backward register 0103*a* and may proceed to input 0103*b* of RAM-PAE 0103. From unit 0103*d*, data may then be written into the program memory location identified according to the control instruction on control line 0104. This may be repeated until all program parts received by the load logic in the configuration have been stored in memory cells 0103. When configuration of the ALU is then concluded, it will request the next program steps to be executed sequencer-like by it by outputting the corresponding instructions on control line 0104 and it will receive them at its input via output 0103*c*, bus 0105*b*, the backward register of RAM-PAE 0103 and bus 0105*a*. During the program processing, situations may occur in which jumps are necessary within the program memory area, e.g., data may be loaded into the ALU-PAE from the RAM-PAE and/or data may be stored in the stack, etc. Communication in this regard between ALU-PAE and RAM-PAE may take place via control line 0104 so that the ALU-PAE may perform the decoding at any point in time. Moreover, as with a conventional microprocessor, data may be received from a stack or another RAM memory area and data may also be received from outside as operands in the ALU-PAE.

Processing of the program sequence preconfigured by the load logic in the RAM-PAE may take place here. Instruction decoding may take place in the ALU at the same time, as is necessary. This may be carried out with the same circuits that have already been used for decoding the instructions received by the load logic.

Control line 0104 may be monitored via the ALU at each point in time so that the RAM cell always follows exactly the type of memory access specified by the ALU. In this way, it may be ensured that regardless of the time multiplex use of bus elements 0105*a, b*, the elements present in the sequencer structure may be informed at any time of whether addresses for data or codes to be retrieved and/or written are on the buses or whether data is to be written and, if so, where, etc.

The system shown with respect to FIG. 2 may be expanded or modified in various ways. The variants depicted in FIGS. 3*a* and 3*b* may be particularly relevant.

According to FIG. 3*a*, not only a backward register is provided on the RAM-PAE for connecting upper and lower buses but also a forward register is provided on the RAM-PAE, and forward and backward registers are provided on the ALU-PAE. As indicated by the multiple arrows, these may be used to receive and send data to and from other units such as external hosts, external peripheral devices such as hard drives, main memories, and the like, and/or from other sequencer structures, PAEs, RAM-PAEs, etc. When a corresponding request instruction for new program parts is sent from the sequencer structure formed by the ALU-PAE and the RAM-PAE, it may be possible to process program blocks in the sequencer structure that are much larger than those which may be stored in the RAM-PAE. This is an enormous advantage, in particular in complex data processing tasks, jumps over large areas, in particular in subprograms, etc.

FIG. 3*b* shows an other variant. The ALU-PAE here communicates not only with a RAM-PAE but also at the same time with an input-output PAE which is designed to provide an interface circuit for communication with external components such as hard drives, other XPP VPUs external processors, and coprocessors, etc. The ALU-PAE may be again the unit that operates as the master for the control connection designated as "CMD" and again the buses may be used in multiplex operation. Here again, data may be transmitted from the bus beneath the row to the bus above the row through the backward register.

The arrangement shown in FIG. 3*b* may make it particularly simple to design external accesses to information that cannot be stored in the RAM-PAE memory cell and may thus permit an adaptation of the sequencer structure to existing conventional CPU technologies and their operating methods to an even greater extent than may be implemented in the input-output cell, address translation means, memory management units (MMU functions), and the like. The RAM-PAE here may be designed as a cache, for example, or, in particular, as a preloaded cache.

It should be pointed out that multiple sequencer structures may be configured into the same field at the same time; that function cells, memory cells, and input-output cells, if necessary, may optionally be configured for sequencer structures, and/or in a manner conventionally used with XPP technology, and it may be possible for an ALU to output data to another ALU, configuring the latter in a sequencer-like manner and/or making it part of a cell element field using which a certain configuration is processed. Then the load logic may also become dispensable in this way.

FIG. 4 shows again in detail the basic structure of a PAE. The core of a PAE, typically including one or more ALUs and/or a memory and/or FPGA elements, may receive data from bus system 0105*a* and transmit the results of the data processing to bus system 0105*b*. The forward register (FREG 0402) and the backward register (BREG 0403) may be located next to the core and transmit data from 0105*a* to 0105*b* (FREG) and/or from 0105*b* to 0105*a* (BREG). BREG and FREG may also contain one or more ALUs and/or a memory and/or FPGA elements. Preferably, however, their scope of function is restricted with respect to the core (0401).

Bus systems 0105*a* and 0105*b* may be each subdivided into a bus system for transmission of data (DATA) and a bus system for transmission of triggers, i.e., status signals (TRIGGER).

The PAE may be configured by a higher-level configuration unit (e.g., a CT) which may transmit configuration words to the PAE via a configuration bus (0404). These configuration words may be stored in configuration registers (0405). If necessary, a configuration stack (0406) according to PACT17 may be connected in-between and, as described below, it may be connected between the configuration bus (0404) and the configuration registers (0405).

The configuration stack may receive data and/or preferably triggers from bus system 0105(*a/b*) and may send the data and/or triggers to them.

The PAE may optionally have a connection to a dedicated bus system (IO channel 0407). To control the bus system, an additional bus control unit (0408) may be connected to the core (0401). The PAE may transmit data over the IO channel directly using a global memory, optionally also an external memory, and/or a peripheral and/or other PAEs.

In one example embodiment of the present invention, there is the possibility of setting constants for data processing via 0404. In another embodiment, a configuration unit (e.g., a CT) may read data out of the working registers.

Figure 4:
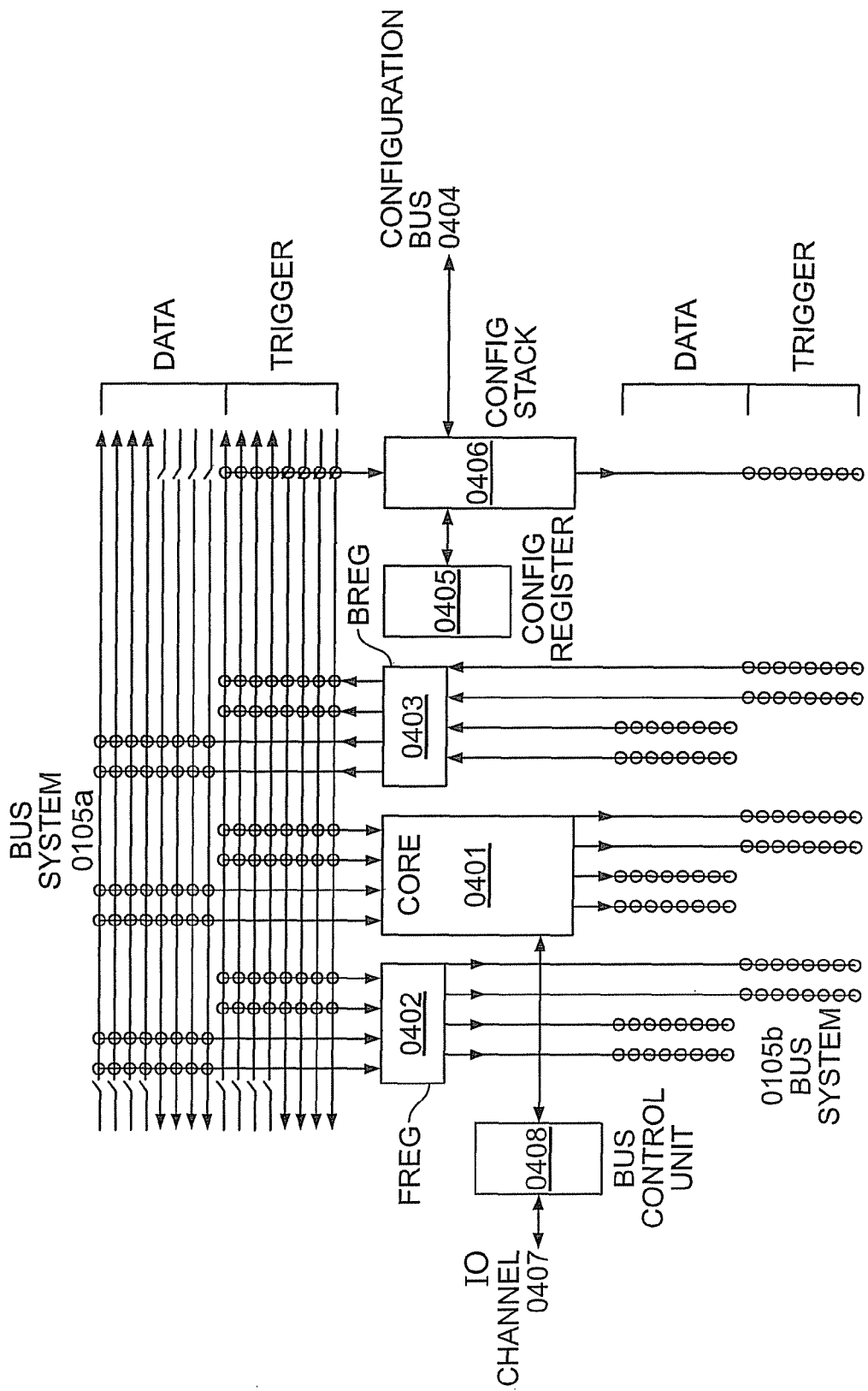
FIG. 4 is a diagram that illustrates a basic design of a function cell/memory cell (PAE), according to an example embodiment of the present invention.

FIG. 4 may also represent a corresponding RAM-PAE. Then the interconnection and function of the RAM may be set by a CT via 0404. The function may include the following functions or combinations thereof in particular:
1. Random access;
2. FIFO;
3. Stack;
4. Cache; and
5. Page memory for MMUs.

In addition, in one example embodiment, the memory may be preloaded with data by the CT (e.g., constants, lookup tables, etc.). Likewise, in an expanded embodiment, the CT may read back data (e.g., for debugging or task change) out of the memory via 0404.

In one example embodiment, a RAM-PAE may have multiple connections to bus system 0105 (dual port or multiport) so that multiple data transfers may be performed at the same time.

In another embodiment the RAM-PAE may have a dedicated connection to an external bus.

RAM-PAEs may be connected in such a way that a memory which is n times larger may be formed from multiple (n) RAM-PAEs.

Figure 5A:
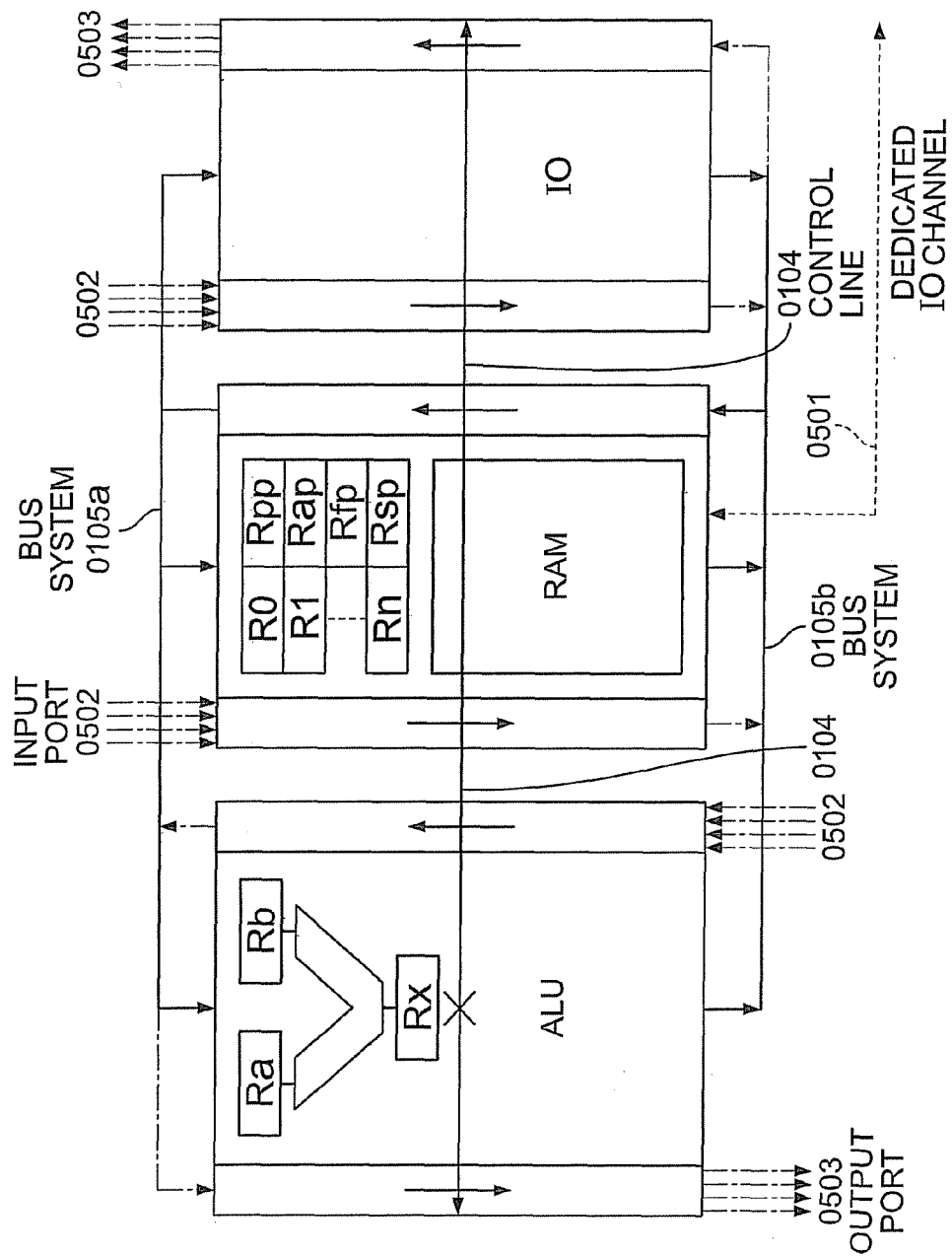
FIG. 5 is a diagram that illustrates details of an embodiment presented with respect to FIG. 3b, according to an example embodiment of the present invention.

FIG. 5s shows a variant of the sequencer according to FIG. 3b. The ALU-PAE may have a minimal register set Ra, Rb, Rx which in this example may function only to buffer the operands and results. The actual register set may be in the RAM-PAE (R0 . . . Rn). Likewise the following registers may be within the RAM-PAE:

| | |
|---|---|
| Rpp: | Program pointer; |
| Rap: | Address pointer for data accesses (e.g., heap); |
| Rap: | Stack pointer for stack accesses; and |
| Rfp: | Frame pointer for securing the stack pointer in subprogram calls. |

The CMD bus may be controlled by the ALU-PAE and may transmit the sequence information of the sequencer to all participating PAEs, as well as FREG and BREG for controlling the data transmission on the bus systems (0105a, 0105b).

In this embodiment, the RAM-PAE may have a dedicated IO channel (0501) via which it may also be able to transmit data, if necessary even independently (e.g., via DMA controller) from or to peripheral units (e.g., 10, memories). The ALU-PAEs may also have such a dedicated connection or in another design variant, the ALU-PAEs, could have such a connection instead of the RAM-PAEs.

Optionally, one or more data exchange devices may be implemented with the remaining cells of the PAs (e.g., function cells and/or memory cells). Data may be read by the PA via input ports (0502) and data may be exchanged via output ports (0503). The ports may be triggered, for example, via the CMD control instructions read_port and write_port and switch the bus systems accordingly. With the control instructions, a selector may be transmitted, indicating which port is addressed by the control instruction.

The position of the register disclosed in the present case within the RAM-PAE may be unusual but may offer two considerable advantages:
a) memory cells may be used for the registers; and
b) the pointers may be directly in the RAM-PAE, so that data access to the memory is particularly rapid. Furthermore, only one bus on bus system 0105 may be necessary for all memory accesses, so the address bus which is normally also necessary may be omitted because the addresses are given locally in the RAM-PAE by the pointers.

For all data transfers, the position of the registers should be noted. In order to implement the simplest possible instructions in the sequencer, instructions for register manipulation may therefore be provided in particular as follows:

| | |
|---|---|
| moveta Rrr: | Loads register Rrr (rr □ {1 . . . n, sp, pp, fp, ap}) to Ra; |
| movetb Rrr: | Loads register Rrr to Rb; and |
| movefx Rrr: | Writes register Rx to Rrr. |

To preserve the data flow character of the ALU, another special OpCode may be implemented:
feed: transmits data from Ra/Rb to Rx without manipulating it.

The following examples illustrate an operation of the sequencer:
Add register R1 to register R2 and write the result into register R2:
    moveta R1; movetb R2; add; movefx R2;
Shift register R4 to register R7:
    moveta R4; feed; movefx R7;
Transfer R5 onto stack:
    moveta R5; feed; push (push transfers data of register Rx to the memory location to which Rsp points and decrements (or increments) Rsp);
Set address pointer Rap with the indirect address R4 added to R7:
    moveta R4; movetb R7; add; movefx Ra;
Load data for memory location Rap to R1:
    load; feed; movefx R1 (load transfers data from the memory location to which Rap points to Ra).

The data registers may be situated within the memory of the RAM-PAE, e.g., from address 0x0 to 0x7 (for n=7). Registers may be addressed, for example, by also transmitting the register numbers when the corresponding CMD control instruction (e.g., read_reg, write_reg) occurs, transmitting these as the address to the memory and filling the high address bits with 0.

The starting address for the code would then be, for example, 0x8 (i.e., 0x(n+1)), whereupon the program pointer Rpp would point to a reset. Instead of being stored in the memory, the address pointers may be stored instead in registers implemented separately in order to permit their rapid and simple forwarding to the address lines of the memory.

Figure 5B:
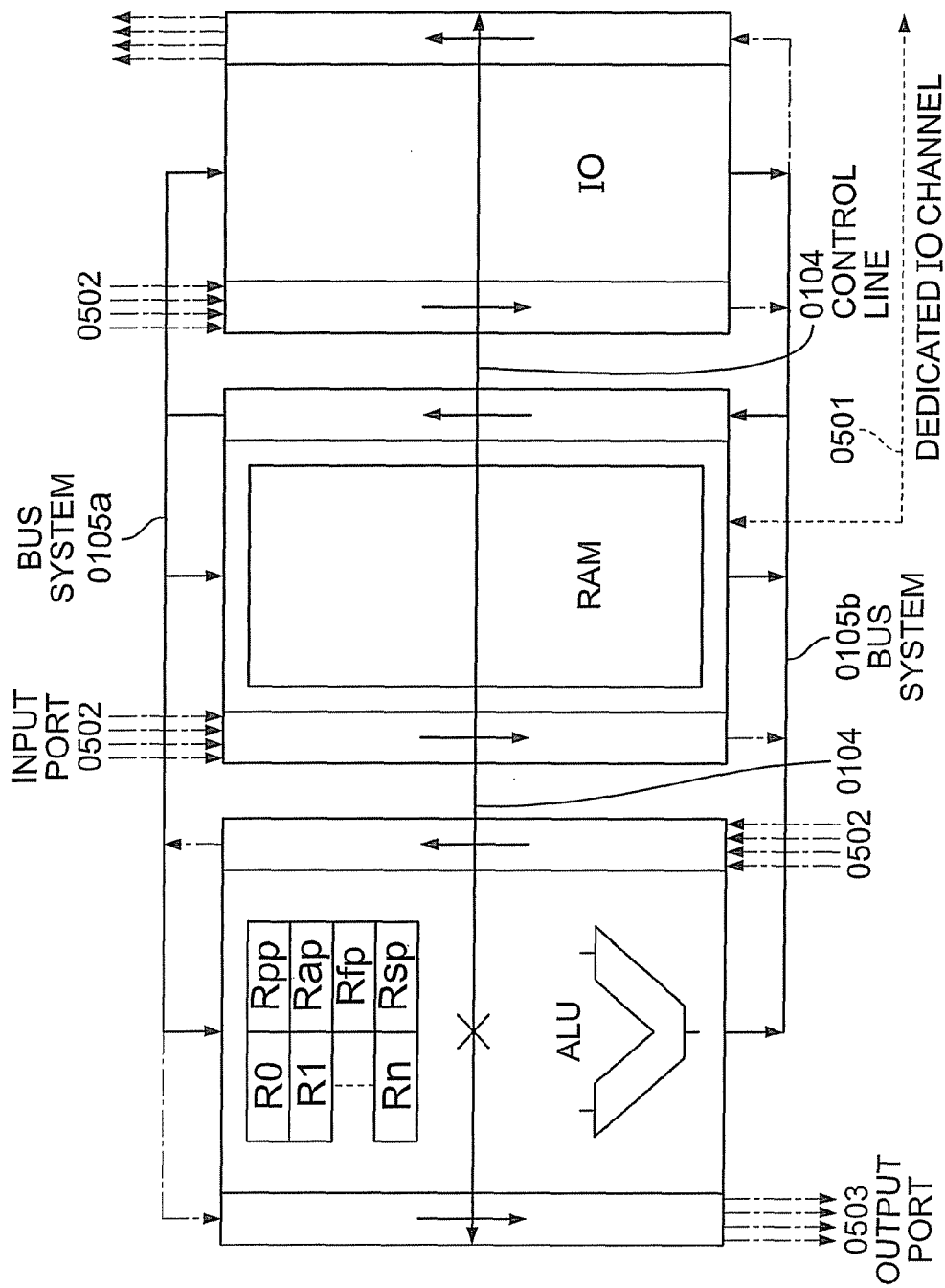

FIG. 5b shows an architecture of one example embodiment of the present invention having a register set inside the ALU-PAE. This may eliminate the complex register transfer operations, so this embodiment may also result in much faster data processing. However, the hardware cost may be higher because the register set is additionally implemented and the addresses are transferred from the ALU-PAE to the RAM-PAE for all memory accesses.

RAMoverPAE

The special design of an ALU-PAE described below (hereinafter referred to as ROP-PAE) may be particularly suitable for VPUs whose applications have irregular sequential codes that access small volumes of data in a largely unordered sequence.

For implementation of this function, a memory may be integrated into an ALU-PAE (integrated RAM=IRAM) to which the ALU has direct read/write access. The ALU may be accordingly expanded by an address management circuit. Therefore, PAEs according to the design described above (IPAEs) may be used in particular, the separate RRAM being omitted if necessary and replaced by the integrated IRAM or the RRAM being provided more or less as a memory expansion in addition to the internal IRAM.

In one example embodiment, a sequencer and/or microcontroller having a, e.g., limited but complete, instruction set (cf. ARC microprocessor) may be integrated into the ROP-PAE, thus permitting processing of sequential codes. In another example embodiment, the function and sequence performance of the sequencer may also be designed to be configurable (as is known in the related art, for example, through EPS448 from Altera [ALTERA Data book 1993]). The sequencer/microcontroller may be able to respond to states (e.g., status signals, events) in the ROP-PAE and/or states (e.g., including triggers) of other PAEs connected to ROP-PAE (e.g., via bus system).

The sequencer/microcontroller may read its program instructions out of the IRAM. Accesses to the bus system of the array (PA) may correspond to the usual PAEs as may the generation, reception, and forwarding of status signals (trigger according to PACT08). Multiple bus connections for data inputs and trigger inputs and for data outputs and trigger outputs may be provided.

The ROP-PAE is able to read operands from the bus, process them in multiple cycles if necessary and write the result back to the bus.

In one example embodiment of the present invention, a register set may be integrated into the ROP-PAE. In one embodiment, the register set may be organized as a stack like the register set of transputers. This may make it possible to keep the register set particularly small and efficient in terms of hardware technology (typically three registers A, B and C are sufficient). In addition, it is known from transputer technology that compilers are able to work efficiently with such an inexpensive register set in terms of hardware technology. Likewise, the register set may optionally be implemented in the RRAM.

In one example embodiment of the present invention, the ROP-PAE may have a direct connection (EXTBUS) to an external RAM and/or an external IO. Depending on the application, multiple EXTBUS devices may be provided. In one example embodiment, the EXTBUS may be implemented via an optionally dedicated connection of the PAE bus system to an interface module (IOAG) such as that known from DE 196 54 595.1-53 or DE 102 06 653.1. The memories (RAM) and/or peripherals (TO) may be triggered via the interface module.

In one example embodiment, the ROP-PAE and, in one embodiment, the IRAM may generate addresses directly automatically for the external RAM, the external TO, and/or other internal memories (RRAM/IRAM) and may automatically control external or internal data transfers. This function may be implemented by independent address generators implemented in the RRAM. For example, DMA controllers are particularly suitable for this function in that they copy data in blocks between the memories. The address space of the data to be read and the target address space may be set accordingly and the copy operation may be started. The setting may be accomplished through the IPAE. In a design that is more complex in terms of hardware, this function may be implemented by a memory management unit (MMU), whose mode of operation is defined and known in the related art. In summary, an MMU may function as follows:

The RRAM memory managed by the MMU may be divided into multiple pages. Each page may contain data of a virtual memory space within an external memory. For example, the hexadecimal RRAM addresses 0x0a00 . . . 0x0aff may contain data of the external memory at the addresses 0xbd13200 . . . 0xbd132ff. To manage the address conversion, an address translation unit may be used, e.g., implemented in the farm of lookup tables. The function of an MFU is in particular to translate a large storage space into a much smaller storage space (in this case the RRAM). This may be carried out by copying pages as needed from the large memory space into the small memory space. As soon as a page is no longer needed, it may be deleted and/or overwritten. If the data on the page has been altered, the page may be written back into the large memory space before being deleted/overwritten. The address conversion unit may operate in such a way that a high part of the physical address (i.e., the address of the page) is stored in the lookup memory and points to the corresponding data on that page in the RRAM as soon as the page is available within the small memory (RRAM). This may allow access to the page. If the page is not present in the RRAM, entry of a reference may be omitted. In this case, the page may first be copied from the large (external) memory space into the RRAM. To do so, another page, e.g., one not currently being used, may be overwritten according to the procedure described above.

The copying may be performed automatically, i.e., without any significant involvement by the sequencer, in that a DMA controller may be triggered by the MMU. The corresponding page addresses in the RRAM and external RAM may be made available by the MMU, as may be the page size (e.g., they are entered into registers).

The ROP-PAE may have a connection to a configuration unit which configures and reconfigures the ROP-PAE according to the usual method. In an example embodiment, the CT may have read and/or write access to the IRAM in order to manage data and/or code for the sequencer in the IRAM.

In one example embodiment, the ROP-PAE may automatically load code for the sequencer out of the external RAM via the PA bus system and/or the EXTBUS.

In an example embodiment of the present invention, the IRAM may be subdivided into multiple segments which may be in different address areas. The segments may be divided for some of the following functions, for example: sequence memory, stack (e.g., for register set), data memory, heap, IO buffer, buffer to external RAM, i.e., cache, lookup tables, configurations for PAEs and/or buses, and the register set of the ROP-PAE.

Depending on the function, the following triggering mechanisms may be provided for this purpose:
sequencer memory/code memory: program pointer to the corresponding memory locations (Rpp);
Stack: stack pointers to the top memory location in the stack (Rsp), optionally also a frame pointer (Rfp), such as that known in the related art (e.g., Intel Pentium);
Configurations for PAEs and/or buses: a pointer within the CT and/or, depending on the implementation, a pointer within the configuration control of the PAE may point to them; and
Register set of the IPAE: if the register set of the PAE should be accommodated in the memory, it may be addressed directly by the PAE, e.g., using that which are fixedly predetermined by the hardware.

The remaining memory areas such as data memories, buffers, and tables may be constructed by the compiler or programmer. These areas may be addressed by the program to be executed and/or the operating system, and the computations may be performed within the program and/or operating system, if necessary with the help of the register set and the ALU of the sequencer.

In one example embodiment, the IRAM may be implemented completely or partially, as described with the IPAEs, by RAM-PAEs outside of the ROP-PAE. For optionally different segments, different RAM-PAEs may be used.

In an example embodiment, some or all segments may be designed as active memories, i.e., they may have a DMA and/or MMU and may thus be able to copy data independently into or out of their memory from or to other memories or peripheral devices. In particular, they may have the functions of the memories known from DE 199 26 538.0, e.g., FIFO, stack, random access, cache, etc., the function being configurable and/or programmable by the sequencer individually for each segment.

In one embodiment, the IRAM may be designed as a multiport memory which may permit optionally simultaneous read and/or write access by multiple memory access units to the memory contents. Memory access units may include, for example, internal and/or external peripherals, processors, or other PAEs.

In one embodiment, the ROP-PAE may function as a local configuration unit, optionally also as a global configuration unit like a CT for ROP-PAEs in the environment or it may also fulfill this function. The ROP-PAE may operate according to the method known from DE 196 54 846.2-53 in use as a local configuration unit. If the ROP-PAE is used as a global configuration unit or if it has a great many local PAEs to configure, then the method according to DE 196 54 593.5-53 may be used. This method has a FILMO functionality and therefore is capable of managing a great many independent configurations. The ROP-PAE may address configurations in the IRAM, controlled by the sequencer/microcontroller, and configure them to PAEs and/or itself and/or determine the sequence of the sequencer/microcontroller. Synchronization using a higher-level configuration unit (e.g., CT or other PAEs) may take place here like the known inter-CT protocols (DE 198 07 872.2, DE 100 28 397.7, DE 199 26 538.0). The ROP-PAE may load configurations via one of the EXTRAM interfaces itself and/or may request configurations from a higher-level configuration unit via the CT interface. The mode of operation may be similar to that of the reconfiguration unit in DE 196 54 846.2-53.

In summary, the basic operation of a ROP-PAE is similar to that of a microcontroller system whose bus connection and/or data transfer and/or program sequence correspond to those of a VPU system. In other words, this is a multiprocessor array in which the bus system is based on the principle of the VPU architecture. The individual processors may be managed by a higher-level control unit (CT). The data transfer may be self-synchronizing via RDY/ACK protocols of the bus systems. The shared processor status, which may be represented by the trigger bus system and may represent the status of a set of processors which may be exchanged among the processors for sequence control, may be regarded as being a particularly essential aspect. Reference is made in this regard to DE 197 04 728.9, DE 101 39 170.6 and DE 101 29 237.6-53.

Likewise, embodiments of the present invention may provide ROP-PAEs which have, in addition to their connection to the internal bus systems of the array of PAEs, a dedicated connection (IO channel) to a supraregional bus system which transmits data in particular over long distances within the array and/or in particular has a direct connection to the peripherals. The connection to the peripherals may be direct, e.g., in that the bus system already corresponds to the peripheral protocol or may take place via corresponding protocol converters for protocol conversion. The dedicated bus system may already correspond to an industry standard (e.g., PCI, RapidIO, Firewire, USB, Ethernet, RAMBUS, DDR-RAM, etc.) to thus permit a simple and uncomplicated connection to the peripheral devices. If necessary, protocol conversions may also be performed in IOAGs connected in between (see DE 196 54 595.1-53) so that an internal simplified and optionally proprietary bus protocol is translated to one or more complex external standard protocols. It should be pointed out in particular that the term peripherals is also understood to refer to memories, as illustrated with the bus protocols already listed.

It is likewise particularly relevant according to the present invention that PAEs may also have multiple connections to dedicated bus systems.

In addition, depending on the application, expedient architectures may be those in which only a subset of the PAEs has connections to a dedicated bus system or different PAEs having a different number of connections to dedicated bus systems, optionally also different bus systems.

The structure described here may be implemented particularly efficiently, in an example embodiment of the present invention, by expanded and improved semiconductor manufacturing methods and structures in that the memory may be situated on the physical chip spatially above or below the logic functions (ALU, control, buses, etc.) of the PAE. For this purpose, one or more additional levels of semiconductor structure (transistor structures) that may be used for additional functions may be applied over the first semiconductor structure (e.g., silicon) which is known from the related art and the transistor structures constructed therewith, these additional structures being usable for additional functions. For example, in a first level the logic and gates of the PAE function may be implemented and in another additional level the memory functions may be implemented.

In one example embodiment of the present invention, the individual semiconductor layers may be separated from one another by an insulation layer. The insulation layer may have feedthroughs (vias) for transmitting signals between the individual semiconductor layers. The wiring structure may be implemented in different ways depending on the application. For example, wiring levels and/or one global wiring level assigned to all the semiconductor layers may be provided directly above each semiconductor layer.

To obtain an economical yield, it is necessary to ensure that the overall circuit, i.e., all the semiconductor structural levels together achieve a sufficiently high yield. In addition, it is noted that the electric power consumption, i.e., the power loss of all semiconductor structure levels together should remain within an acceptable range which does not result in overheating and the resulting failure of the circuit. The corresponding requirements may be met through a suitable combination of the function units of the individual semiconductor levels.

For example, for the proposed architecture, a level of logic semiconductor structures may be provided and another level of memory semiconductor structures that are suitable for these requirements may be provided. Although the irregular and less redundant logic semiconductor structures may have a comparatively high error rate and a high power loss, memory semiconductor structures may be implemented in a comparatively redundant manner to have a lower error rate mid, by using suitable memory methods (e.g., DRAM), they may also be implemented to have a low power loss. Reference is made explicitly to the fact that it is possible to provide fields in which not all memory locations and/or all logic semiconductor structures are fully functional. It is necessary only to ensure minimum requirements and/or proper management. Redundancies may be considered separately for the two structures.

The multiple semiconductor structures may be stacked one above the other in multiples according to various methods. In addition to the method of applying another semiconductor level above an insulation layer as already described above, which may be accomplished by vapor deposition and/or crystal deposition, for example, thermal or mechanical connections are also possible by soldering or gluing the silicon structure that is to be applied, for example. Suitable methods of soldering also include those known from technologies for joining semiconductor chips to capsules. These include for example reflow soldering and thermocompression. In principle, the simple mechanical joining methods are possible, in which case the wiring may then be accomplished by wire bond, for example. The prerequisite for this is that the silicon structures is to have different sizes so that the wires may be wired from one silicon structure surface to the next and the number of connections should be comparatively low in order for them to be implementable via the wire bond technique. To optimize the yield, the redundancy method according to DE 197 57 200.6-33 may be used in particular. It should be pointed out that the method according to DE 197 57 200.6-33 may be provided for all PAEs, in other words for both ALU-PAEs and RAM-PAEs, for example. In other words, the redundancy method described in DE 197 57 200.6-33 may be used for all PAEs. The text methods there are also implementable. For PAEs having mainly fine-grained structures, e.g., memories (RAM-PAEs) or FPGAs, it may be advantageous to provide these fine-grained structures with a similarly fine-grained redundancy, i.e., not or not only providing the RAM-PAE or a PAE having an FPGA structure with a redundant PAE but instead or also providing the fine-grained structure itself with redundancy. This means that redundant memory cells (i.e., FPGA cells) may be assigned to the memory cells (and/or FPGA cells), for example. The connections (lines, buses, etc.) between the particular cells may then be adapted to the requirements of a redundant structure accordingly. The design of redundant structures for fine-grained cells such as memories or FPGAs is already known from the related art, for example. Reference is made thereto for an understanding of design details.

The power loss may be reduced greatly by the methods of DE 196 51 075.9-53 and DE 101 35 210.7-53, thus permitting very high integration densities.

It is pointed out that the number of semiconductor structures stacked one above the other is by no means limited to two. With advancing technological development and optimization, an increasing number of levels stacked one above the other, even a very large number, is feasible.

The division of levels must not be limited to an ALU memory division either in the case of a two-layer structure or a multilayer structure. Even with two-layer structures, the memory may be installed together with the ALUs in one layer and to use the other layer completely for the bus systems or the bus systems and IO triggers (IOAGs). The bus systems may also contain the switching elements (multiplexers, transmission gates, etc.) and/or amplifier elements (drivers, etc.) and/or synchronization elements (RDY/ACK control), each of which may require semiconductor structures for implementation.

In addition, it may be expedient to provide a level for the configuration memories and/or configuration registers and/or CTs and their memories.

Figure 6:
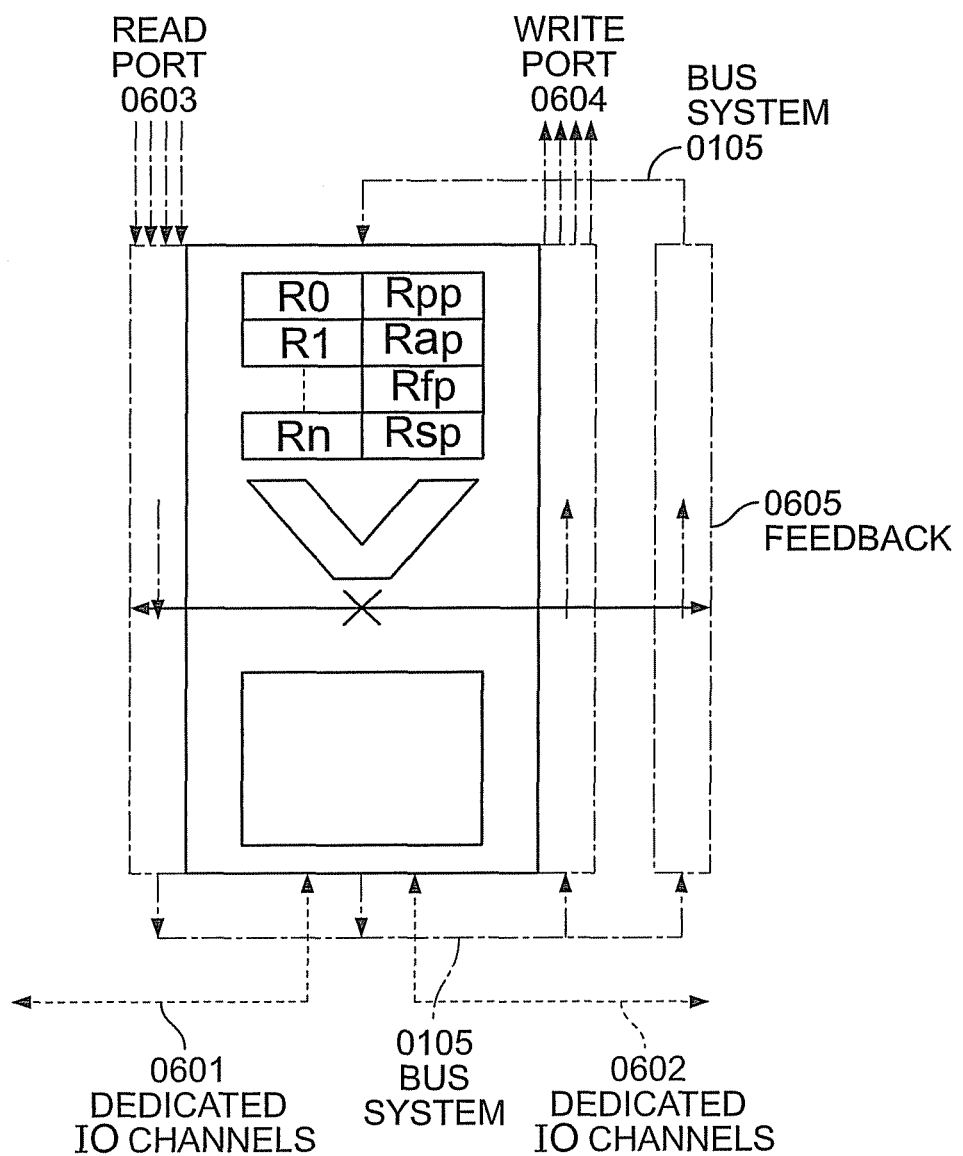
FIG. 6 is a diagram that illustrates implementation of a ROP-PAE, according to an example embodiment of the present invention.

FIG. 6 shows an implementation of a ROP-PAE, according to an example embodiment of the present invention. Architectonically, the RAM-PAE is shows to be implemented within the ALU-PAE. The entire register set (R0 . . . Rn, Rpp, Rsp, Rfp, Rap) is shown to be situated in the ROP-PAE. Access to the registers through the ALU may be possible quickly and using few resources. Addresses and data may be transmitted directly from the ALU to the memory without requiring a bus system outside of the ROP-PAE such as 0105. A ROP-PAE may have one or more dedicated IO channels for data transmission with the peripherals (e.g., 0601, 0602). Data connections to the remaining PAEs may be implemented through FREG and BREG, as is already known, indicated here by read port 0603 and write port 0604.

ROP-PAEs may be designed internally as sequencers and may thus already have an internal feedback of the ALU output to the registers. Optionally, this may also be accomplished by using a bus (e.g., 0105) external to the ROP-PAE and/or using a feedback through a BREG, as is already known (0605).

FIG. 7 shows various design variants of semiconductor stacks. FIG. 7*a* shows a design using wire bond connections for data transmission (0701) where two dice (0702, 0703), i.e., two chips, are mounted one above the other. In its simplified form, a chip may have a semiconductor level for implementation of transistors (e.g., silicon, 0704), multiple metal layers for implementation of connecting lines (for example, aluminum and/or copper; three layers are shown here 0705*a*, *b*, *c*), each separated by an insulation layer from the others and isolated, electrically from 0704, and an upper high-resistance insulation layer 0706. Feedthroughs made of metal, also known as vias, may be inserted into the insulation layers for electrically connecting the individual levels.

FIG. 7*b* shows the two dice connected to one another by a type of flip-chip technology, signals being transmitted through "bumps" according to the related art. In addition to the possibilities of connecting bumps (0711), which is provided by the flip-chip technology, to the top metal layer in each case, the particular inventive design whereby the bumps are contacted beneath the semiconductor layer (e.g., silicon) is also presented here. To do so, electric connections (e.g., aluminum or copper), i.e., vias (0712) may run downward through the silicon layer. This may be formed by etching appropriate holes into the semiconductor level. An insulation may be inserted between the connections and the semiconductor layer. The feedthrough may be accomplished as indicated in FIG. 7*d* either directly through the semiconductor layer or first troughs (0731) may be etched into the semiconductor layer and then filled with insulation into which the vias may then be introduced.

FIG. 7*c* shows an example embodiment for implementation of semiconductor stacks. Above the top insulation layer (0721) of a first semiconductor structure, which in this case may be thinner, another semiconductor level (0722) may be applied. To do so, the insulation layer (0722) may be first made as planar as possible by etching and/or grinding. The semiconductor may be applied by vapor deposition, crystal deposition, or by gluing or glue-like joints. It may be essential, particularly when using glued joints, to be able to etch through the applied semiconductor structure and the joining material (e.g., adhesive material). This through-etching may be necessary to be able to run contacts as described in conjunction with FIG. 7*b* to the vias in the insulating layer beneath them.

The feedthrough of the contacts may be accomplished according to FIG. 7d, e.g., by etching narrow channels into which an insulation material is introduced. Then, in a second step, a narrower via may be inserted into the insulation material, e.g., by first creating a hole of a corresponding diameter, e.g., by etching in the insulation material.

According to a method of one example embodiment, larger troughs (0731) may be etched and filled with insulation material. Then, if necessary, multiple vias (0712) may be introduced into the troughs as described above.

Figure 7E:
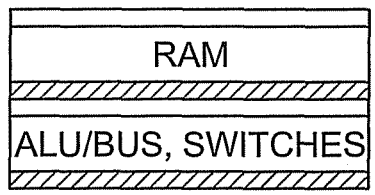
FIG. 7 shows various design variants of semiconductor stacks, according to embodiments of the present invention.

FIGS. 7e, f, g, h show different functional divisions of such semiconductor stacks. The semiconductor level is shown with hatching in each case and the insulation layer is shown with a thick boundary. The metal layer is inserted between them. As indicated in FIGS. 7g and 7h, the construction is not limited to two stacks; likewise larger stacks, e.g., with three, four, or more levels, are also possible.

The separation between the memories and ALUs which have already been depicted repeatedly is shown in FIG. 7e.

Figure 7F:
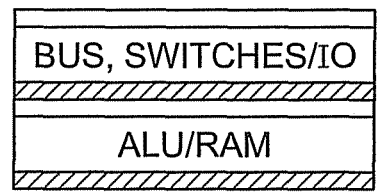

FIG. 7f shows the separation of buses with the necessary switching units and the IO structure from the ALUs and memories which in this example are situated in the same plane.

Figure 7G:
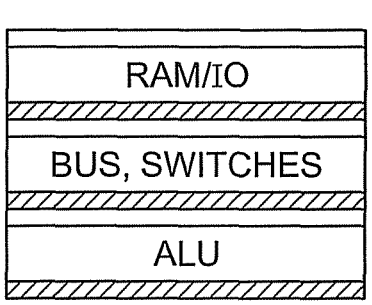
Figure 7H:
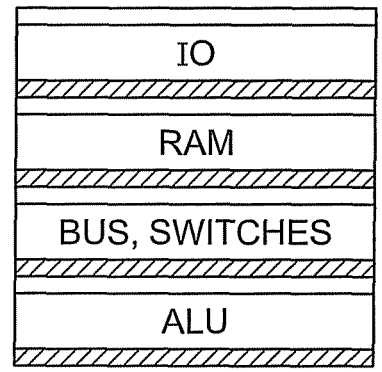

In FIG. 7g, the ALUs are located on the bottom level. The memories and optionally the drivers of the IOs are on the top level. Thus, the structures having a high power loss are situated at the outer edges of the stack. This may be provided in one example of the present invention, in particular because it may permit particularly optimal heat dissipation. The bus systems and their switching units are shown to be situated in the middle level.

In the example of FIG. 7h, buses and memories having a low power loss are accommodated in the middle levels. ALUs and the IOs which have a particularly high power consumption are accommodated at the edges for optimum heat dissipation.

IOx-PAEs

DE 199 26 538.0 describes memories (IORAM-PAEs) having a dedicated connection to external units such as peripherals and/or memories. In addition, DE 196 54 595.1-53 and DE 102 06 653.1 describe dedicated units (e.g., interface modules (IBGs)) for connecting external units such as peripherals and/or memories. Both methods have the problem that additional complexity is required for data communication between PAEs, in particular data processing and/or data computing PAEs and external units because the data must be transmitted explicitly between the PAEs and IBGs and/or IORAM-PAEs.

In an embodiment of the present invention, as already mentioned above repeatedly, one or more dedicated connections (IO channels) may be provided to external units such as peripherals and/or memories for any PAEs, but in particular for data processing PAEs and/or data computing PAEs (e.g., ALU-PAEs according to DE 196 51 075.9-53, IPAEs, ROP-PAEs) and data storing PAEs (RAM-PAEs according to DE 100 50 442.6). This may permit direct communication among PAEs, referred to below as IOx-PAEs, and external units. An advantage of this architecture is that the connection of the array of PAEs (PA) to the peripherals (external memory and/or IO units) may be constructed much more efficiently. The existing configurable bus systems of the PAEs among one another (BUS) need not be burdened with the IO data transfers. Furthermore, with a suitable design of the IO channel, addressing of individual PAEs or addressing of the data for individual PAEs may be performed much more easily than would be the case via the bus. This may be implemented by each unit connected to an IO channel having its own unique address. With this address, each unit may be addressed explicitly and easily by transmitting the address over the IO channel and each unit comparing this address with its own. If the addresses match, the unit is being addressed and the data is intended for this unit. Each unit may transmit, not only the destination address, i.e., the address of the unit for which the data is intended, but also its own address in order to permit identification of the sender.

It may be particularly efficient to provide IO channels for only a subset of all of the PAEs. For example, it is possible to provide only strips of PAEs with IO channel expansion within a PAE array (PA). This may yield an improved area efficiency and cost efficiency in comparison with implementation of the IO channel expansion in all PAEs.

PAEs which have particularly high communication requirements may also be connected to several IO channels, depending on the application.

The dedicated IO channels may be implemented on different bus systems, e.g., in particular according to DE 197 04 742.4 or as a parallel standard bus system such as Rapid IO, PCI, AMBA, or serial standard bus systems such as USB, Firewire or Ethernet.

The implementation of IO channels in PAEs may be particularly efficient if they are not connected directly to the external units but instead are first connected to an IO management unit (IOAG) which may be designed like the protocol converter according to DE 102 06 653.1 or the IOAG according to DE 196 54 595.1-53. The advantage is that a simple internal bus protocol may then be used to control the IO channels. Likewise, only a little "intelligence" is required in each PAE having an IO channel, so that the PAEs may be small in terms of surface area and are not complicated to program.

The actual management and triggering of the external units may be handled in the IOAGs which may be designed to be much larger and more complex.

The IOAGs may themselves have their own sequencer and/or microcontroller and, if necessary, also their own memory to fulfill their function. In particular, the IOAG may also have memory management units and address translation units. Depending on the application, interrupt controllers such as that known according to the related art (i8259) may also be implemented in the IOAG, translating interrupts to trigger signals according to DE 197 04 728.9.

SIMD PAEs

Using reconfigurable technologies for processing algorithms results in an important paradox: (1) complex ALUs are necessary to achieve the highest possible computation performance, but the complexity for the reconfiguration should be minimal; (2) the ALUs should be as simple fine-grained as possible to permit efficient data processing on a bit level; (3) the reconfiguration and data management should be accomplished so intelligently and rapidly that they are easy and efficient to program.

Previous technologies have used either a) very small ALUs having little reconfiguration support (FPGAs) which are efficient on a bit level or b) large ALUs (Chameleon) having little reconfiguration support or c) a mixture of large ALUs and small ALUs having reconfiguration support and data management (VPUs).

The VPU technology being the most efficient technique, an embodiment of the present invention may provide an optimized method created on the basis thereof. It is pointed out that this method may also be used for the other architectures.

The surface area required for efficient control of reconfigurations may be comparatively high with approximately 10,000 to 40,000 gates per PAE. Below this gate level, as a rule, it is possible to implement only simple sequence controls which greatly restrict the programmability of VPUs and make it difficult to use them as general purpose processors. If the goal is a particularly rapid reconfiguration, additional memories may be provided so the required number of gates is greatly increased again.

To obtain a proper ratio between reconfiguration resources and computation performance, large ALUs (many functionalities and/or large bit width) may be used. However, if the ALUs become too large, the usable parallel computation power per chip drops. If the ALUs are too small (e.g., 4 bit) then the use of resources required for configuration of complex functions (e.g., 32 bit multiplication) is too high. In particular, the wiring complexity increases into ranges that are no longer reasonable commercially.

SIMD Arithmetic Units

To obtain an ideal ratio between the processing of small bit widths, wiring complexity, and configuration of complex functions, SIMD arithmetic units within ALU-PAE (i.e., in particular the PAEs disclosed in the present application according to the present invention, as well as in PAEs according to DE 196 51 075.9-53 and DE 199 26 538.0) may be used. Arithmetic units of width m may be divided in such a way as to yield n individual blocks of width b=m/n. Through configuration, it may be specified for each arithmetic unit whether the arithmetic unit is to be broken down into one or more blocks and whether they should be of the same width or different widths. In other words, an arithmetic unit may also be broken down in such a way that different word widths are configured at the same time within an arithmetic unit (e.g., 32-bit width, broken down into 1×16, 1×8, and 2×4 bits). The data may be transmitted among the PAEs in such a way that the data words that have been broken down (SIMD-WORD) are combined into data words of bit width m and transmitted as a packet over the network.

The network may always transmit a complete packet, i.e., all data words within a packet, e.g., according to the known handshake method. Individual data words within the packet may also remain unused, i.e., they may not contain any information. This may be implemented through additional status lines and/or handshake signals such as the RDY/ACK protocol.

SIMD Bus Systems

For efficient use of SIMD arithmetic units, flexible and efficient re-sorting of the SIMD-WORDs may be necessary within a bus or between two different buses.

Figure 12A:
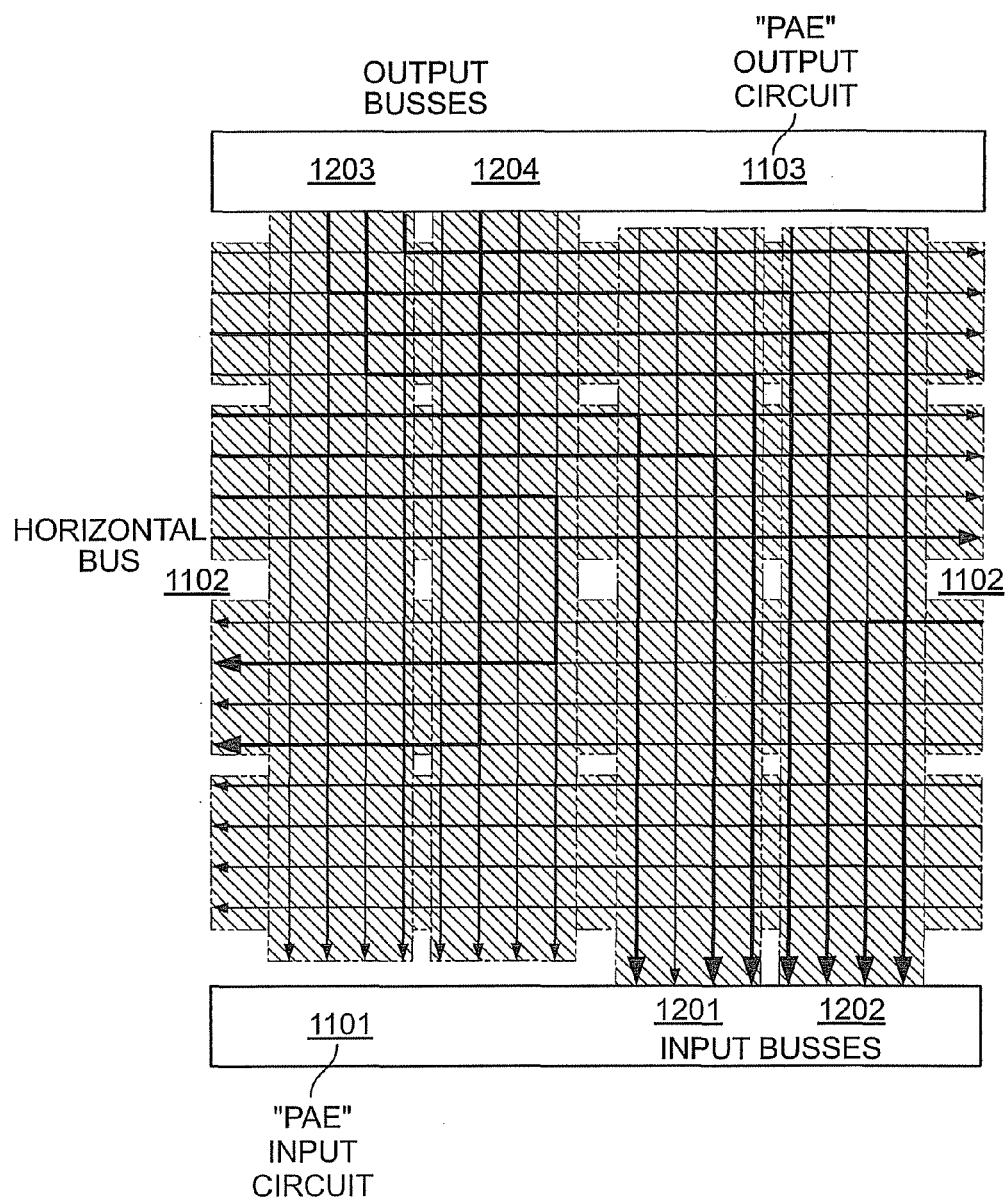
FIG. 12 is a diagram that illustrates buses in a matrix structure, according to example embodiments of the present invention.

The bus switches according to FIG. 11 may be modified in such a way that a flexible interconnection of the individual SIMD-WORDs is possible. To do so, the buses may be designed to be divisible by multiplexers, bus switches, transmission gates, pass transistors (hereinafter referred by the collective term multiplexer), for example, according to the arithmetic units so that the division may be determined by the configuration. In other words, instead of using a multiplexer of width m per bus, for example, n individual multiplexers of width b=m/n may be used. It is now possible to configure the data buses for a width of b bits. Re-sorting of the data is also possible due to the matrix structure of the buses (FIG. 11) as depicted in FIG. 12a.

The handshakes of the buses may be logically gated in such a way that a common handshake for the newly organized bus is generated from the handshakes of the original buses. For example, a RDY may be generated for a newly sorted bus from a logic AND gate of all RDYs of the buses supplying data for this bus. Likewise, for example, the ACK of a bus supplying data may be generated from an AND gate of the ACKs of all buses which process the data further. In principle, with this implementation suitable gates may be selected so that they correspond to the bus protocols used in each case.

In a first embodiment, the handshakes may be gated within each bus node. This makes it possible to assign only one handshake protocol to a bus system of width m composed of n subbuses of the width b.

In another embodiment, all the bus systems may be designed with a width b which corresponds to the smallest implementable input/output data width b of a SIMD-WORD. According to the width of the PAE data paths (m) there is now an input/output bus of m/b=n subbuses of width b. For example, a PAE having three 32-bit input buses and two 32-bit output buses actually has 3×4 eight-bit input buses and 2×4 eight-bit output buses for a smallest SIMD-WORD width of eight. Each of the subbuses may have all the handshake signals and control signals that are used, e.g., RDY/ACK and the Reconfig trigger according to DE 197 04 728.9 and a global reset signal, etc.

The output of a PAE may send the same control signals for all n subbuses. Incoming acknowledgment signals of all subbuses may be logically gated, e.g., by an AND function. The bus systems may freely switch each subbus and route it independently. The bus systems and in particular the bus nodes do not process and/or gate the handshake signals of the individual buses independently of their routing, their configuration and sorting.

In the case of data entering a PAE, the control signals of all n subbuses may be gated in such a way as to generate a generally valid control signal more or less as a bus control signal for the data path. For example, in a "dependent" mode of operation RdyHold stages may be used for each individual data path and only when all RdyHold stages signal pending data is the data taken over by the PAE. In an "independent" mode of operation, the data of each subbus may be written independently into input registers of the PAE and acknowledged, so that the subbus is immediately free for the next data transmission. The presence of all required data from all subbuses in the input registers may be detected within the PAE by a suitable logic gating of the RDY signals stored for each subbus in the input register, whereupon the PAE may begin data processing.

An important advantage of this method is that the SIMD property of PAEs does not have any particular influence on the bus system used. Simply more buses (n) of a lesser width (b) are needed. The interconnection itself may remain unaffected. The PAEs may gate and manage the control lines locally. This may eliminate the additional hardware in the bus systems for management and/or gating of the control lines.

FIG. 11 shows a design of a bus structure for VPU architectures, according to an example embodiment of the present invention. The output circuit of a function cell, e.g., (PAE, FREG/BREG) (1103, corresponding to 0803*a, b*) may be connected to the horizontal bus system (1102, corresponding to 0105) via a vertical bus. Similarly, the input circuits of the function cells (1101, corresponding to 0801, 0802) may pick up information from the horizontal bus system via a vertical bus. The figure shows how such a pickup, i.e., such a transfer, may take place. As shown in FIG. 11*a*, the transfer of an output bus (1111) from 1103 to 1102 may take place through an "isolation" of a bus of the horizontal bus system 1102 and the insertion of horizontal switches (1112) which may be implemented by switches, transmission gates, multiplexers, or similar suitable components. Depending on the value of a decoder and/or configuration bit (indicated by switch symbol 1113) which is situated and configured in a configuration register of the PAE according to the known configuration method, the switch may either connect the two halves of horizontal bus 1102 together or switch bus 1111 up to the one-half of 1102 in which case the other half of 1102 may then be interrupted and not forwarded. This circuit may be used for each bus of the horizontal bus system.

FIG. 11*b* shows the corresponding circuit for picking up data from 1102 and for forwarding same to 1101. Data may be picked up bit by bit from the buses of the horizontal bus system (1102) and transmitted to input circuit 1101 on the vertical input bus (1121) via vertical switches (1122) which may be implemented by switches, transmission gates, multiplexers, or similar suitable components. The vertical switches, i.e., their switch function, may be triggered by decoders and/or configuration bits (indicated by switch symbols 1123) which may be situated and configured in configuration registers of the PAE according to the known configuration methods. FIG. 11*b* and, with appropriate modification, also FIG. 11*a* may allow n:1 data transitions, i.e., multiple buses may be combined into one bus, i.e., the data of multiple buses may be combined on one bus. FIG. 11*c* shows the bus isolation function of the horizontal VPU bus systems (1102). Each horizontal bus individually and by itself may be isolated from the output side of the PAE edge. Isolation may be accomplished through multiplexers or switches as indicated in FIG. 11*c*. Depending on configuration bit 1132 which may be available individually for each bus of the bus system, the data transmission onto the adjacent bus system (1131) may be enabled or suppressed. This function may be implemented in the switches according to FIG. 11*a* in that the information of configuration bit 1132 is transmitted to the switches (1112) of the adjacent bus system (1131) and accordingly the switches may be enabled to forward the information or the switches may be blocked (disabled).

FIG. 12*a* shows a SIMD bus system corresponding to FIG. 11, including a simplified horizontal bus system 1102, a PAE output circuit 1103 and a PAE input circuit 1101. Each input circuit may have, for example, two input buses of the width 32 bits (1201, 1202) and each output circuit may have two corresponding output buses (1203, 1204). Each bus (1201, 1202, 1203, 1204) may be divided into four subbuses of 8 bits each which may be routed differently and independently, as depicted here, while some of the subbuses are not in use (dotted line). The flexible wiring may be achieved by designing the switches according to FIGS. 11*a-c* for each bus separately in such a way that one subbus is managed by one switch having its own configuration. Therefore, the bus system may be wired up in a fine-grained design.

Figure 12B:
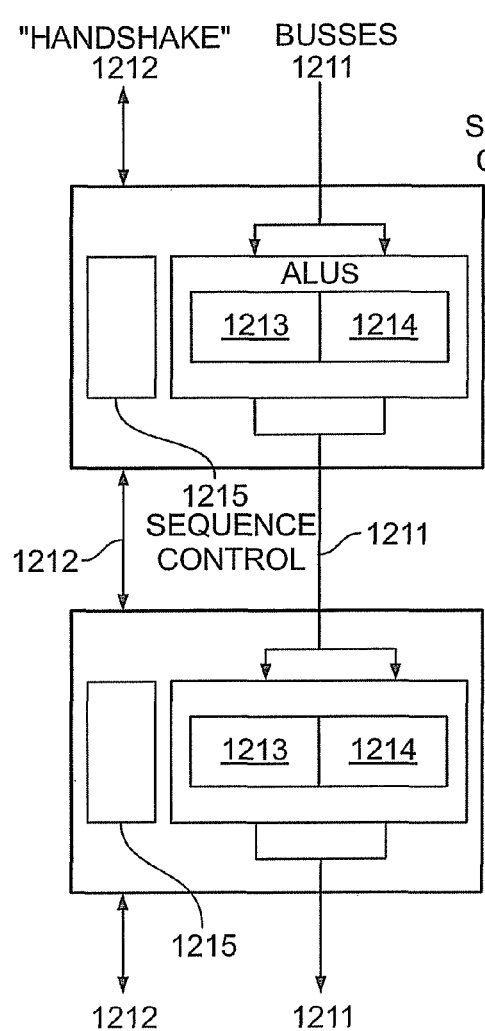

FIG. 12*b* shows a SIMD data processing in which all buses (1211) have the same handshake (1212). The buses may be divided into subbuses within a PAE and may be processed separately in the SIMD-ALUs (1213, 1214). The shared handshakes may trigger the sequence control (1215) of the PAEs or may be generated thereby.

Figure 12C:
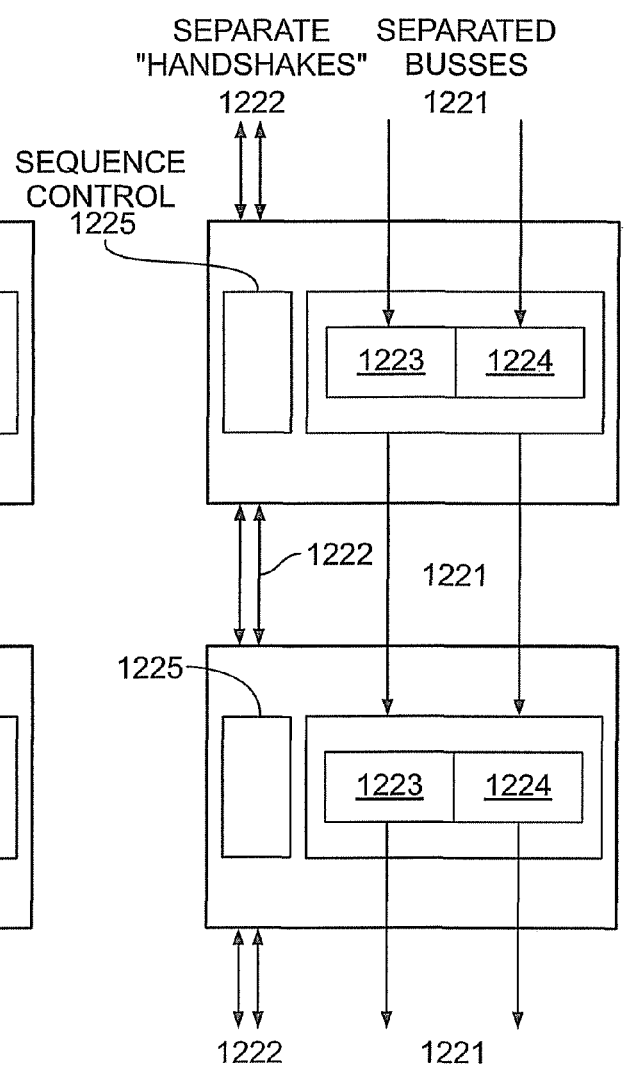

FIG. 12*c* shows a SIMD data processing in which all buses are completely separated (1221) and have separate handshakes (1222). The buses in the SIMD-ALUs (1223, 1224) may be processed separately. The separate handshakes may trigger the sequence control (1225) of the PAEs or may be generated thereby.

Use of FPGAs as the ALU Core

PACT13 has already described an architecture in which instead of an ALU, an FPGA or FPGA-like structure is integrated into a PAE. This structure is configured according to the related art within a PAE according to the FPGA configuration methods, i.e., the expanded configuration methods according to PACT02, 04, 05, 10, 13, 17 are not applicable to the FPGA structure. Therefore, the effort and cost for the configuration control of the relatively small FPGA cells are low. However, the PAE, which contains the FPGA cells, behaves according to the VPU configuration method as described in the aforementioned publications. Therefore, the FPGA structure is encapsulated in the PAE structure and behaves like a PAE object having a plurality of configuration registers.

Any operations may therefore also be mapped onto an array of FPGAs. According to DE 101 35 210.7-53, a mixture of ALU-PAEs and PFGA-PAEs within a VPU is possible and quite appropriate.

A decision should be made on the basis of the field of application as to whether a multiple set of configuration registers is appropriate for the FPGA cells because the number of cells is very high. If necessary, configuration registers for rapid reconfiguration of an FPGA-PAE according to DE 196 51 075.9-53, DE 199 26 538.0 and in particular DE 100 28 397.7 (FIGS. 18 and 19) may be implemented as register files or a FIFO structure within the PAE and may be loaded from there into the FPGA cells.

In an example embodiment of the present invention, a FPGA structure may be assigned to the ALU within an ALU-PAE by placing the FPGA structure upstream from and/or downstream from and/or in parallel with the ALU. An embodiment in which the FPGA structure is downstream from the ALU may be preferred.

An advantage may be that only relatively small FPGA structures need, to be used because all the arithmetic, operations are still taking place in the ALU. Therefore, a particularly high performance/cost efficiency may be achieved. To support small word widths (4 bit, 8 bit, etc.), it is particularly advisable to use the SIMD-ALUs described above.

Correlators and PNG generators in particular may be constructed in a particularly efficient manner by connecting FPGA structures downstream from an ALU.

An embodiment of the present invention may provide for the use of VPU architectures in particular for replacement of ASICs for a moderate and low number of parts. This area of application of VPU modules has the special feature that the application fields are very clearly defined and frequently only a few applications are executed on the modules. In particular, these areas of application frequently require fine-grained FPGA structures for bit-by-bit processing of data.

Due to the limitation to a few applications, the possible configurations of the FPGAs here may also be very limited and predictable. It has been found that it is worthwhile in particular for these areas of application, for example, to separate the reconfiguration of the FPGA structures from rapid reconfiguration of the coarse-grained structures. In other words, slower reconfiguration methods (e.g., conventional serial methods) are used for the FPGAs and are implementable in an extremely cost- and surface area-efficient manner.

For this purpose, (1) a completely separate configuration system including a bus system and configuration controllers may be constructed, as is known for FPGAs according to the related art; and (2) the configuration resources of VPU technology may be used but without resources for special accelerating measures being made available. For example, access to the FILMO may be precluded for FPGA structures according to DE 196 54 593.5-53, DE 198 07 872.2. Similarly, the presence of configuration register stacks, according to DE 100 28 397.7 or as described below, may be omitted. Likewise, the support of fast wave reconfiguration according to DE 199 26 538.0, DE 100 28 397.7 may be omitted. It is possible to assign a PAE to an FPGA array for reconfiguration. In this case, the PAE need only be configured to load the FPGA structure, which may take place as described above through PAE-controlled independent access to data from the outside.

For cost reasons in particular, it may be advisable to provide an embodiment in which "1× configurable" architectures are used instead of multiple reconfigurable architectures because they save on resources. The VPU modules may then be personalized once before being delivered to the customer or at the customer's place and/or by the customer, i.e., the FPGA structures may be configured for their function which is to be performed. The function of the FPGA structures cannot then be modified subsequently, while all the remaining functions such as those of the ALUs and their interconnection continue to be completely run-time configurable in accordance with VPU technology.

In particular the known ROM, EPROM, EEPROM, FLASH-based methods are suggested as "1× configurable" technologies. It should be pointed out in particular that the known fuse and antifuse methods (e.g., Atmel, Actel, Quicklogic) are particularly suitable for implementation of such "1× programmable" FPGA structures.

The basic design of such structures will not be discussed further here because this is sufficiently well known from the relevant related art, in particular the patents by the companies listed above.

FIG. 8 shows as an example a PAE according to an example embodiment of the present invention. The data path of the PAE is shown. The connection to bus system 0105 may be implemented by input modules 0801 and 0802, which may contain registers, and output module 0803, which may also contain registers. Downstream from the ALU (0804) may be a function unit of fine-grained FPGA cells (0805) which may be interconnected via a bus structure. The output of 0804 may be connected to this bus structure and the bus structure may be in turn connected to 0803. Optionally, a bypass of the output of 0804 may be connected directly to output module 0803 bypassing 0805 by using a multiplexer.

Multiple stages of logic may be configured into the FPGA cells, in particular some or all of the following functions: multiplexer, AND, OR, XOR, NOT functions, half-adders, comparators, shift registers, registers, and Boolean lookup tables.

The FPGA cells (0805) may be configured via the configuration bus (0404) of the PAE. Special configuration accelerating modules such as configuration stacks (0406) for configuration of FPGA cells may be omitted. If necessary, these modules may be switched to a passive status for such configuration data or the configuration data may be sent bypassing them.

In one example embodiment, a permanent 1× configuration of the FPGA cells may be provided, using ROM elements such EPROM, EEPROM, Flash ROM or fuse/antifuse technologies.

FIG. 9 shows possible embodiments of PAEs according to the present invention. The embodiment in FIG. 9a and that in FIG. 9b may also be implemented simultaneously together in one PAE.

FIG. 9a shows the connection of a register file (0901) (e.g., R0 ... Rn) to a core (0902) which may be made up by an ALU such as 0804 or an ALU (0804) and FPGA cells (0805). The result data of the core may be sent to registers 0901 where it may be stored depending on the operation. Registers 0901 may be connected to the inputs of the ALU via multiplexers (0903, 0904), depending on the operation to be performed.

FIG. 9b shows a similar structure in which an additional transfer unit (0901) is implemented for a dedicated global bus (0912) (e.g., IO channel). The result data of the core may be sent to transfer unit 0911 where it may be transmitted to the global dedicated bus (0912) depending on the operation. Data from 0912 intended for the PAE may be sent via multiplexers (0903, 0904) to the inputs of the ALU, depending on the operation to be performed.

Optionally transfer unit 0911 may read data directly from bus system 0105 or transmit data to it via bus transfer units 0913 and 0914.

FIG. 10a shows the use of dedicated global bus systems within an array of PAEs (1001). To this extent this corresponds to the diagram of PAs from FIG. 1 (0101). A set of PAEs (1001) may be connected to global dedicated bus systems 1002, 1003, 1004 and may send data to them or receive data from them. The data may be transmitted between PAEs and between PAEs and IOs. This shows that PAEs may also be connected simultaneously to a plurality of global dedicated bus systems while other PAEs might not have any connection.

FIG. 10b shows, for example, the connection of a global dedicated bus (e.g., 1002, 1003, or 1004), which is connected to a few PAEs (1001) within the array of PAEs (0101), to modules outside of 0101, optionally also external to the component. The modules may be, for example, peripherals (1011) and/or memories (1012). For connection of the modules (1011, 1012) on the outside, the signals may be adjusted, if necessary (e.g., voltages: CMOS, TTL, LVDS, etc.).

FIG. 10c shows an example of the connection of a global dedicated bus (e.g., 1002, 1003, or 1004), which is connected within the array of PAEs (0101) to a few PAEs (1001) and then to an interface module (1021). The interface module may translate the protocols and/or signals of the internal dedicated bus onto one or more buses on the outside. In the example shown here, two outside buses (1022, 1023) are implemented. The bus systems may be of different designs, e.g., 1022 may be a memory bus system for memories (1024) such as SDR-RAMs, DDR-RAMs, RAMBUS or the like, while 1023 may be a peripheral bus system for peripheral devices and/or IO devices (1025), e.g., PCI or a serial protocol such as USB, FireWire or Ethernet.

Configuration of Complex Arithmetic Units

Complex arithmetic units (e.g., floating point arithmetic units) may be implemented through suitable wiring and grouping of configurable cells (PAEs), possibly also those of different designs (RAM-PAEs, ALU-PAEs, buses).

For example, a floating point arithmetic unit may be achieved by a suitable connection of a plurality of ALU-PAEs which perform the arithmetic operations via exponent and mantissa. The forward and backward registers (FREG/BREG) integrated into the VPU of the assignee of the present application (XPP technology) may be assigned to the ALU-PAEs to perform the required normalizations by shift operations of the barrel shifters situated in the FREG/BREG. Thus, floating point arithmetic units may be constructed as needed on the basis of the integer ALUs with a high surface area efficiency.

One advantage of this method is that no silicon surface area need be used for fixedly integrated floating point arithmetic units. Since floating point operations are used only rarely in relation to integer operations, this may greatly increase the benefit/cost ratio. Compilers which translate the high level language programs to a VPU may be able to translate corresponding prefabricated complex structures into the machine code (e.g., NML) through macroexpansion and/or by, using run-time libraries.

For machine code programs (e.g., NML), library calls to libraries containing the corresponding complex functions in prefabricated form are particularly recommended.

State Machines via RAM-PAEs

RAM-PAEs connected to an array of PAEs may be used for constructing sequencers. The basic principle is that output data of a memory may be fed back to its address input. The feedback may take place via a clock pulse-controlled register. This may result in a sequencer whose next cycle is predetermined by the current cycle.

Parts of the output data (CONTROL signals) may then be transmitted to other modules and/or function cells (PAEs) and/or to external devices to trigger certain processes there. Two types of transmission which are usually used together and which may be used in this case are:

a) transmission via a databus, e.g., designed in particular as a SIMD bus according to the preceding discussion, so that a partial transmission of the output data is implementable in a particularly efficient manner; and b) transmission via a trigger bus, for which an embodiment and operation are described in PACT08. States and conditions for sequence control of modules and/or function cells (PAEs) and/or external devices may be transmitted particularly efficiently via trigger buses.

The input addresses and/or output data may be constructed as follows (diagram: high bits low bits):

| Address: | |
|---|---|
| Address of the current cycle | |
| Data: | |
| Address of the next cycle | CONTROL signals |

The input data is typically not used, i.e., there is only read access to the memory, not write access. The content of the memory (e.g., RAM-PAE) may be preconfigured by a configuration unit. Therefore, the memory may also be constructed in particular as a nonvolatile 1× programmable memory using RAM, EPROM, EEPROM or flash cells or based on fuse or antifuse technologies. The memory may then be personalized, i.e., programmed, as described above before delivery to the customer or at the customer's location.

Memory access by other PAEs is fundamentally possible in order to modify the sequencer, e.g., during operation, but further description of this aspect is not included since it not required for an understanding of the present invention.

The sequencer according to an example embodiment of the present invention may respond to events through the following expansions in its sequence of cycles and may perform limited jumps in particular:

A part, e.g., the low portion, of the input addresses to the memory may be used as input for other status signals. These status signals may be transmitted by the types of transmission discussed above and thus may be data or triggers. In the selection of the following cycle, a possible number of cycles may then be determined by the data feedback to the, e.g., high, address bit and the certain cycle may then be selected from the possible number through the status signals of the low address bits.

This may result in the following structure of the input addresses and/or output data (diagram: high bits ... low bits):

| Address: | |
|---|---|
| Address of the current cycle | Status signals |
| Data: | |
| Address of the next cycle | CONTROL signals |

Thus, a full-value sequencer may be defined which corresponds to the basic principles of the Mealy-Moore sequencers.

The status signals and/or control signals may now be grouped into bundles, if necessary, in such a way that one group of certain transmitters/receivers is available, e.g., a group for 0101-internal PAEs, a group for external modules, and a group for the configuration unit.

In other words, all jumps are implemented by specifying the "address of the next cycle." Conditions may be implemented by the status signals.

With respect to how to handle so-called "don't cares," i.e., certain status signals whose value in a cycle is irrelevant, in an example embodiment of the present invention, the same data may be defined for all possible values.

Example

Within an address having the following structure

| Address of the current cycle | Status signals |
|---|---| the "address of the current cycle" (cycle) should be equal to 0x60, for example, corresponding to CYCLE60. Four status signals (ZS0 ... 3) may be provided, two of which (ZS3 and ZS1) according to the value within the exemplary cycle may lead to other jump destinations, i.e., according to CYCLE10, CYCLE7, CYCLE89, CYCLE56, for example.

The table is now as follows:

| Address Cycle | ZS3 | ZS2 | ZS1 | ZS0 | Data |
|---|---|---|---|---|---|
| CYCLE60 | 0 | ? | 0 | ? | CYCLE10[10] |
| CYCLE60 | 0 | ? | 1 | ? | CYCLE7 |
| CYCLE60 | 1 | ? | 0 | ? | CYCLE89 |
| CYCLE60 | 1 | ? | 1 | ? | CYCLE56 |

The don't cares (ZS2, ZS0) are now occupied, so that the value of their signal has no effect on the assignment of the address to the data:

| Address Cycle | ZS3 | ZS2 | ZS1 | ZS0 | Data |
|---|---|---|---|---|---|
| CYCLE60 | 0 | 0 | 0 | 0 | CYCLE10 |
| CYCLE60 | 0 | 0 | 0 | 1 | CYCLE10 |
| CYCLE60 | 0 | 0 | 1 | 0 | CYCLE7 |
| CYCLE60 | 0 | 0 | 1 | 1 | CYCLE7 |
| CYCLE60 | 1 | 0 | 0 | 0 | CYCLE89 |
| CYCLE60 | 1 | 0 | 0 | 1 | CYCLE89 |
| CYCLE60 | 1 | 0 | 1 | 0 | CYCLE56 |
| CYCLE60 | 1 | 0 | 1 | 1 | CYCLE56 |
| CYCLE60 | 0 | 1 | 0 | 0 | CYCLE10 |
| CYCLE60 | 0 | 1 | 0 | 1 | CYCLE10 |
| CYCLE60 | 0 | 1 | 1 | 0 | CYCLE7 |
| CYCLE60 | 0 | 1 | 1 | 1 | CYCLE7 |
| CYCLE60 | 1 | 1 | 0 | 0 | CYCLE89 |
| CYCLE60 | 1 | 1 | 0 | 1 | CYCLE89 |
| CYCLE60 | 1 | 1 | 1 | 0 | CYCLE56 |
| CYCLE60 | 1 | 1 | 1 | 1 | CYCLE56 |

Each target cycle is now stored four times, corresponding to all possible binary combinations of the don't cares.

Another example embodiment may provide a design option in which the sequencer provides for an additional subarea of the output data to be used for a selector mask and/or a comparison mask for the status signals. When used as selector, a subset of status signals may be selected from multiple possible signals, e.g., by triggering multiplexers through the selector mask. The additional optional comparison mask may be used as a comparison operator for a comparator which may accordingly generate a status bit (equal/not equal) from a set of status bits. Likewise, the comparison mask may be used for deselection of don't care signals, e.g., via a normal mask operation by AND-ing according to the related art (see PACT10).

The structure of the output data is then as follows:
Data:

| Address of the next cycle | CONTROL signals | Selector/Comparison mask |
|---|---|---|

A preferred sequencer may have the following structure, for example:

The address bus of a RAM-PAE used as a sequencer memory may be divided into multiple subaddresses of any width and in particular possibly also of different widths, e.g., bit 0 . . . 3 for a first subaddress (NEXT_CYCLE). Bit 4 . . . 7 for a second subaddress (SEQ_IN) and bit 8 . . . 12 for a third subaddress (CTRL_IN).

The data output of a RAM-PAE may also be divided into multiple subdata of any width and in particular possibly also of different widths, e.g., bit 0 . . . 3 for the first subdata (CYCLE), bit 4 . . . 7 for the second subdata (SEQ_OUT) and bit 8 . . . 12 for the third subdata (CTRL_OUT).

The SIMD PAE and bus concepts described here may be used in particular for dividing the addresses and/or data. In addition, the division may also be made within the RAM-PAE.

Data processing PAEs, such as ALU-PAEs, may be assigned to the RAM-PAE.

The next cycle within a sequencer run may be defined by the feedback from NEXT_CYCLE to CYCLE.

In an example embodiment of the present invention, additional data processing PAEs may be provided within the feedback for computation of CYCLE as a function of NEXT_CYCLE. These PAEs may be able to respond to any signals, data or states of other PAEs and/or external/peripheral modules and in particular also to additional signals, data, or states. Furthermore, these PAEs may generate additional signals or data.

For implementation of an expanded sequencer, it is also possible to connect other PAEs whose function and/or interconnection may also be affected by the sequencer in a possible embodiment. To do so, the sequencer may transmit data into the configuration registers of the corresponding PAEs. The configuration registers may then be accessed, for example, via the architecture described in DE 197 04 728.9 (see DE 197 04 728.9, FIG. 4). The connected PAEs mainly process data of any type and may have a connection to other PAEs, in particular data processing PAEs (ALU-PAEs) and/or memory PAEs (RAM-PAEs) and/or peripheral connections (IO-PAEs). These PAEs may be triggered by control signals represented by SEQ_OUT and trigger sequence memories of the sequencer as needed through the status signals sent to SEQ_IN.

Other possibly independent PAEs or units, in particular external/peripheral units and/or higher-level CTs may also be triggered by the sequencer memory according to SEQ_IN/OUT (CTRL_OUT) and/or may trigger them (CTRL_IN).

For correct clock pulse-controlled sequence control of the sequencer pulse, synchronized registers may be built into the feedback paths.

The RAM-PAE may be configured by a higher level configuration unit and in particular the sequencer functions may be configured and defined by the content of the RAM-PAE.

In an example embodiment of the present invention, a simple sequencer may be implemented using a memory without any great additional hardware complexity. This may be possible particularly easily due to the fact that first the content of a memory cell is analyzed to determine at which location a read access is to take place next. If it is again indicated there where access is to take place next, then an automated run-through may be implemented. At the same time, however, according to this embodiment, another address for the next access is not simply determined but instead it may be specified at the same time what is to be done during the access. In other words, data or instructions may also be stored at the memory address. This may take place by some of the information stored at a location specifying the address of the next access and another portion representing instructions or data. This may be readily possible if the width of the stored data is divided into an address portion and a data/instruction portion. Furthermore, it may even be possible to encode only a portion of the memory locations addressable in the memory, e.g., to use only 8 bits of a 12-bit width. Additional bits may then be added, namely four in the present case, e.g., by analysis of flags, triggers, states, overruns, etc. This may have the advantage that different instructions may be given to the memory locations which are then addressed exactly by specifying the 8-bit address read out here and the information generated with the 4-bit analysis here. Either all triggers and the required response thereto are definable in advance or, as an alternative, at least some of the responses to individual triggers or to all triggers may be varied and/or defined during the execution of a configuration. In this regard, feedback to a trigger mask, etc., may be provided.

This may make it possible to generate conditional jumps, etc. depending on the information analyzed. If only a few of a series of information bits that are analyzable are of interest, then approximately only two bits are needed in the above example instead of four, so the information given in a corresponding memory location may also be present at those memory locations whose addresses differ only by the bits that are not of interest.

Figure 15:
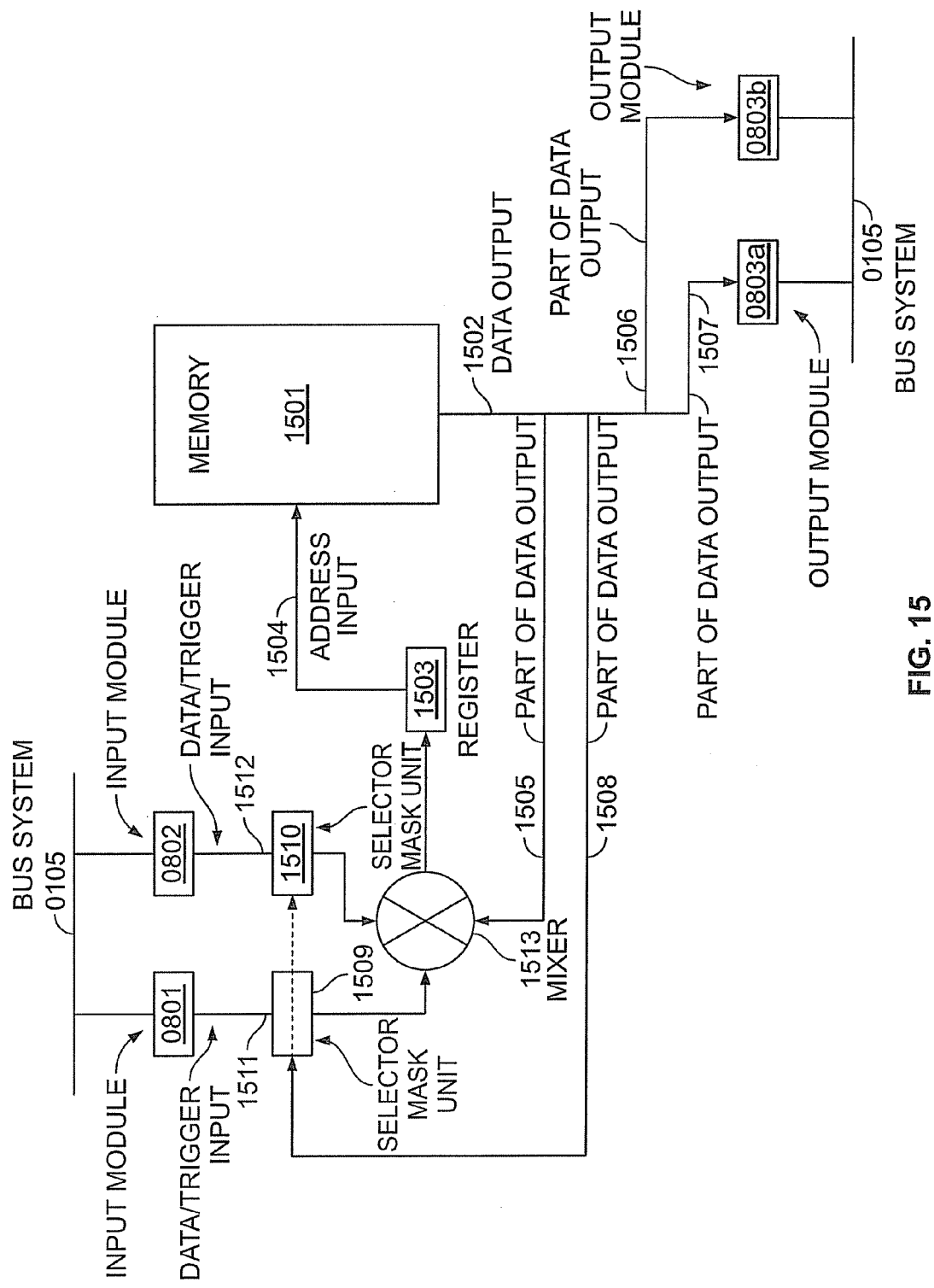
FIG. 15 is a diagram that illustrates a sequencer based on a RAM-PAE, according to an example embodiment of the present invention.

FIG. 15 shows an exemplary embodiment of a sequencer according to the present invention based on a RAM-PAE. One part (1505) of the data output (1502) of a memory (1501) may be connected back via a clock pulse-controlled register (1503) to the address input (1504) of the memory. The address input (1504) may thus correspond to CYCLE and 1505 may correspond to a portion, preferably the high portion, of NEXT_CYCLE.

Optionally, a part (1508) of the data output (1502) may be connected to a selector mask unit (1509, 1510) in which the SEQ_IN (1511) and/or CTRL_IN (1512) data arriving as data and/or triggers from bus system 0105 may be processed.

CTRL_IN and SEQ_IN and/or their values processed in the selector-mask unit may be mixed (1513) into 1505, e.g., in such a way that 1505 Banns the high address portion and CTRL_IN/SEQ_IN forms the low address portion.

The remaining part of the data output (1502) may be separated into a SEQ_OUT part (1506) and a CTRL_OUT part (1507) and sent as data and/or triggers to bus system 0105 via output modules 0803a, b.

Various configuration register models for defining the configuration of locally assigned PAEs are known. PACT02 describes a sequentially processable model; PACT04 describes a FIFO model which may also be processed sequentially and configured with overlap; PACT08 describes a selective model in which certain configuration registers are selected, depending on the data processing, and thus the function and/or interconnection stored in them is selected. DE 100 28 397.7 also describes a FIFO model that is particularly suitable for preconfiguration and overlapping configuration.

A combination of these models may be particularly powerful and performance/cost efficient. The FIFO model according to DE 100 28 397.7 may be suitable in particular for preloading any number of configuration registers of PAEs because the function of the FIFO used efficiently may permit a variable configuration length. To do so, a local FIFO memory may be assigned to each PAE managed and may buffer the configurations of its assigned PAE.

Through an expansion (e.g., such as that described below) of the FIFO model, the beginning and end of a certain configuration and of the particular individual configuration entries may be defined. A plurality of configurations may then be stored in the FIFO model at the same time.

The two methods of embodiments of the present invention described below have proven to be particularly suitable for characterizing the beginning or end of configurations:

a) Characterization using additional bits (cycle bits) in each memory cell: additional bits may be assigned to each configuration entry, characterizing the beginning and/or the end of a configuration. For example, an entry in the FIFO may appear as follows:

| Bit 0 ... 15 | Bit 16 | Bit 17 |
| --- | --- | --- |
| Configuration word | 0 = don't care<br>1 = beginning | 0 = don't care<br>1 = end |

The display of the beginning may be preferably omitted because it is possible to point directly to the beginning of configurations according to the method described below:

| Bit 0 ... 15 | Bit 16 |
| --- | --- |
| Configuration word | 0 = don't care<br>1 = end | b) The characterization using special configuration words that are decoded as instructions may be particularly efficient. Certain bit combinations within the configuration word may be recognized and decoded as instructions. For example, the following instructions may be implemented:

BEGIN: beginning of a configuration

END: end of a configuration

This method may be much more flexible and efficient than the characterization by cycle bits.

For a simple differentiation of instructions and configurations, a bit (like the cycle bits) that determines the semantics of the configuration word through its value may be provided, e.g., as follows:

| Bit 0 ... 15 | Bit 16 |
| --- | --- |
| Data | 0 = Interpretation of the data as configuration word<br>1 = Interpretation of the data as instruction |

A configuration may be transmitted into the configuration register of a PAE from its beginning to its end, depending on the call.

Through an optional additional translation and allocation device, states (e.g., states of its own ALU and/or one or more triggers (see DE 197 04 728.9), e.g., other PAEs) may be translated to certain configurations within the FIFO model. For example, an incoming reconfiguration trigger may point to a certain configuration within the FIFO model which may then be configured by the arrival of the reconfiguration trigger.

For example, algebraic computations and/or logic operations and/or translation memories (lookup tables) may be used as the translation and allocation device.

If various configurations are stored in one, or for one, or for a number of PAEs, the addresses at which the particular information is stored may be managed in a simple manner by adding up the lengths of the particular stored configurations. This may be important when the configurations have different lengths because, in the case of certain configurations, buses and/or registers such as forward and backward registers must be configured and, in the case of others, only new functions of the ALU of a PAE are to be set or because at the same time configuration information for units external to the cell is also being managed.

It may be thus possible to implement a quasi-FIFO character. Means may be provided for adding up, in particular for successive addition of configuration lengths, as well as for freeing the particular areas when certain configurations become superfluous, e.g., because of processing, etc. Adding up may be possible, e.g., using adding chains.

This system may be used to manage configurations in a cell and/or to implement a sequencer. It is in turn possible to respond to the configurations in such a way that jumps, etc. may be implemented. It was already mentioned above that control (instruction) lines may be provided between ALU-PAEs and/or other data processing cells having an optionally expanded functionality and memory cells for implementation of sequences. Such lines having assigned controllers may also be provided within a single PAE which is independently sequencer-capable.

Figure 14:
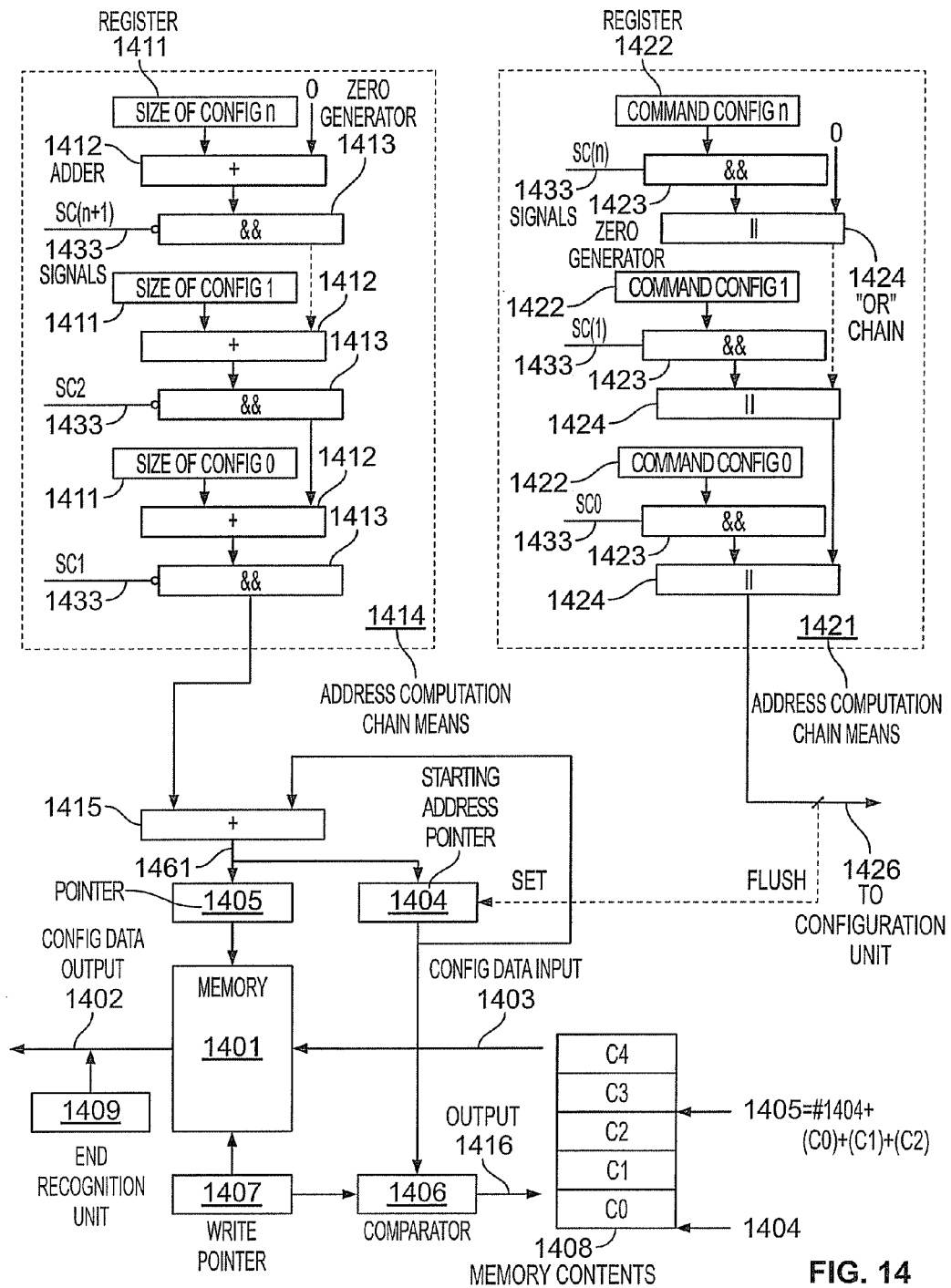
FIG. 14 is a diagram that illustrates a design of a FIFO model, according an example embodiment of the present invention.

One particular embodiment of the present invention is illustrated in FIG. 14 and may function as follows:

A chain of adders may be gated in such a way that the result (SUM) of a previous adder (p) is forwarded to a downstream adder (p+1) as the operand. Forwarding may be interrupted in such a way that instead of the result, a 0 (zero) is forwarded. As the second operand, its own register may be assigned to each adder, its value always being added to the SUM of the previous stages. Each of the stages may represent a configuration in the configuration FIFO. The relative starting position of a configuration may be stored in the register of the particular stage. The absolute starting position may then be calculated by adding up all the relative starting positions of the configurations underneath in the FIFO. This may be carried out through the adding chains as also shown in the figure.

In other words, the relative position as the lowermost configuration in the FIFO is that whose entry is stored next to the result output of the adder chain. All other relative positions then follow according to their arrangement in the FIFO.

The chain may be interrupted by adding a zero instead of the SUM at the location where the relative position of the selected configuration is reached.

The result may now be the offset between the read pointer of the FIFO which points to the lowermost configuration and the starting position of the selected configuration.

The jump address to the configuration selected may thus be easily calculable by adding the pointer and the offset.

The choice of the configuration selected may be made through different methods in the translation and allocation device.

(a) The incoming triggers may be prioritized and decoded.

(b) The incoming triggers may be translated by using a lookup table and may then be optionally prioritized and decoded.

(c) From the quantity of all triggers, a few may be selected, e.g., via multiplexers and then processed further accordingly (a, b).

A trigger may also be a vector (TRIG-V) as described in PACT08. The vector itself may be used for further decoding, i.e., the vector may select the configuration. This may be important in particular when a wave reconfiguration according to PACT08, PACT13, PACT17 is to be performed in which a trigger vector transmitted with the data may select the next configuration.

During or after the configuration, configurations may be removed from the FIFO. The referencing may be adjusted here accordingly within the translation and allocation device.

Furthermore, the FIFO model may be expanded by the sequencer method according to DE 196 54 846.2-53 (and/or the patents parallel thereto as is the case with the other patents without being mentioned separately) or the method described above. For example, jumps (GOTO) and status-dependent and conditional jumps (WAIT-GOTO, IF-GOTO) may be introduced. Jumps may be represented by particular cycle bits or may be implemented as instructions.

In addition, a synchronization display method may be used, which may indicate when a certain configuration and/or a certain cycle of the sequencer is completed. In other words, each cycle may be composed of a plurality of configuration entries. A run/stop flag may be used for identification, e.g., according to DE 196 54 846.2-53. "Run" may identify here the configuration entries of a cycle, and that belong together. "Stop" may identify the first entry of a following cycle. As an alternative, use of the cycle bits described above may also be possible, although they have slightly different semantics but otherwise behave the same way. As an alternative or in addition to these methods, the instructions WAIT and BEGIN, which are also known from previous patent applications by the present applicant, or preferably the instructions BEGIN and END described above, may also be used.

The end of a cycle may be identified by "stop" or WAIT or END, i.e., a configuration is complete and may be executed and processed. The next cycle may be executed after the end of data processing of this configuration.

The end may be defined by a clock pulse (instruction sequencing) according to sequential processors and/or it may be defined according to the data processing principle of the PACT processors (P 44 16 881.0-53, DE 196 54 846.2-53, configuration sequencing) by a status signal (e.g., a trigger).

In other words, "stop" may be skipped through the arrival of a trigger, and the following configurations may be configured. Alternatively or additionally, the instruction WAIT may be used, i.e., waiting for arrival of a trigger.

Optionally, a FIFO may trigger not only the locally assigned PAE but also other PAEs, in particular those nearby or belonging to the same configuration.

The FIFO may optionally also be designed as a dedicated unit according to DE 196 54 846.2-53.

FURTHER EXEMPLARY EMBODIMENTS

A) An incoming trigger may be translated to a configuration (K1) located in the FIFO by a translation and allocation device. This configuration (K1) may then be configured into the PAE. As the end identifier, for example, a WAIT instruction, an END instruction, or the run/stop flag may be used.

A trigger arriving subsequently may be translated to another configuration (K2) located in the FIFO via a translation and allocation device. This configuration (K2) may then be configured into the PAE. K1 and/or K2 may be deleted from the FIFO after successful configuration into the PAE.

B) An incoming trigger may be translated to a configuration (K3) located in the FIFO made up of multiple cycles (Cy1, Cy2, Cy3a, Cy3b, Cy4) via a translation and allocation device. The first cycle (Cy1) may then be configured into the PAE and executed. A WAIT instruction or the run/stop flag may be used as the end identifier, for example. A trigger arriving subsequently, indicating the end of execution of the cycle, may trigger the configuration and the execution of Cy2. Cy2 may end with two WAIT-GOTO instructions (WAIT-GOTO (Trg1, Cy3a); WAIT-GOTO (Trg2, Cy3b)) (see PACT04). As a result, Trg1 and Trg2 may respond to two different triggers that indicate the end of execution of the cycle. When Trg1 arrives, then Cy3a may be configured in the next cycle and executed; when Trg2 arrives, Cy3b may be configured and executed.

Cy3 and Cy3b may end with a WAIT-GOTO (Trg, Cy4). On arrival of a trigger which indicates the end of execution of the cycle, the sequence may jump to Cy4 and the configuration may be configured and executed accordingly.

Cy4 may end with a WAIT-GOTO (Trg, Cy1) so that the renewed sequential run-through of a loop may begin on the arrival of the trigger that indicates the end of execution of the cycle. To this extent, by jumping to Cy1, a ring memory according to DE 196 54 846.2-53 may be formed for execution of loops, such a ring memory being advantageous but not obligatory.

The loop may be terminated by the arrival of a trigger (Trg-x). If there is an entry for Trg-x in the translation and allocation device, the loop may be terminated at any point in time and the configuration (KX) referenced by Trg-X in the translation and allocation device may be executed.

If there is no entry, then through explicit use of WAIT-GOTO (Trg-x, KX) instructions, e.g., together with WAIT-GOTO (Trg, Cy1) in Cy4, the loop may be terminated at certain predetermined points in time in the execution.

Figure 13:
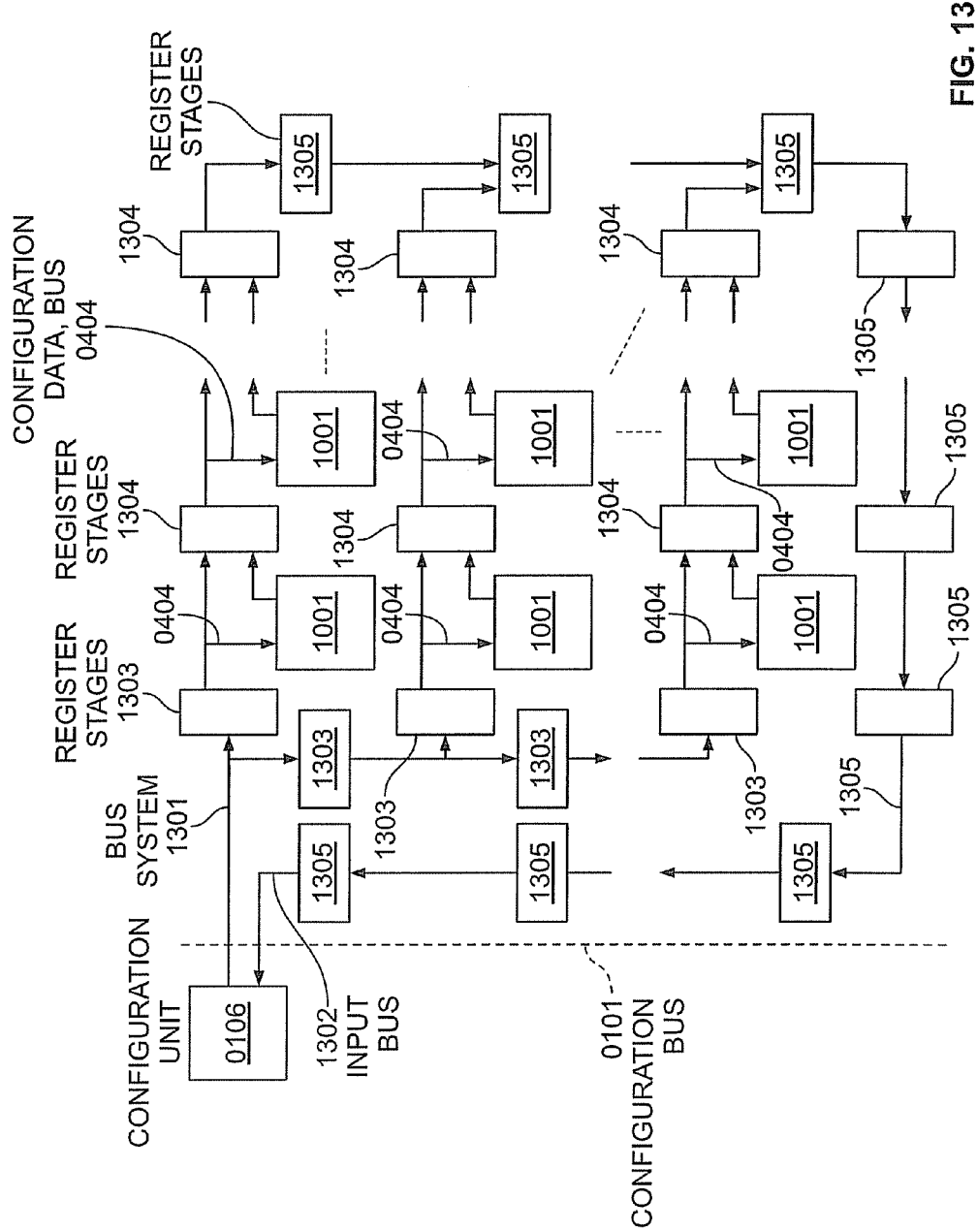
FIG. 13 is a diagram that illustrates an exemplary design of a configuration bus for configuration of PAEs by a configuration unit, according to an example embodiment of the present invention.

FIG. 13 shows as an example the design of a configuration bus for configuration of PAEs (1001) by a configuration unit (0106). The configuration unit may send configuration data over a bus system (1301) and optionally over multiple register stages (1303, 1304) to improve the frequency response and over the configuration data bus (0404) to PAEs (1001). Each PAE may decode the applied addresses and respond to the data transmission of the bus if it has been selected. PAEs may in turn send data onto the bus system via 0404 and via register-multiplexer stages (1304), the configuration unit, and/or optionally other PAEs. This may be carried out by transmission of the address of the receiving unit. The reverse transmission of the data to the configuration unit may also takes place through register stages (1305) to the data input bus of the configuration unit (1302).

A mode of operation of the configuration bus is also described in DE 101 42 904.5 and DE 100 28 397.7, the full content of which is incorporated herein by reference.

FIG. 14 shows the design of a FIFO model according to an example embodiment of the present invention for controlling the reconfiguration. The FIFO model presented here may differ from pure FIFOs known from the related art in particular in the capability to perform jumps. Nevertheless, the terminology used in the related art has been used here because this makes it possible to associate a particularly visual image of the typical jump-free operation. This unit is optional to all cells (PAEs), in particular the reconfigurable cells described in these patent applications and depicted in FIG. 4 as unit 0406.

A memory (1401) may contain the configuration data for the respective PAE, where (1402) is the configuration data output to the configuration registers of the PAE (0405). The configuration unit may write configurations into the memory via 1403, i.e., bus 0404, and the particular address may be generated by the write pointer (1407), the shift register being altered by a value of 1 for each writing operation, i.e., either incrementally or decrementally, depending on the operation of the FIFO. A starting address pointer (1404) may point to the first configuration data entry in the memory while another pointer (1405) points to the first configuration data entry in the memory to be read and/or to be transmitted to the PAE. With each data transmission from the memory to the PAE, 1405 may be incremented or decremented by a value of 1, depending on the operation of the FIFO. The data transmission may take place until the end of the configuration is recognized by a configuration end recognition unit (1409), e.g., on the basis of a cycle bit or instruction (WAIT, END).

The FIFO implemented does not correspond to normal FIFOs according to the related art which have only pointer 1405. The modification may permit any configuration data to be read out of the memory while pointer 1404 prevents any configuration data that might still be needed from being overwritten. This may be accomplished by generating a full flag using the comparison (1406) of the starting address pointer (1404) with the write pointer (1407). If the memory is full, then write attempts on the part of the configuration unit may be rejected. This may be accomplished by the ACK/REJ protocol which is known from PACT10. Comparator 1406 may then give an appropriate reject signal to the configuration unit, i.e., does not output an ACK at its output 1416.

An example of the memory contents of 1401 is shown as 1408. This memory contains five configurations (C0 . . . C4). 1404 points as a starting pointer to the first configuration C0. In this example, 1405 points to the beginning of configuration C3. The pointer position may be calculated from the value of 1404 plus the length of configuration C0 plus the length of configuration C1 plus the length of configuration C2.

Figure 14A:
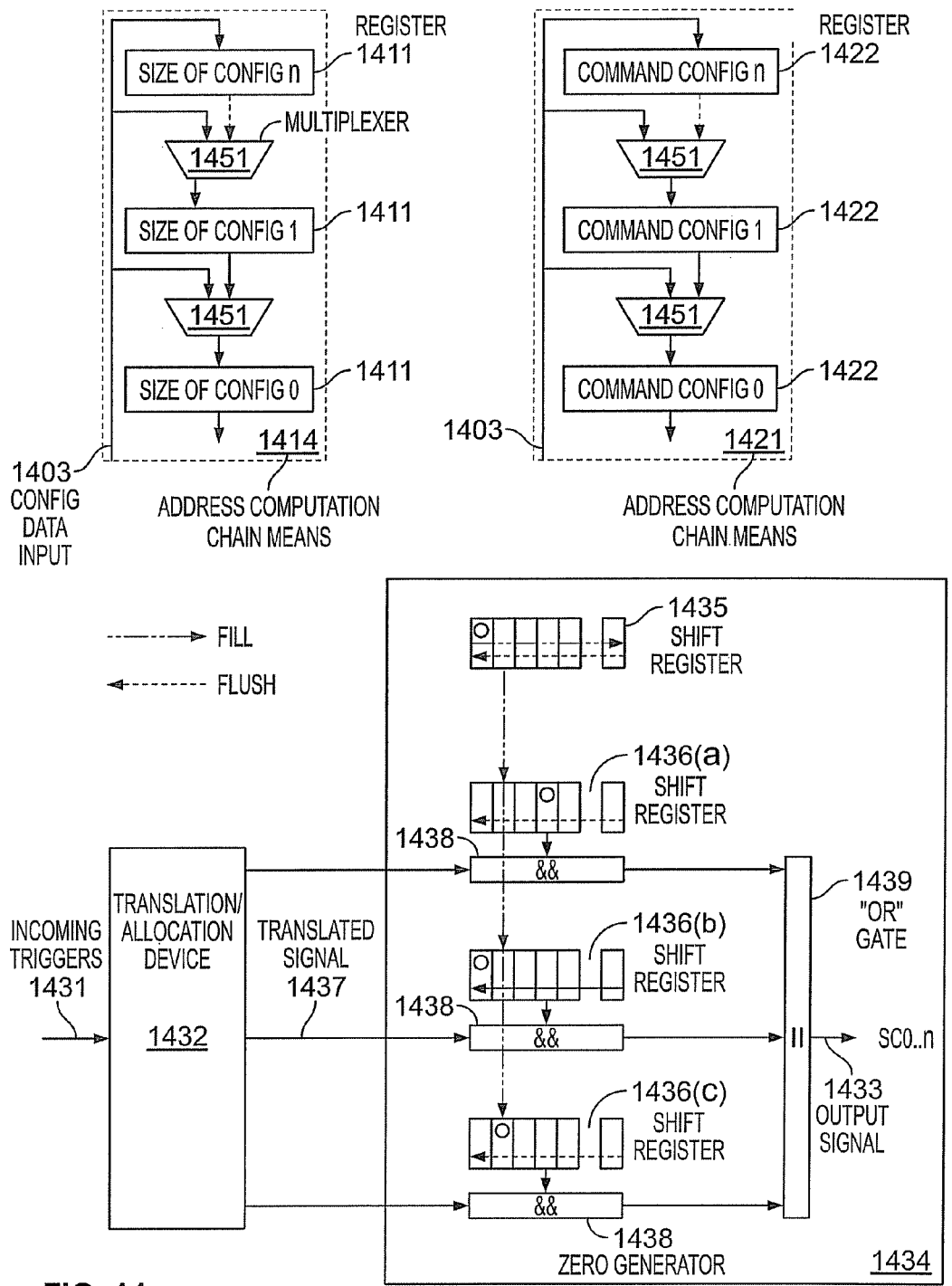
FIGS. 14a and 14b are diagrams illustrating further details of the embodiment illustrated in FIG. 14, according to an example embodiment of the present invention.

Incoming triggers (1431) may be translated via a translation and allocation device (1432) depicted in FIG. 14*a* to select signals (SC0 . . . n, 1433) which control the addressing of the configuration data in the memory. This translation and allocation device may perform its allocation in a fixedly predetermined manner but may be variable during processing of a configuration, to which end suitable feedbacks, signal lines, etc. may be provided. In particular, when the translation and allocation device is variable, unit 1431, which may be used for the allocation, may also be designed to be variable during data processing. Here again, corresponding circuit systems may be provided, in which the change in the allocation may take place in a programmed-controlled manner in particular. A corresponding change, in particular a program-controlled change, is also possible for unit 1414, i.e., the address computation addition chain means. The instructions triggering this updating and/or new behavior may be stored in memory unit 1404 for this purpose.

One register (1411), one adder (1412), and one zero generator (1413), implemented here by a bit-by-bit AND function, for example, together may form an element of a chain (1414) for address calculation. One element may manage the offset of each configuration. The sequence of the elements in a row corresponds to the sequence of configurations in a row of memory 1401. In other words, the first element may have the length of configuration C0 in accordance with example 1408, i.e., it has the offset that is to be added to 1404 to point to configuration C1. The second element may have the length of configuration C1, i.e., the offset that is to be added to the offset of C0 and to 1404 to point to configuration C2. The third element may have the length of configuration C2, i.e., the offset that is to be added to the offset of C0 and to the offset of C1 and to 1404 to point to configuration C3 and so forth.

It may be seen on the basis of this discussion that the result is a chain of additions in which the number of links corresponds to the position of the configuration in the memory. This may be implemented by chain 1414 as follows:

The value stored in the register, i.e., the length of the particular configuration, may be added to the result of the previous link via the adder. The value at the input of the bit-by-bit AND function may be AND-ed with all result bits of the adder. Thus, if the input is equal to zero, the AND function may deliver a binary zero at the output to terminate the adder chain at the configuration to be selected; otherwise, it may deliver the value of the adder output.

In other words, the size of the configurations may be entered into the registers (1411) in their order in the memory (1401). The select signals may be sent to the zero generators in such a way that the configuration sizes are added up to the starting address of the configuration referenced by the triggers (1431).

Thus, the chain may add up all the lengths of configurations which are in memory 1401 before the configuration to be loaded. Thus, an offset may be formed, which, by addition (1415) with the starting address (1404), points to the configuration to be loaded.

The circuit described here may be particularly efficient because it permits calculation of the offset and the jump within one clock pulse.

In a second optional chain (1421), instructions to the configuration unit, the PAE, and/or the configuration stack may be stored in registers (1422). A zero function (1423), here also implemented as an example similarly to zero function 1413, may deliver a binary zero at its output if the select signal is not active, i.e., the configuration has not been selected; otherwise, it may deliver the register contents (1422), i.e., the instruction. All zero function outputs may be OR-ed together via an OR chain (1424) in such a way that the instruction in register 1422 of the configuration currently selected is applied to the output (1425) of the chain.

The instruction may now be used to delete entries in the memory (1401), i.e., one of the possible instructions may be that certain stored configurations are to be deleted and/or allowed to be overwritten. This may be accomplished, for example, by the FLUSH instruction which may load the starting pointer (1404) with reading pointer 1405 and thus allow all data before this address to be overwritten. This may be preferable inasmuch as the configurations thus to be overwritten in the FIFO-like memory are usually older and therefore typically may be overwritten while the more recent configurations, which are often still needed, are higher up in the quasi-FIFO-like memory. Another instruction that may be implemented is that new configurations are to be loaded. This may be important when the requirement that a certain new configuration is needed is predictable with at least a non-negligible probability. This instruction may be issued to a central configuration management unit or the like. Direct loading is likewise possible, e.g., with assignment of IO options. It is also preferable if both the configuration request instruction as well as the flush and/or old configuration relinquishment instruction are simultaneously executable and/or storable. Instructions such as flush, load, or flush/load may also be stored in other memory areas and/or units such as 1401, and a dedicated unit such as 1421 need not necessarily be provided for this. This use of a unit that is already present may be preferable in terms of the hardware.

In addition, the instruction may be sent to the configuration unit (1426) via the bus system according to FIG. 13. For example, the instruction may trigger the start of a certain configuration there and/or cause a configuration to be preloaded.

FLUSH, i.e., deletion of configurations, may be one important and preferred instruction of the unit. The instruction may be very advantageous for execution, but it may have the problem that during its execution all the addresses and references change. The FIFO is "flushed" in that the start pointer (1404) is set at a new start address. It may be set at the beginning of a stored configuration, as depicted in FIG. 14, the beginning being determined by the computation previously described, via the offset. Alternatively or additionally, the pointer may also be set at a certain other value, e.g., a constant coupled to the flush instructions. In addition, it may be required for both chains 1414 and 1421 to be flushed in such a way that the address calculation corresponds to the revised positions of the configurations in memory 1401, using multiplexers (1451) (not shown in FIG. 14) through which the register data is transmitted forward in such a way that the elements of the chain that are now empty (flushed) are overwritten with the data of the following elements, namely in such a way that a) the sequence of data in the chain remains unchanged, b) the first link of the chain is occupied by new data, and c) all other data is written linearly in order and without a gap into the elements following the first (see FIG. 14*a* in this regard). Data pertaining to the configuration size may also be written from the outside to the corresponding locations (size of Config 1 . . . n) via multiplexer 1451. It may be estimated here (but this is not shown for the sake of simplicity of the drawing) that each location is individually addressable. Reference is made in this regard to unit 1435, which is shown in 1434 and determines this location.

Due to the shift within the chains, the select signals (SC0 . . . n) may now be adapted to the new position of the data in the chains so that a correct assignment of the select signals to the offset calculation is again obtained. Essentially, several methods are available for doing so. For example, a) signals may be encoded in binary form (corresponding to the function of a 74LS148) after 1432 in 1434, an offset corresponding to the shift resulting from the flush may be subtracted, and the resulting value may be decoded again (corresponding to the function of a 74LS139) to generate select signals 1433; and b) signals may be translated by a lookup table to select signals 1433 after 1432 in 1434. Therefore, the lookup table may be adapted to the position in the chains which has been changed by the flush.

One exemplary method for the translation of the signals, according to an example embodiment of the present invention, is to be described in detail and corresponds to the device drawn in element 1434:

A first shift register (1435) may contain as a one-bit value the position of the currently first free, i.e., unused, element in chains 1414, 1421. This may be carried out as follows: after a reset, the low bit in the shift register may be set at 1 (represented by a solid circle). The low bit (bit 0) is referenced to the lowermost element in the chains. With each write access to the chains, i.e., with each new addition to the memory (FILL) of a configuration after 1401, the shift register may shift the set bit (PBIT) by one position in the direction of the highest bit and thus reference the following element in the chains. The highest bit may thus reference the highest element in the chains, i.e., the shift register is as wide as elements present in the chains. With each FLUSH, the shift register may shift the bit (PBIT) in the direction of the low bit by exactly as many positions as elements in the chain were deleted.

The translation and allocation device (1432) may translate triggers incoming at the PAE from the bus system (0105*a*, FIG. 4) in such a way that exactly one signal of the outgoing bus (1437) is set for each trigger. A shift register (1436) of the same size as 1435 may be assigned to each signal. Thus, there may be a plurality of shift registers 1436 (shown in the present case as 1436*a* . . . 1436*c*), the number of which corresponds to the number of maximum allowed different trigger signals and the length, i.e., the bit width of which corresponds to the number of maximum allowed configurations, i.e., the number of chain elements. When a configuration is stored again (FILL), before shifting PBIT, the content of 1435 may be written into the shift register (1436) to which the trigger assigned to the configuration points; it is represented by a circle.

On arrival of the trigger on the bus, the corresponding translated signal (1437) may deliver a one-value while all other signals deliver a zero-value. Signals 1437 may be sent to zero generators (1438), composed of a bit-by-bit AND function. All zero generators whose input signal from 1437 has a zero-value may deliver a zero vector at the output. The zero generator whose input signal from 1437 has a value of 1 may transmit the contents of shift register 1436. The outputs of all zero generators may be supplied to an OR gate (1439) in such a way that the select signals SC0 . . . n (1433) are formed.

Due to this function, an incoming trigger may now point, via the zero functions, to a shift register 1436 whose set bit in turn points to an element in the chains (1414, 1421).

In the event of a flush, shift registers 1436, like shift register 1435, may shift the stored value by exactly the same number of positions as elements deleted in the chains in the direction of the low bit. If the contents of a shift register are equal to zero after this operation, because the PBIT has been shifted beyond the lowest bit, this may mean that the configuration referenced previously has been deleted.

If 1434 supplies a value of zero at output 1433 for an incoming trigger 1431, a configuration request may be sent to the configuration unit to load the missing configuration or, if necessary, may also report an error status to the configuration unit.

Translation of the incoming triggers 1431 to 1437 in 1432 may take place according to multiple principles which may be used individually or jointly, e.g.:

1. Decoder corresponding to the function of a 74LS148
2. Round-robin arbiter (see PACT10)
3. Lookup table (see PACT10)

In principle, the translation may correspond to the method described in PACT10 (round-robin arbiter, LUT1).

If there is no translation specified, e.g., when using lookup tables, then a configuration request may be sent to the configuration unit in order to load the missing configuration or, if necessary, report an error status to the configuration unit.

Figure 14B:
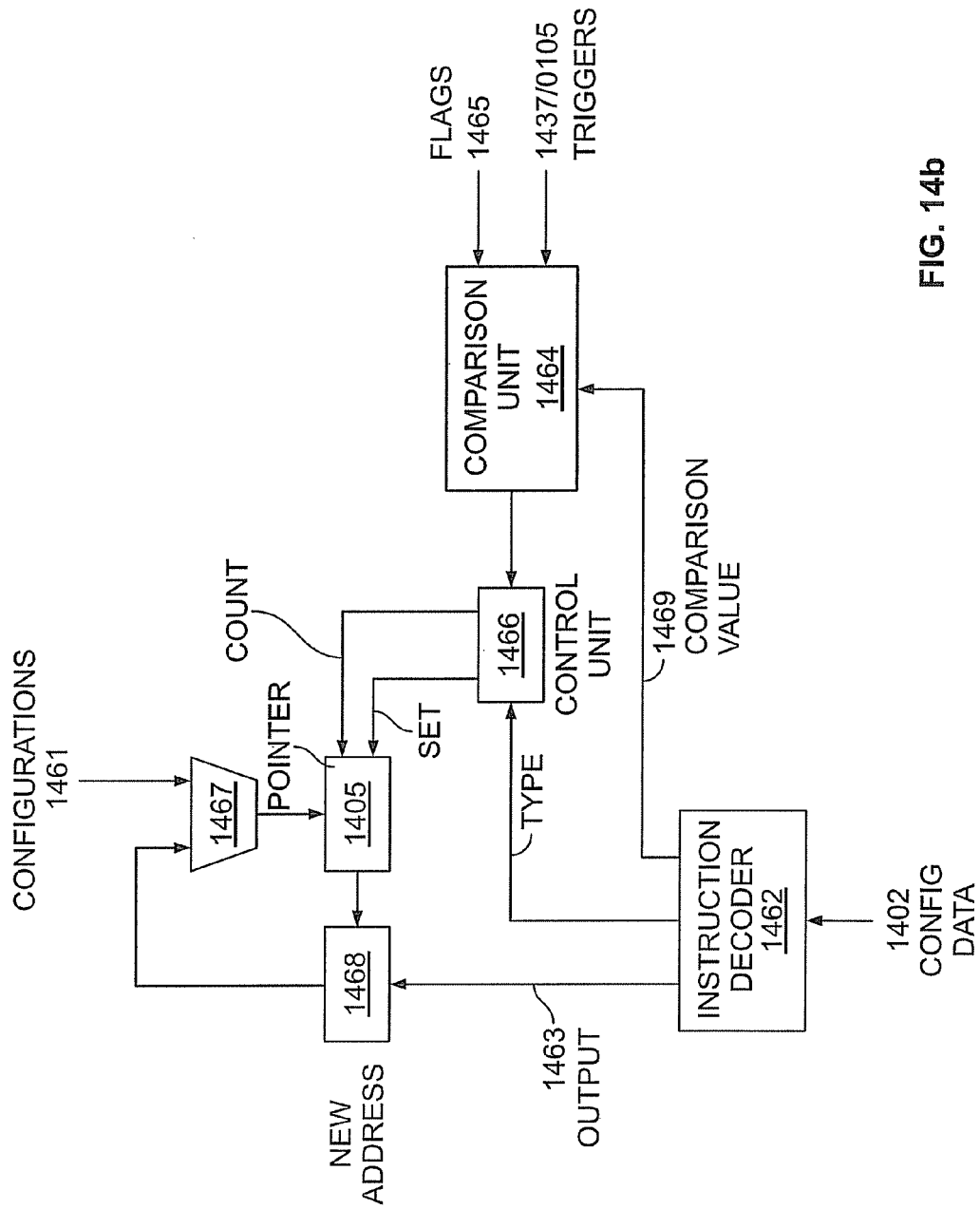

Another important function of the configuration stack according to FIG. 14 is that of sequencing over configurations, which means conditional and unconditional jumps within memory 1401. Therefore, this function is also described in detail in conjunction with FIG. 14b.

An instruction decoder (1462) may recognize conditional and unconditional jump instructions in configuration words (1402) when reading out of the memory 1401. A jump instruction may be assigned the relative jump address to the current position as a constant. Then the instruction decoder may be decoded and output (1463). This value is either positive or negative depending on the direction of the jump.

In addition, a comparison value (1469) may be given as a constant with the incoming triggers or the status flags of the PAE, e.g., the ALU flags zero, carry, negative, overflow, etc. or the memory flags full, empty, etc., conditional jumps being performed as a function of these. This may be conveyed to a comparison unit 1464 which compares the value with the flags (1465) and/or triggers which originate from the output of the translation and allocation device (1437) and/or directly from bus system 0105.

A control unit (1466) may generate the triggering for the reading pointer (1405) as a function of the instruction (conditional or unconditional jump="type") and as a function of the result of the comparison as follows:
Unconditional jump: generate "set" so as to load new address after 1405;
Conditional jump, comparison satisfied: generate "set" to load new address after 1405; and
Conditional jump, comparison not satisfied: generate "count" to compute address of the following instruction in 1405.

A new address may be set by adding up (1468) the relative jump address (1463) to the current value of 1405. The new address may be written into read pointer 1405 when "set" is applied via a multiplexer (1467) which selects between the new address added up and the start address of configurations (1461) generated by 1415.

The mode of operation of the configuration stack may make the use of configuration units (CT) such as those known largely from PACT10 and PACT17 obsolete and instead a distributed parallel CT may be formed by the configuration stacks.

However, two functions of the CT may be preserved in such a unit:
1. Loading the configurations from a memory, which may be implemented internally within the chip or externally, may be designed as a volatile or nonvolatile memory (RAM, EPROM, EEPROM, Flash ROM, etc.) and/or may be a bulk memory. This may now take place through a simple microcontroller which sends data to the PAEs and responds to the acknowledgment sent back to it. For example, the unit of PACT05 may be used as the microcontroller and/or the algorithm described in PACT05 may be used. The loading need no longer be necessarily active but instead it is sufficient if a unit is present which causes the new configuration data to be retrieved into the particular PAE and/or its particular configuration memory in response to the configuration request instruction. This may be for example, e.g., with the IO-PAEs discussed above, the PAE itself which currently requires new configuration data.
2. The remaining unit may be used to ensure that reconfiguration triggers (WCT) are running through the array, sorted in a certain order, that preloaded configurations are processed in the required order, and/or that configurations that are as yet unloaded but are needed are requested and/or loaded as required. This reconfiguration trigger prioritization may be used to prioritize which reconfiguration request triggers should be responded to first. This may ensure conflict-free processing of different possible configurations by determining only which trigger first runs through the array. If such a trigger pertains to a certain PAE which is to respond to this trigger, then the PAE may take note of this in order to be able to respond to this trigger next as soon as it is reconfigurable. An individual cell or cell structure or the like may notice the triggers relating to the configurations to be processed immediately thereafter. Additionally, all other configurations or at least multiple configurations to be processed by this cell in the future may and/or should be saved in the proper order so that each cell or cell group may receive the information from the trigger vectors and keep the information pertaining to it in the future and/or currently. The FILMO function of the earlier CT may thus become superfluous and may be essentially replaced by the time characteristic of the trigger vectors.
3. If only one reconfiguration trigger is used, no particular measures are necessary. If a plurality of reconfiguration triggers (WCT) may occur, it may be required for them to run through the array without any time overlap, i.e., one after the other in a fixed order and without crossing in order to prevent deadlocks.

Figure 16:
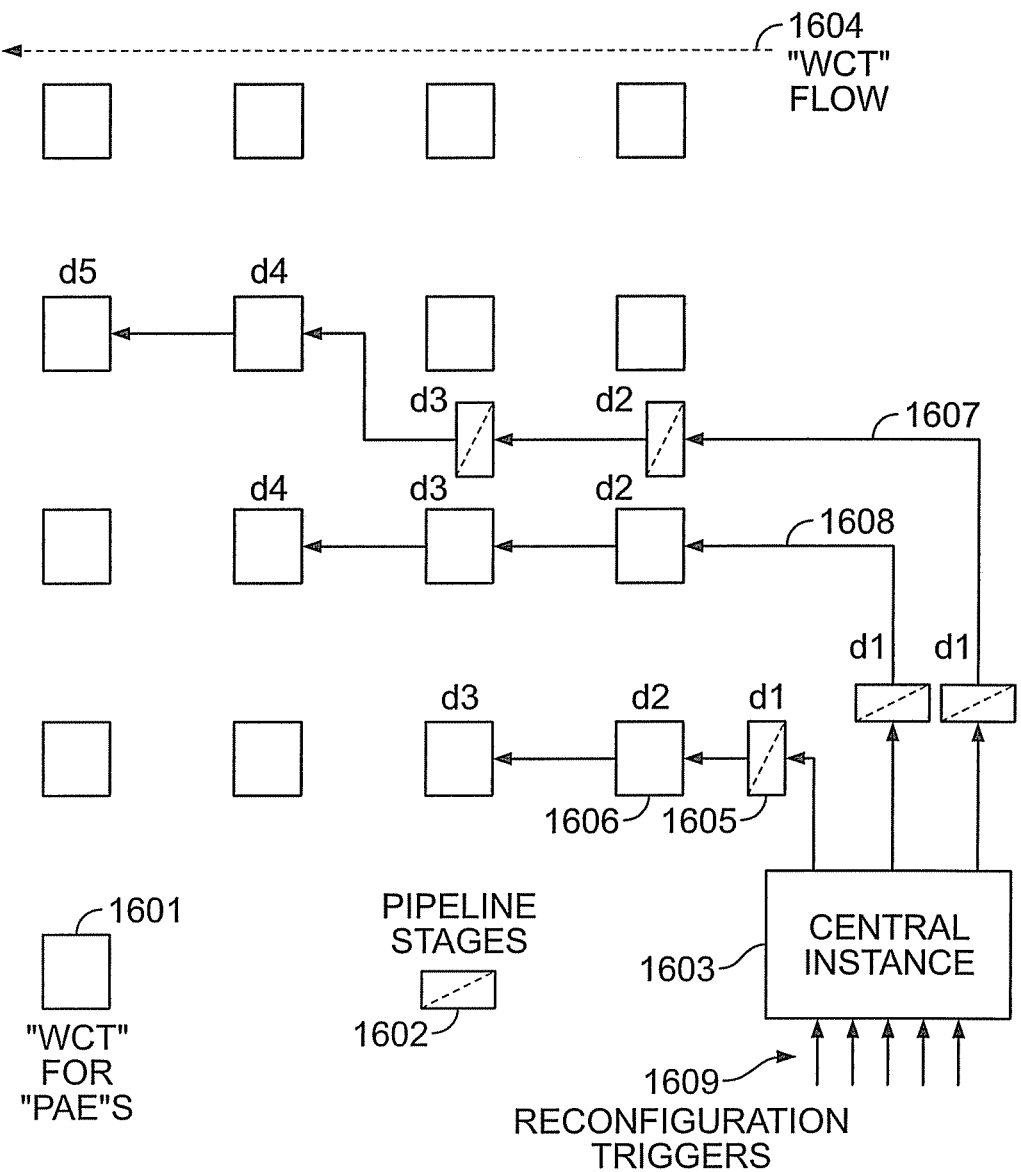
FIG. 16 is a diagram that illustrates transmission of reconfiguration triggers, according to an example embodiment of the present invention.

This may be ensured by the method depicted in FIG. 16 in which routing measures may ensure a correct forwarding of WCT over time. A plurality of WCTs for different PAEs (1601) may be generated by a central instance (1603) but they should be coordinated in time with one another. The different distances of the 1601 in the matrix may result in different run times, i.e., latency times. In the present example, this may be achieved through suitable use of pipeline stages (1602) by the router assigned to the compiler (see PACT13). The resulting latencies are given as d1 through d5. It is apparent that the same latencies occur in each stage (column) in the direction of the WCT flow (1604). For example, 1605 would not be necessary because the distance of 1606 from 1603 is very small. However, it may be required for one 1602 to be inserted for each 1607 and 1608 because of the resulting run-time due to the longer distance, so 1605 may be necessary for compensation of the run-time. Central instance 1603 may pick up reconfiguration triggers (1609) incoming from the PAEs, prioritize them, and then send them individually and in succession as WCTs to the array of PAEs. In other words, it may be that a PAE which generates a reconfiguration trigger does not send it directly to other PAEs but instead sends it exclusively to central instance 1603.

The central instance may saves and prioritize incoming reconfiguration triggers. To do so, the SCRR-ARB method known from PACT10 may be used, as described in detail in PACT10 (FIG. 8). All the PACT protective rights mentioned here are incorporated herein in their entirety by reference.

What is claimed is:
1. A Field Programmable Gate Array (FPGA) integrated device comprising:
at least two dies that are stacked;
a configurable interconnect structure;
an arrangement of configurable cells interconnected by the configurable interconnect structure; wherein:
at least some of the configurable cells include Arithmetic Logic Units (ALUs);
the configurable interconnect structure includes switching elements;

the configurable cells are implemented on at least a first one of the at least two dies; and at least parts of an interconnect structure are implemented on at least a second one of the at least two dies.

2. The FPGA integrated device according to claim 1, further comprising at least one dedicated interface unit that interfaces between the programmable data processing units and a device external to the FPGA integrated device.

3. The FPGA integrated device according to claim 2, further comprising at least one dedicated Peripheral Component Interconnect (PCI) unit.

4. The FPGA integrated device according to claim 2, further comprising at least one dedicated Ethernet unit.

5. The FPGA integrated device according to claim 1, wherein at least some of the ALUs are capable of splitting operands into a respective set of data, data of which is processable independently of each other and splitting a result into a respective set of data, data of which is processable independently of each other.

6. The FPGA integrated device according to claim 5, wherein the interconnect structure is capable of transmitting each data part of each of the sets of data separately.

7. The FPGA integrated device according to claim 1, wherein at least some of the ALUs are capable of single instruction multiple data (SIMD) processing.

8. The FPGA integrated device according to claim 7, wherein the interconnect structure is capable of transmitting each data part of each of the sets of data separately.

9. The FPGA integrated device according to claim 1, wherein at least some switches of the interconnect structure are implemented on the second die.

10. The FPGA integrated device according to claim 1, wherein at least some of the dies are interconnected by vias.

11. The FPGA integrated device according to claim 10, wherein the vias extend through a silicon layer.

12. The FPGA integrated device according to claim 1, wherein the at least parts of the interconnect structure implemented on the at least a second one of the at least two dies includes the configurable interconnect structure.

13. The FPGA Integrated device according to claim 1, wherein the at least parts of the interconnect structure on the at least a second one of the at least two dies comprises switching elements.

14. The FPGA Integrated device according to claim 1, wherein all of the at least two dies in the stack are identical.

15. The FPGA integrated device according to claim 1, wherein at least some of the dies in the stack are different from other dies that are stacked.

16. The FPGA integrated device according to claim 1, wherein at least one die in the stack comprises an ALU and at least one die in the stack comprises an input/output component.

17. The FPGA Integrated device according to any one of claims 1, 14, 15 and 16, wherein at least one smaller die is mounted on top of the first die.

18. The FPGA Integrated device according to claim 17, wherein a plurality of dies is mounted on top of the first die.

19. The FPGA Integrated device according to claim 1, wherein a plurality of dies is mounted on top of the first die.

20. The FPGA Integrated device according to claim 19, wherein at least some vertical connections of the FPGA are made through vias extending through a silicon layer.

21. The FPGA Integrated device according to any one of claims 1 and 10, wherein at least some of the dies are interconnected by bumps.

22. The FPGA Integrated device according to claim 1, wherein external interfaces are implemented on at least a third die.

23. The FPGA Integrated device according to any one of claims 1 and 22, wherein at least some vertical connections of the FPGA are made through vias extending through a silicon layer.

24. The FPGA Integrated device according to claim 23, wherein at least some of the dies are interconnected by bumps.

25. The FPGA Integrated device according to claim 1, wherein the first die comprises wiring.

26. The FPGA Integrated device according to claim 1, wherein the first die comprises solely wiring.

27. The FPGA Integrated device according to claim 1, wherein the first die comprises switching elements.

28. The FPGA Integrated device according to claim 1, wherein the first die comprises switching elements and wiring.

29. A system comprising:
at least one processor; and
at least one data processing device communicatively coupled to the processor;
wherein:
the data processing device includes an arrangement of configurable cells interconnected by a configurable interconnect structure;
at least some of the configurable cells include Arithmetic Logic Units (ALUs);
the configurable interconnect structure includes switching elements;
the configurable cells are implemented on at least a first one of at least two dies that are stacked; and
at least parts of an interconnect structure are implemented on at least a second one of the at least two dies.

30. The system according to claim 29, wherein the at least one processor and the at least one data processing device are connected via an interface implemented on a die of the data processing device.

31. The system according to claim 29, wherein the at least one data processing device is a Field Programmable Gate Array (FPGA) device.

32. The system according to claim 29, wherein the at least one data processing device comprises Field Programmable Gate Array (FPGA) cells.

33. The system according to claim 29, further comprising at least one interface unit dedicated to the data processing device and that interfaces between the data processing device and a device external to a chip on which the data processing device is positioned.

34. The system according to claim 33, further comprising at least one Peripheral Component Interconnect (PCI) unit dedicated to the data processing device.

35. The system according to claim 31, further comprising at least one Ethernet unit dedicated to the data processing device.

36. The system according to claim 29, wherein at least some of the ALUs are capable of splitting operands into a respective set of data, data of which is processable independently of each other and splitting a result into a respective set of data, data of which is processable independently of each other.

37. The system according to claim 36, wherein the interconnect structure is capable of transmitting each data part of each of the sets of data separately.

38. The system according to claim 29, wherein at least some of the ALUs are capable of single instruction multiple data (SIMD) processing.

39. The system according to claim 38, wherein the interconnect structure is capable of transmitting each data part of each of the sets of data separately.

40. The system according to claim 29, wherein at least some switches of the interconnect structure are implemented on the second die.

41. The system according to claim 29, wherein at least some of the dies are interconnected by vias.

42. The system according to claim 29, wherein the at least parts of the interconnect structure implemented on the at least a second one of the at least two dies includes the configurable interconnect structure.

43. The system according to claim 29, wherein the at least parts of the interconnect structure on the at least a second one of the at least two dies comprises switching elements.

44. The system according to claim 29, wherein all of the at least two dies in the stack are identical.

45. The system according to claim 29, wherein at least some of the dies in the stack are different from other dies that are stacked.

46. The system according to claim 29, wherein at least one die in the stack comprises an ALU and at least one die in the stack comprises an input/output component.

47. The system according to any one of claims 29, 44, 45 and 46, wherein at least one smaller die is mounted on top of the first die.

48. The system according to claim 47, wherein a plurality of dies is mounted on top of the first die.

49. The system according to claim 29, wherein a plurality of dies is mounted on top of the first die.

50. The system according to claim 49, wherein at least some vertical connections of the FPGA are made through vias extending through a silicon layer.

51. The system according to any one of claims 29 and 41, wherein at least some of the dies are interconnected by bumps.

52. The system according to claim 29, wherein external interfaces are implemented on at least a third die.

53. The system according to any one of claims 29 and 52, wherein at least some vertical connections of the FPGA are made through vias extending through a silicon layer.

54. The system according to claim 53, wherein at least some of the dies are interconnected by bumps.

55. The system according to claim 29, wherein the first die comprises wiring.

56. The system according to claim 29, wherein the first die comprises solely wiring.

57. The system according to claim 29, wherein the first die comprises switching elements.

58. The system according to claim 29, wherein the first die comprises switching elements and wiring.

* * * * *